CODED TRACK CIRCUIT SIGNALLING SYSTEM

Filed Aug. 27, 1953 26 Sheets-Sheet 1

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 2

INVENTOR.
T.J.JUDGE
BY Forest B. Hitchcock
HIS ATTORNEY

INVENTOR.
T.J.JUDGE
BY Forest B. Hitchcock
HIS ATTORNEY

CODED TRACK CIRCUIT SIGNALLING SYSTEM

Filed Aug. 27, 1953 26 Sheets-Sheet 4

INVENTOR.
T. J. JUDGE
BY Forest B. Hitchcock
HIS ATTORNEY

CODED TRACK CIRCUIT SIGNALLING SYSTEM

Filed Aug. 27, 1953 26 Sheets-Sheet 5

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 6

INVENTOR.
T. J. JUDGE
BY Forest B. Hitchcock
HIS ATTORNEY

CODED TRACK CIRCUIT SIGNALLING SYSTEM

Filed Aug. 27, 1953

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 8

INVENTOR.
T.J.JUDGE

BY Forest B. Hitchcock

HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 9

SIMPLE FORM OF A.P.B

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 10

INVENTOR.
T.J.JUDGE
BY Forest B. Hitchcock
HIS ATTORNEY

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 12

Nov. 1, 1960 T. J. JUDGE 2,958,765

CODED TRACK CIRCUIT SIGNALLING SYSTEM

Filed Aug. 27, 1953 26 Sheets-Sheet 13

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 14

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 15

INVENTOR.
T. J. JUDGE

BY Forest B. Hitchcock

HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 16

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 17

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 18

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 19

DOUBLE DISTANT CAUTION

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 20

INVENTOR.
T.J.JUDGE
BY Forest B. Hitchcock
HIS ATTORNEY

Nov. 1, 1960 T. J. JUDGE 2,958,765
CODED TRACK CIRCUIT SIGNALLING SYSTEM
Filed Aug. 27, 1953 26 Sheets-Sheet 21

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 22

INVENTOR.
T. J. JUDGE
BY Forest B. Hitchcock
HIS ATTORNEY

INVENTOR.
T.J.JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953

26 Sheets-Sheet 24

*INVENTOR.*
T.J.JUDGE
BY Forest B. Hitchcock
HIS ATTORNEY

CODED TRACK CIRCUIT SIGNALLING SYSTEM

INVENTOR.
T. J. JUDGE
BY Forest B. Hitchcock
HIS ATTORNEY

Nov. 1, 1960 T. J. JUDGE 2,958,765

CODED TRACK CIRCUIT SIGNALLING SYSTEM

Filed Aug. 27, 1953 26 Sheets-Sheet 26

INVENTOR.
T. J. JUDGE
BY Forest B. Hitchcock
HIS ATTORNEY 2,958,765

CODED TRACK CIRCUIT SIGNALLING SYSTEM

Thomas J. Judge, Rochester, N.Y., assignor to General Railway Signal Company, Rochester, N.Y.

Filed Aug. 27, 1953, Ser. No. 376,856

23 Claims. (Cl. 246—33)

Figure 1A:
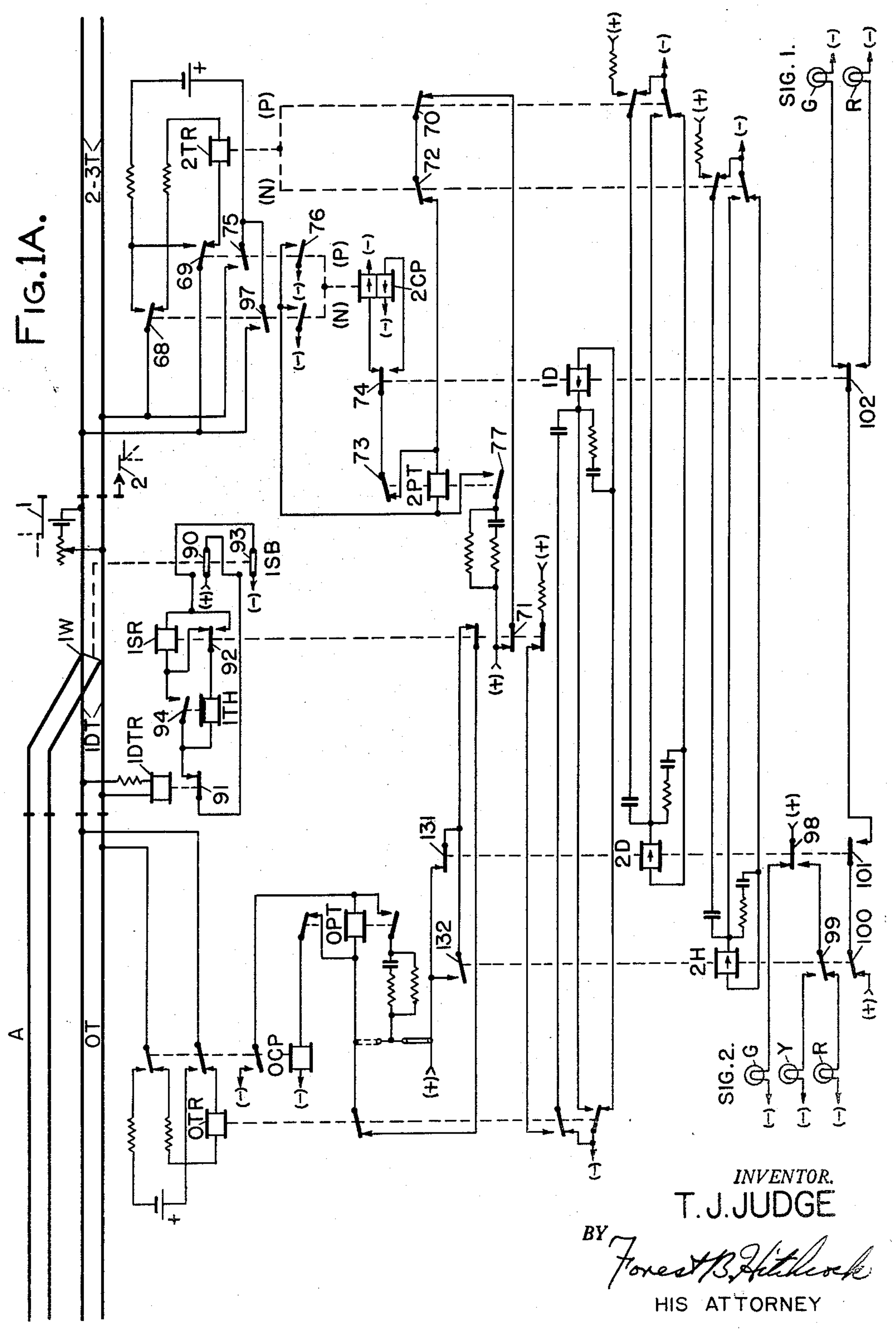

The present invention relates to automatic block signalling systems for railroads, and more particularly pertains to a coded track circuit signalling system for single track railroads of the absolute-permissive-block signalling type.

A block signalling system of the absolute-permissive-block type, commonly termed APB signalling system, provides protection against opposing train movements over a single track stretch between headblock signals at the opposite ends of the stretch, but permits following train movements within such single track stretch with the usual block spacing protection. In such a system, there are sufficient intermediate signals in the single track stretch between headblock signal locations that it is advantageous to provide for following train movements; and the distances are such that should opposing trains leave the headblock signals at the opposite ends of the stretch simultaneously, they would receive sufficient warning to enable them to stop before any collision would take place.

The application of coded track circuits to a block signalling system of the APB type involves various problems, since traffic may travel in either direction and the signalling must be as effective both in time of response and in safey for one direction as the other. In some prior coded track circuit systems of the APB type, the track circuits have employed different code rates to give the distinctive signal indications, and these code rates have been applied in what has been conveniently termed "driven code" pulses having their rates selected in accordance with traffic conditions. Associated with these driven code pulses are "inverse code" pulses which are transmitted in the opposite direction during the off periods or spaces between the driven code pulses, and these inverse codes must be of the same rate as their associated driven codes. In such a system, since the code rates of the driven codes are employed to give the distinctive signal control conditions, it has been necessary to reverse the direction of driven coding dependent upon the direction of traffic. Such systems have thus become known as being of the "code reversal" type. These systems present the difficulty of reversing the direction of coding dependent upon traffic conditions.

Various other methods of coding have been suggested in connection with such a signalling system for single track and most of them are limited to special conditions which do not provide the full equivalent of a line wire type of APB signalling system.

Heretofore, it has not proved practical to provide the different distinctive signal controlling conditions by the use of different polarity of pulses in place of distinctive code rates, because there has been no practical way to protect against broken down insulated joints causing false and dangerous signal indications.

Generally speaking, and without making any attempt to explain the exact nature of the present invention, it is proposed to provide each single track stretch with means at each end for applying driven code pulses which means acts automatically to cause a dependent code pulse to be transmitted at the termination of the reception of each code pulse from the opposite end. Under normal conditions, pulses are transmitted in opposite directions from one end of the stretch to the other alternately at a natural rate dependent upon the characteristics of the coded track circuit ballast conditions and dependent upon the time of operation of the repeating relays at the intermediate signal locations. These pulses for both directions are then caused to have particular polarities in accordance with traffic conditions so as to distinctively control the signals for both directions of traffic.

When a train enters a single track stretch, it prevents the reception of code pulses from the opposite end and the consequent transmission of the dependent code pulses, so that the pulse timing apparatus at the leaving end of the streach merely transmits driven code pulses of a given slower rate, which code pulses act as a carrier for their polarity characteristics to give the distinctive signal indications.

When the train passes an intermediate signal location, a driven code of a particular polarity is transmitted behind it so as to allow for following train movements. However, since this driven code at the intermediate signal location is applied by reason of the picked up condition of a directional stick relay that is maintained picked up only so long as no code is received in advance of that signal, then it is readily apparent that should the joints break down and the polarized code erroneously endeavor to clear the associated signal, the directional stick relay would be immediately released and driven code would no longer be applied. Thus, the present invention provides the characteristics of a regular APB signalling system by the use of a directional stick relay which not only provides the directional characteristics of the system but also provides inherently the desired broken down joint protection.

One advantage of the present invention is that the transmission of the code pulses may be at a relatively low rate in the order of thirty to forty code pulses per minute so as to save relay operations and the consequent wear on the system which is continuously in operation. This is in contrast to the relatively fast code rates in a system where distinctive rates are employed to control the signal indications. In such systems, the code rates are usually several times the rate above mentioned for the system of the present invention.

Another advantage of the present system is that the coding rate can vary widely dependent upon the characteristic of the track circuits without affecting the proper functioning of the system to give the desired signal indications. Such a system is thus advantageous over the above mentioned code reversal type where the inverse codes must be fitted into the spaces between the driven codes regardless of variations in relay response because the code oscillators determining the rates do not vary in accordance with changing track circuit conditions.

Another advantage accruing from the present invention where the different signal controls are effected by polarity instead of code rates, is that the presence of the polarity directly gives the distinctive control, and the means employed to detect the presence of coding can be greatly simplified, thereby avoiding the use of complicated and expensive rate decoders.

Another feature of the present invention resides in the way the so called "tumbledown control" is effected through a single track stretch by stopping the dependent coding and putting to stop all opposing signals in the single track stretch at substantially the same time. This is accomplished because the code pulses are repeated from section to section independently of the signal response except in so far as the polarity of the pulses is determined by the then existing condition of the associated signal. In prior systems employing distinctive rates, it is necessary for the presence of the codes to be selected dependent upon the indications of the signals so that when a tumbledown operation takes place, the signals are caused to assume stop indicating conditions in sequence which prolongs the tumbledown time and increases the possibility of the simultaneous entry of trains at the opposite ends of the single track stretch.

Another feature of the present invention is a corollary to the feature just mentioned whereby the failure of an intermediate signal to respond to a clear code to display a clear aspect will not affect the proper clearing of subsequent intermediate signals to the rear thereof. In other words, code pulses can be properly repeated past a signal location even though the corresponding signal does not operate to display a clear or caution aspect. This allows the clearing of the signals to the rear including the leaving signal for the next headblock signal location in the rear, so that a train may proceed from the headblock location under signal indications until it reaches the failing intermediate signal. At this failing intermediate signal, the train must stop and then proceed in accordance with the rules of the railroad. This feature is accomplished because the repeating of pulses past a signal location is independent of the actual indication displayed by that signal. However, the particular aspect displayed by the signal does determine the polarity of the repeated pulses. Thus, the failing signal in displaying a stop indication causes the next signal in the rear to display a caution indication. In most prior systems, it is necessary to clear the signals in sequence, and the failure of a particular signal would cause all the signals to the rear thereof and including the leaving signal at the next headblock location in the rear to also be held at stop. Thus, if a train received information via telephone from the central dispatcher that it was proper for it to proceed, such train would be required by rule to stop and proceed at all intermediate signals between the headblock location and the failing intermediate signal, as well as at the failing intermediate signal.

In my prior application Ser. No. 114,661, filed September 8, 1949, now Patent No. 2,703,839, dated March 8, 1955, I disclosed a block signaling system for single track railroads employing dependent coding in the stretch of single track; but such prior application was of the station to station type and was not a regular absolute permissive block signaling (APB) system in which following train movements may be effected through a single track stretch as disclosed in this application. Thus, the present invention is to be considered in the nature of an improvement over my prior application; and no claim is intended to be made herein to any subject matter disclosed in such prior application which may be common with this application.

Other objects, purposes and characteristic features of the present invention will in part be obvious from the accompanying drawings and in part pointed out as the description of the invention progresses.

Figure 1B:
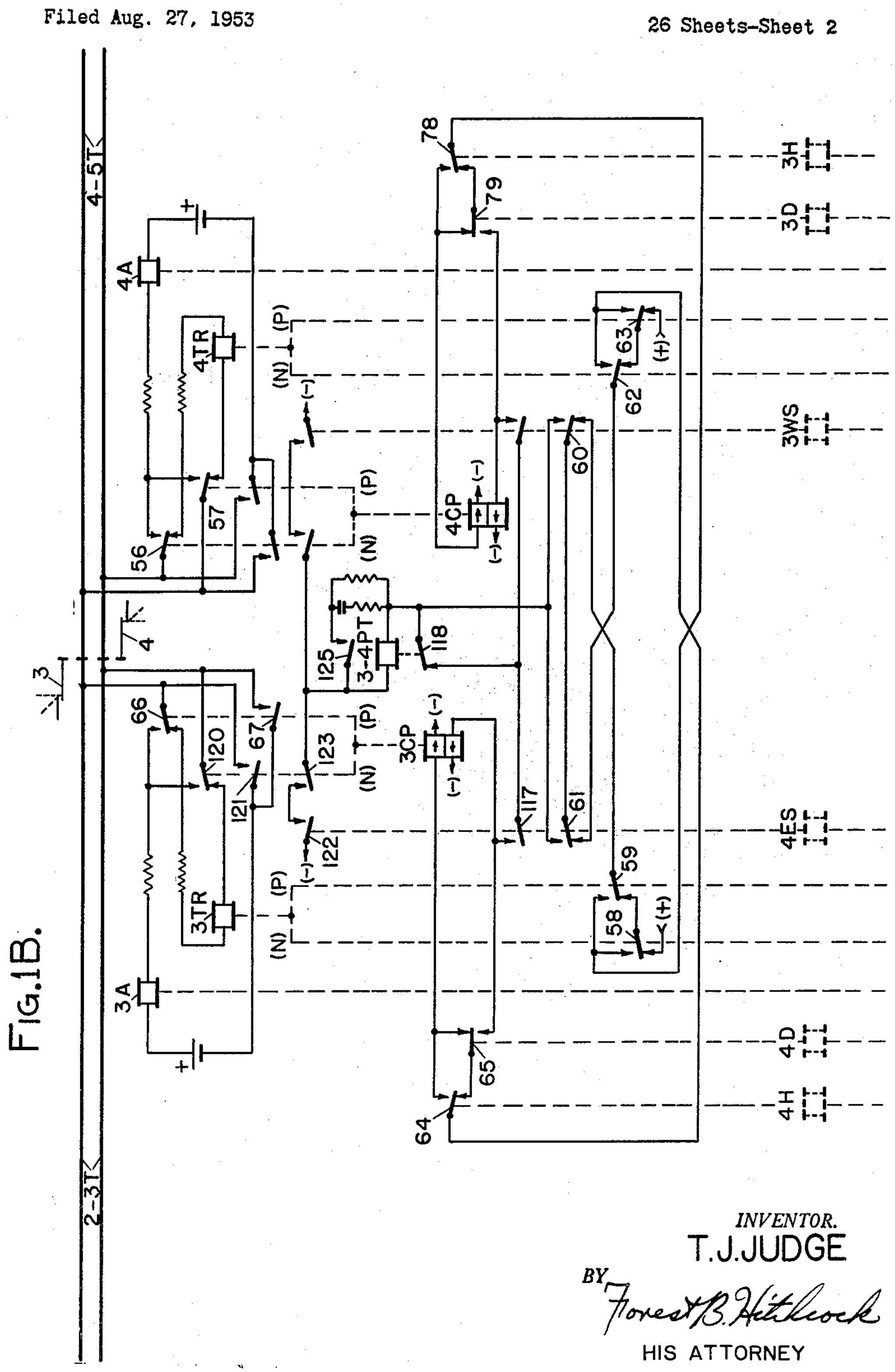
Figure 1C:
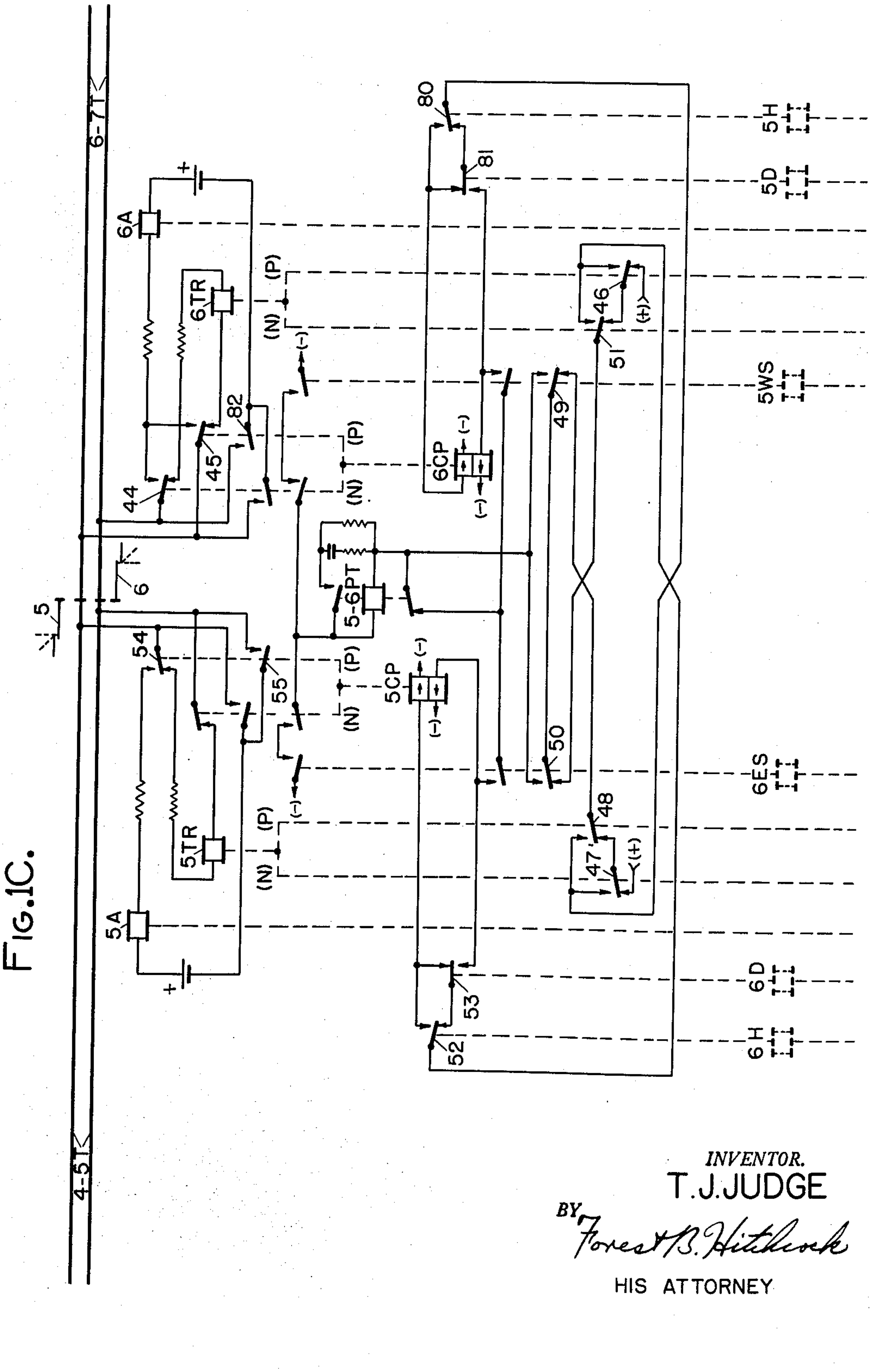
Figure 3A:
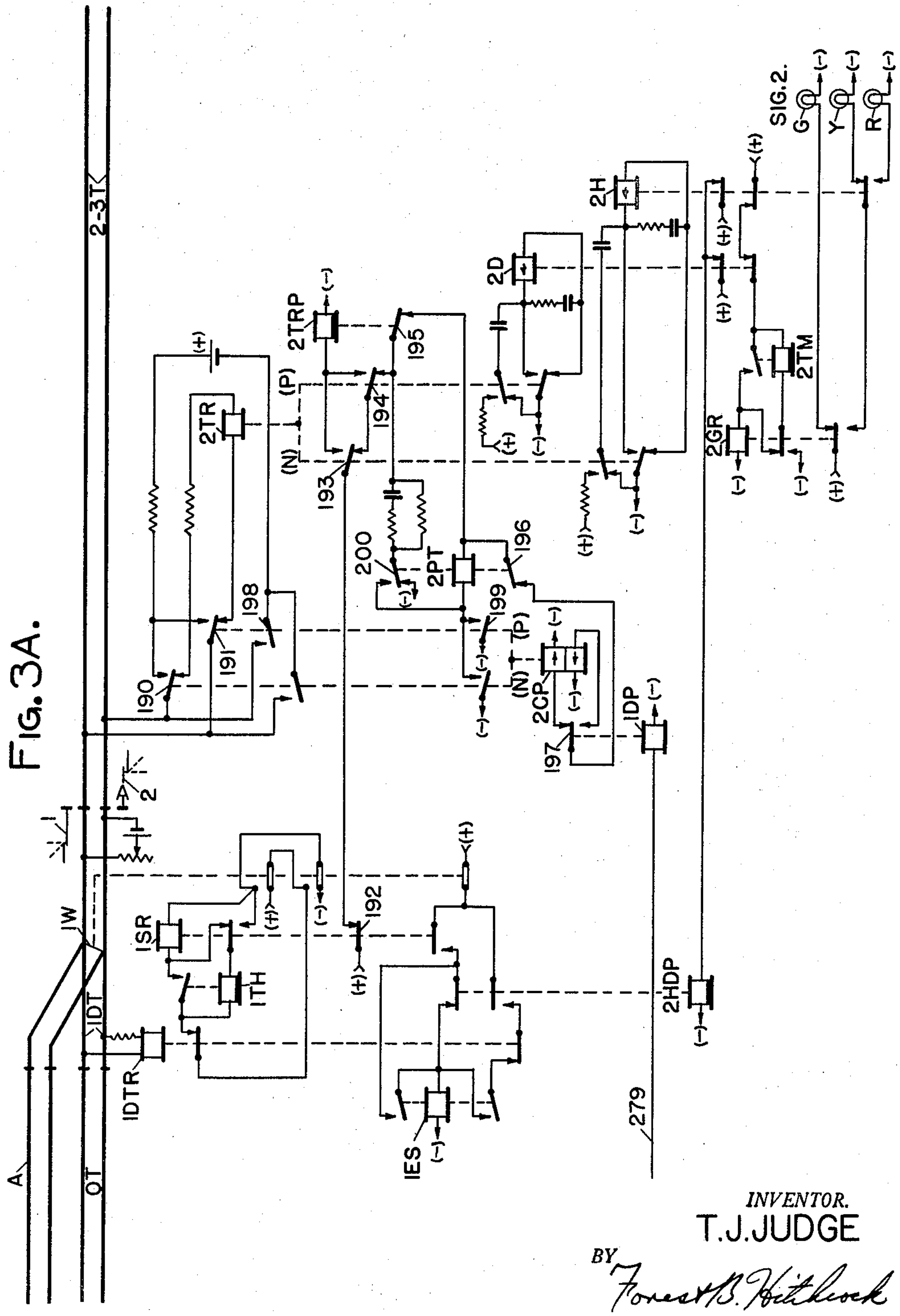
Figure 3B:
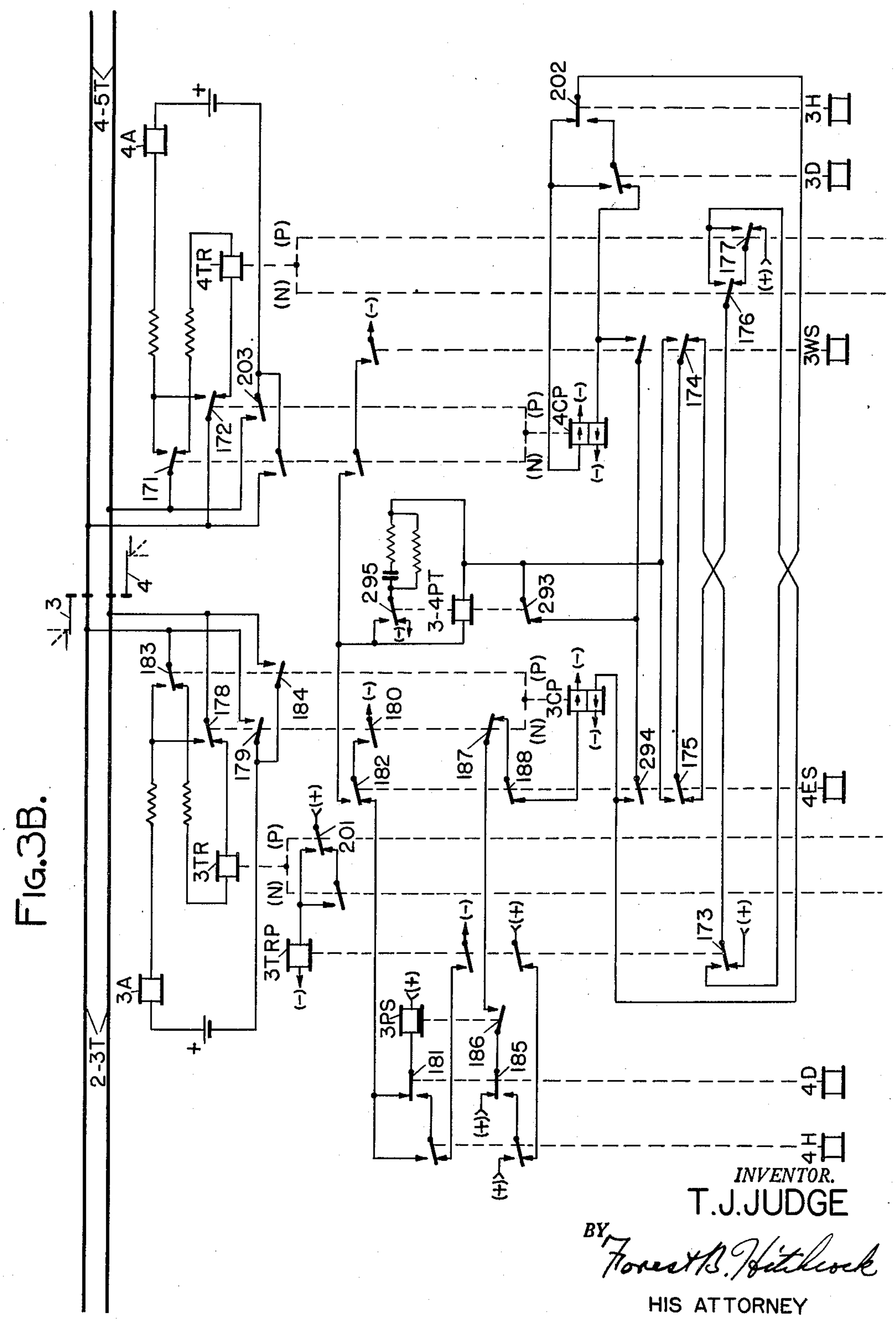
Figure 3C:
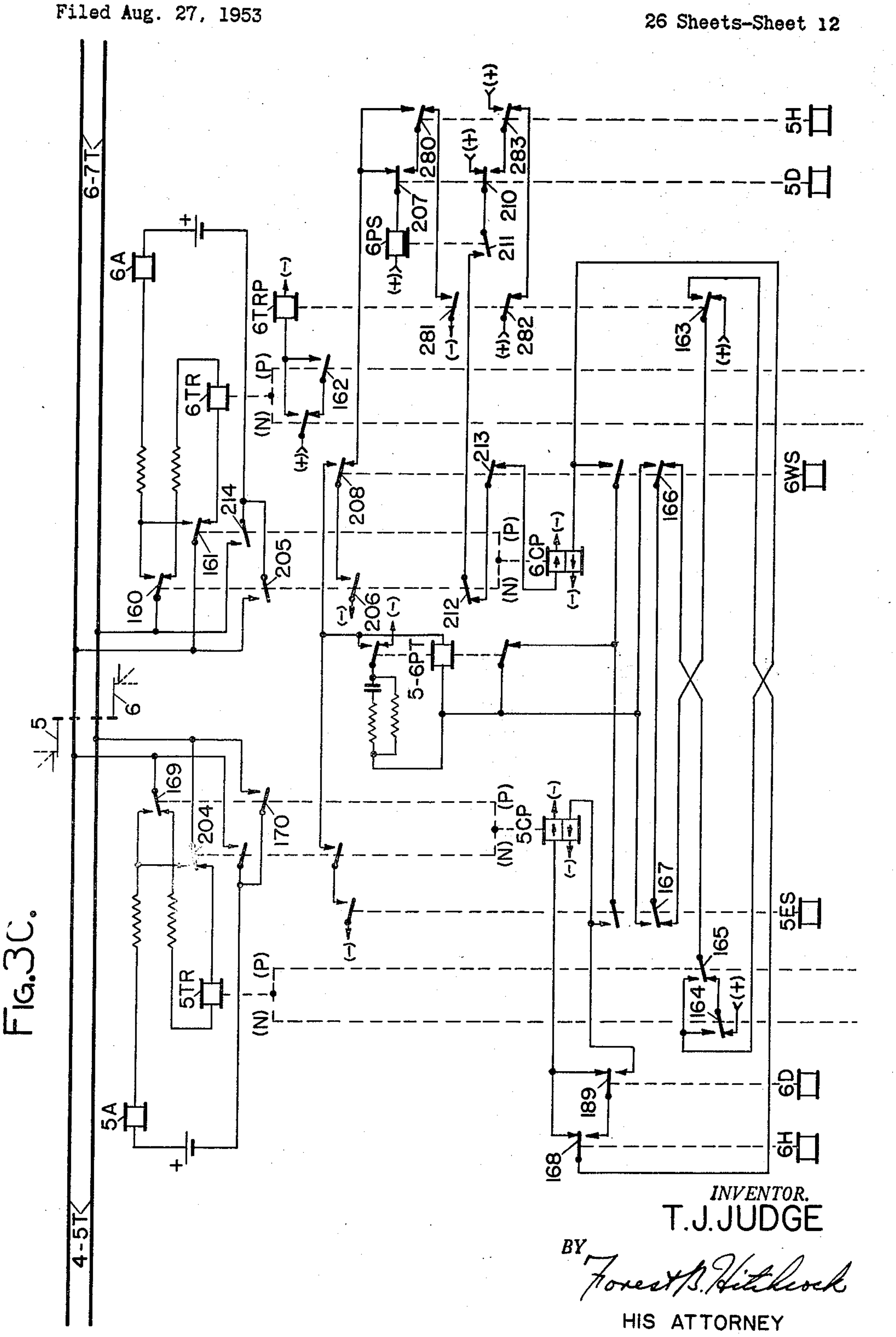
Figure 3D:
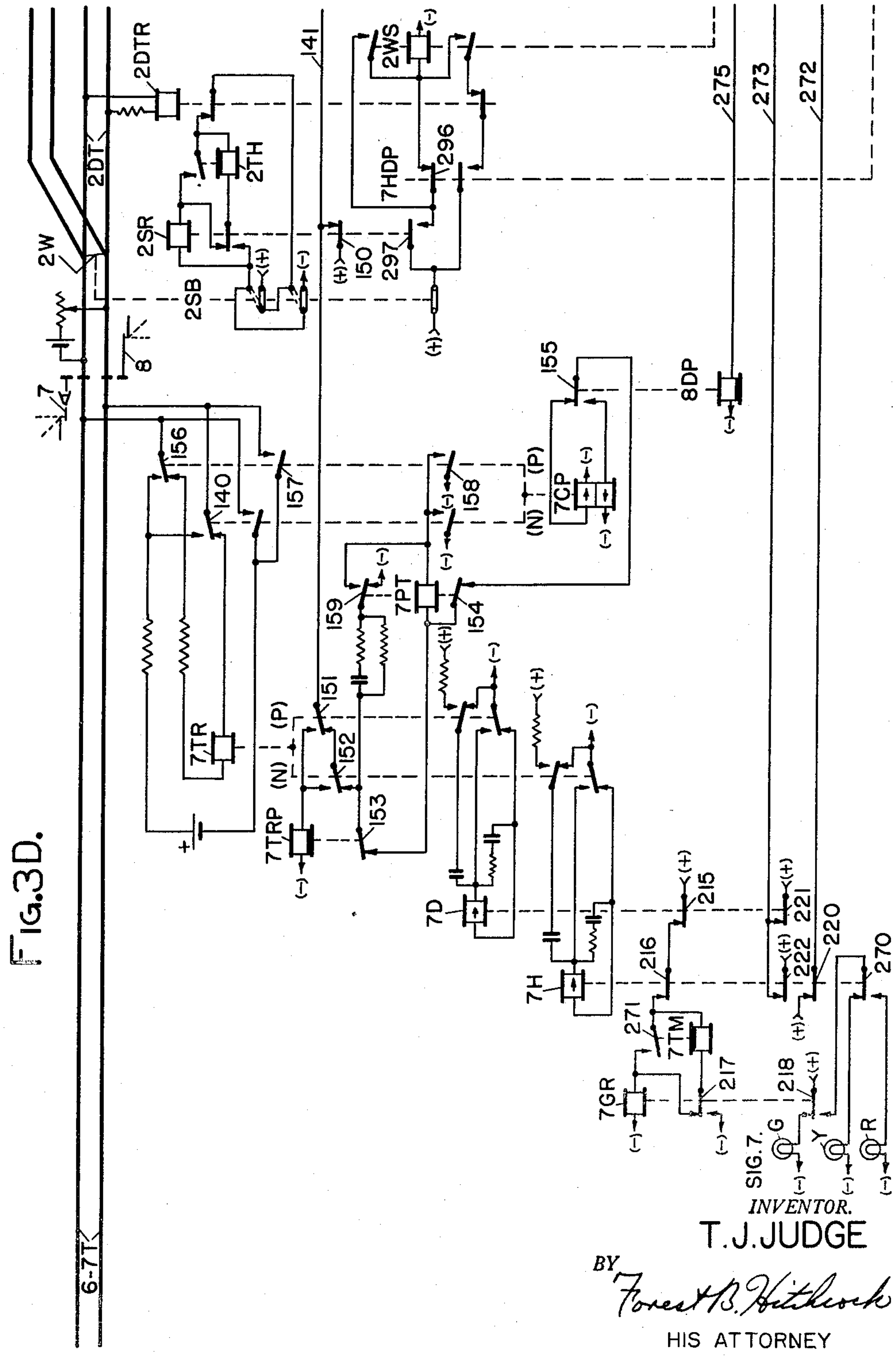
Figure 5:
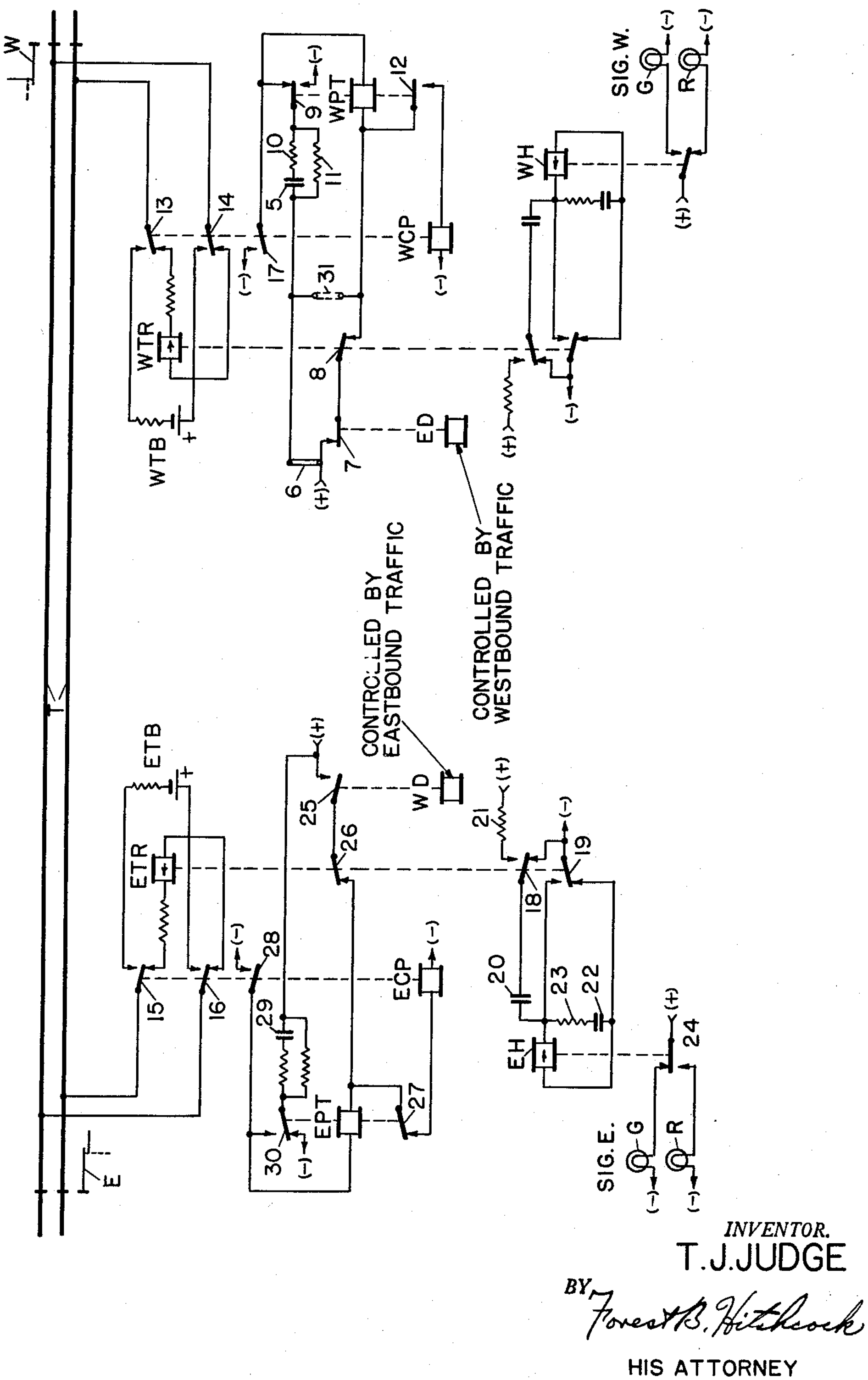
Figure 6B:
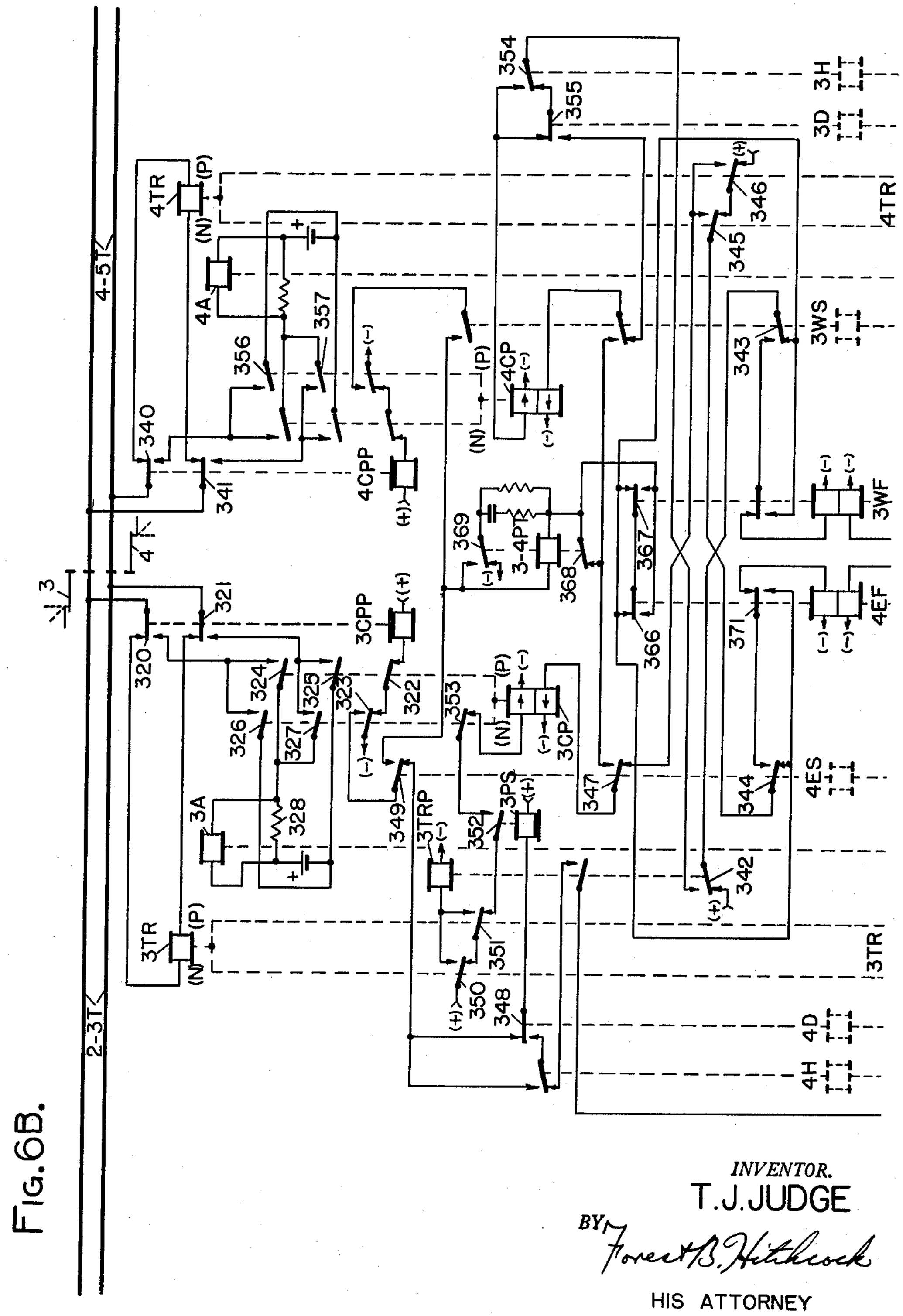
Figure 6B:
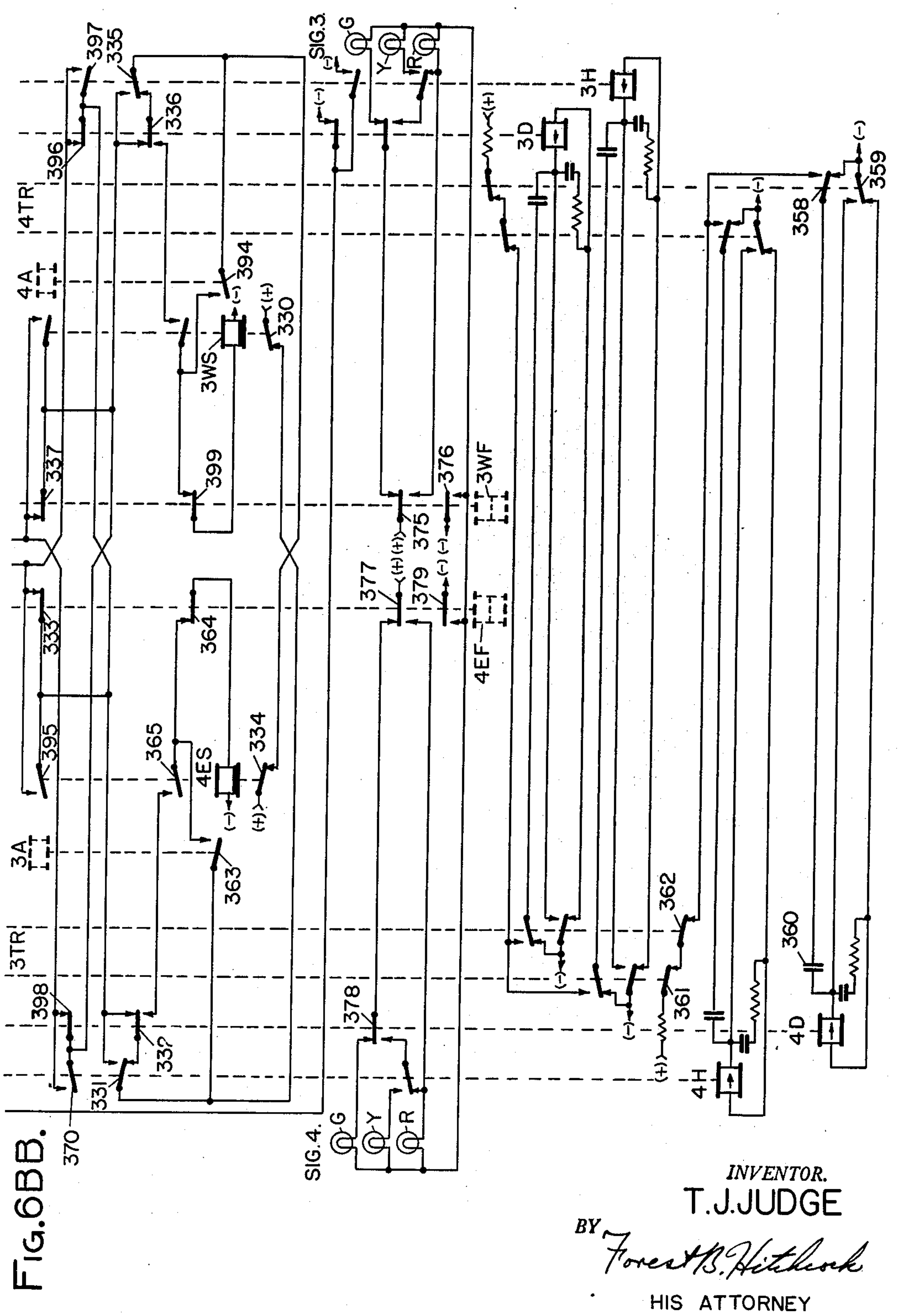
Figure 7:
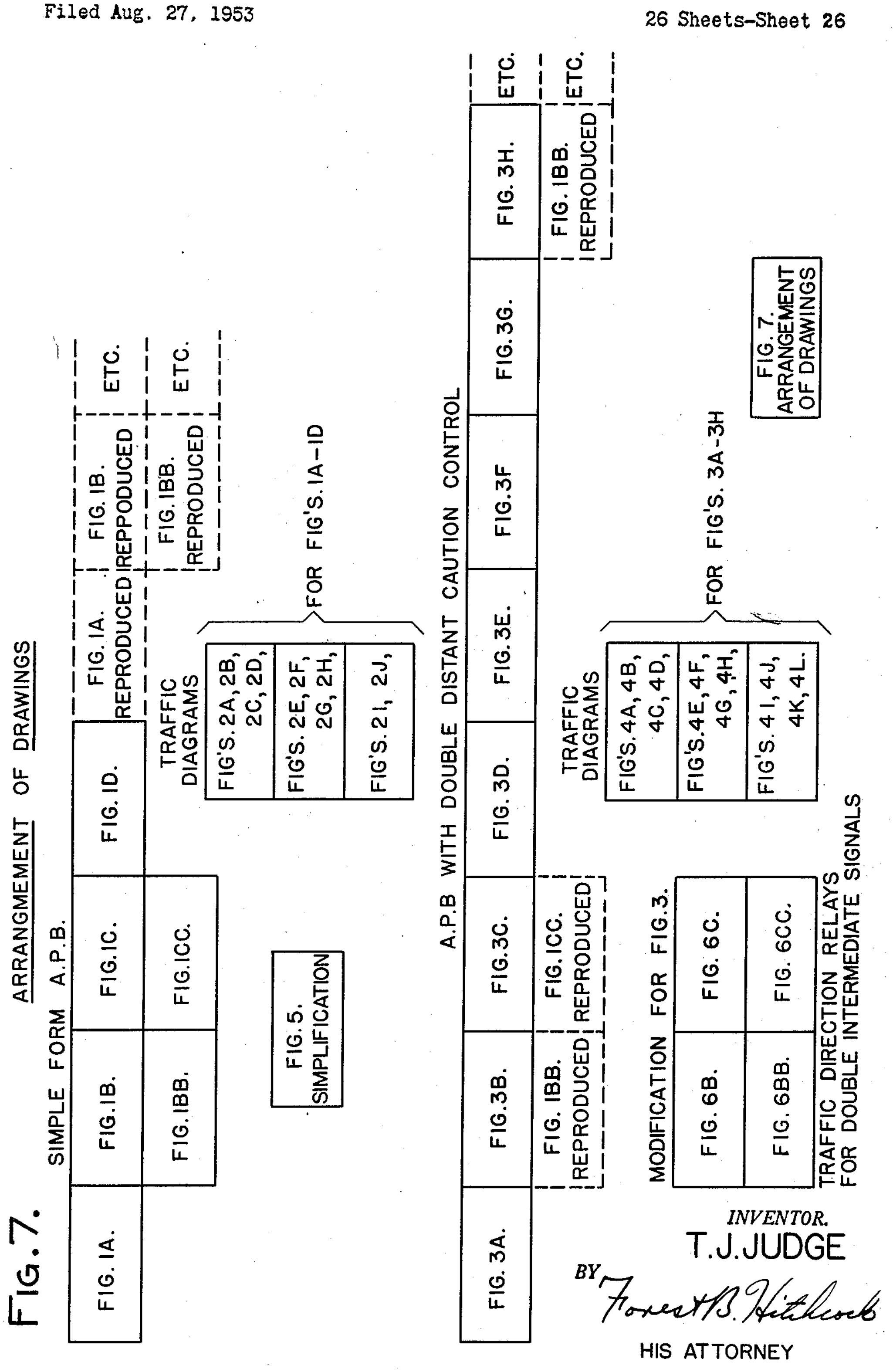

In describing the invention in detail, reference will be made to the accompanying drawings, in which like letter reference characters provided with distinctive numerals designate corresponding parts throughout the several views, and in which:

Figs. 1A to 1D inclusive, when placed side by side, and when the Figs. 1BB and 1CC are respectively placed beneath Figs. 1B and 1C, illustrate in detail the manner in which the present invention is applied to the control of the signals for a typical stretch of track, as constituting one form of the present invention;

Figs. 1BB and 1CC are the decoding and signal control circuits mentioned above as a part of the first form of the invention, and these same figures may be reproduced and used with the modified form of the invention shown in figures described below;

Figs. 2A to 2J inclusive, show diagrammatically the codes and signal indications given under various traffic conditions for the form of the invention shown in Figs. 1A through 1D;

Figs. 3A to 3H inclusive, when placed side by side, and when Figs. 1BB and 1CC are reproduced and respectively placed beneath Figs. 3B and 3C, illustrate in detail a circuit organization of a second form of the invention applied to the control of the signals for a typical stretch of track; Fig. 1BB should also be again reproduced and placed beneath Fig. 3H;

Figs. 4A to 4L inclusive, show diagrammatically the codes and signal indications given under various traffic conditions for the form of the invention shown in Figs. 3A through 3H;

Fig. 5 is an abbreviated diagram to more readily disclose the timing operation involved in the dependent coding type of system disclosed herein;

Figs. 6B, 6BB, 6C and 6CC may be used to replace Figs. 3B and 3C in the second form of the invention to illustrate in detail a modified third form of the invention with traffic direction circuits; Figs. 6B and 6BB should also be reproduced and be substituted for Fig. 3H for this modified third form of the invention; and Fig. 7 shows in block form the arrangement of the drawings and reproductions thereof to disclose the different forms of the invention and extensions thereof.

For the purpose of simplifying the illustrations and facilitating in the explanation, the various parts and circuits constituting the embodiment of the invention have been shown diagrammatically and certain conventional illustrations have been employed, the drawings having been made more with the purpose in mind of making it easy to understand the principles and mode of operation than with the idea of illustrating the specific construction and arrangement of parts that would be employed in practice. Thus, the various relays and their contacts are illustrated in a conventional manner and symbols are used to indicate connections to the terminals of batteries, or other sources of electric current, instead of showing all the wiring connections to these terminals.

The symbols (+) and (−) are employed to indicate the positive and negative terminals respectively of suitable batteries or other sources of direct current; and the circuits with which these symbols are used always have current flowing in the same direction.

In the diagram of operation, various symbols are employed to represent the different codes. For example, a solid line arrow is used to represent a driven code, and the particular polarity of the pulses of such driven code has been indicated by an adjacent (+) symbol or (−) symbol. When dependent code pulses are transmitted in a particular section, this has been indicated in the diagrams by the use of dotted line arrows, and the particular polarities of the pulses of such codes are indicated by the associated (+) or (−) symbols. In some instances, the code transmitted for any pulse period (either the driven or the dependent type), may have both polarities of current transmitted during that period, and this has been indicated by associating the symbols (+/−) or (−/+) with the arrows indicating such codes.

Since the present invention does not employ code oscillators of either the pendulum or torsional type, the timing of the pulses is effected by pulse timers which are constituted by a relay and an associated capacitor-resistor organization to give the necessary time characteristics. This arrangement is desirable in a system of this type so that the changeover from driven code to dependent coding can be effected merely by the elimination of the effect of the condenser-resistor combination on the associated relay. It is readily apparent that such a change in timing could not readily be imposed upon a code oscillator of the conventional pendulum type.

Another symbol has been employed in the circuit diagram representative of a polar relay having two armatures which respectively respond to currents of opposite polarities. It is, of course, understood that two polarized relays could be employed in the circuits in place of this particular type of relay, each polar relay responding to a particular polarity only. However, it is both convenient and economical to employ polarized relays of the type disclosed in the prior applicator of G. E. Marsh, Ser. No. 326,564, filed December 17, 1952, now U.S. Patent 2,832,866 granted April 29, 1958. These relays have been indicated as having either single or double windings and as having two armatures by the branching of a single dotted line into two dotted lines for respective sets of contacts, one armature of which is indicated as responding to positive pulses by the presence of a (P) adjacent its branch, and the other armature responding to negative pulses as indicated by the (N) opposite its branch. One advantage of employing such a relay particularly as a track relay in a system of this kind, is that the resistance of its windings can be reduced to the desired value and yet provide the full equivalent of two polarized relays.

*General organization (form of Fig. 1)*

Figs. 1A, 1B, 1C and 1D, when placed side by side, form a stretch of single track extending between the headblock locations of two passing sidings A and B. These drawings are so organized that the placing of duplicates of the Figs. 1A and 1B to the right of Figs. 1A, 1B, 1C and 1D illustrates the entire circuit organization required for the control past the siding B as contemplated in accordance with the present invention. This more extensive track layout has been illustrated in the traffic movement diagrams of Figs. 2A, 2B through 2J. It will thus be seen that by reproducing the figures of the present disclosure and selecting their positions with respect to each other, the signalling system required for the various track layouts afforded on the usual single track railroad will be completely disclosed (see Fig. 7).

Referring to Figs. 1A, 1B, 1C and 1D, a stretch of single track between two sidings A and B has been illustrated which has signals numbered 1 to 8 inclusive, the even numbered signals governing east-bound traffic and the odd numbered signals governing west-bound traffic. For the purpose of the present disclosure, symbols have been located adjacent the trackway to indicate the different possible aspects of the signals and the indications actually given by the signals under the conditions shown. The symbols employed are of the position type with the dotted arms indicating the possible indications and the solid arms indicating the actual control then existing. The solid arms are made heavy if the signals are then illuminated. For convenience in the circuits of the disclosure color light signals have been illustrated rather than search light type signals; but it is, of course, understood that any suitable type signal may be employed in actual practice. In the circuits, each signal is shown as having green, yellow and red lamps G, Y and R for displaying proceed, caution and stop aspects respectively. The symbols for the signals both in the diagrams and in the circuit organization have been made to indicate an absolute (stop and stay) signal by the use of a letter A marker in vertical alignment with the main signal; whereas, a permissive (stop and proceed) signal has been illustrated by the absence of the marker.

Referring to Figs. 1A, 1B, 1C and 1D, it will be noted that the track section between two opposing signals has been given a reference character corresponding to those signals, as for example, the section of track between signals 2 and 3 has been designated track section 2–3T. In this way, one can readily identify the various track sections, which, of course, are suitably insulated from each other.

Each signal location has its associated apparatus which is quite similar to the apparatus associated with every other signal location with a few exceptions. These similar devices have been given the same letter reference characters which are made distinctive by reason of their preceding numerals which correspond with the number of the signal with which they are associated. Thus, the apparatus may be described in general with reference to such apparatus by the letter reference characters instead of specifying the particular signal location with which each such device is associated.

For example, each signal has associated therewith a track relay TR. This track relay TR is preferably polarized so as to distinctively respond to the opposite polarities applied to the associated track section, and is assumed in the disclosure to be of the type disclosed in the above mentioned prior application of G. E. Marsh, Ser. No. 326,564.

Also, each signal location is provided with an approach relay A which is shown as a series relay that does not respond to the current flowing for the regular codes applied to the track rails, but when a track section is occupied by a train sufficient additional current is caused to flow during the code pulses to cause the associated approach relay A to be picked up. It is, of course, understood that any suitable approach relay may be employed and may just as well be of the shunt type if desired.

Each signal location also has a code transmitting relay CP, which is effective alternately to apply code pulses to the track rails and disconnect the associated track relay. This relay CP has also been shown in the disclosure as being of the polarized type responding distinctively to opposite polarities and having two independently operable armatures as disclosed in the above mentioned prior application of G. E. Marsh, Ser. No. 326,564. Associated with these code transmitting relays CP are suitable pulse timing relays PT for determining the duration of the pulses applied to the track rails.

The decoding means of the present disclosure employs home and distant relays H and D. These relays are arranged to respectively respond to the reception of negative and positive code pulses. In other words, when negative pulses are received by the track relay TR and its armature N intermittently responds, the relay H is caused to be picked up and maintained picked up. Similarly, when positive pulses are received, the armature P of the track relay TR is intermittently operated. This causes the picking up of the distant relay D and maintains it picked up so long as such positive pulses are intermittently received. If code pulses of both polarities (−/+) are received, both relays H and D are picked up. These relays H and D are made to respond, only when code pulses are received, by reason of their characteristic control by a condenser which is charged during a code pulse and is discharged through the associated relay between code pulses. In this way, the steady application of energy to the track relay does not cause its response.

At the intermediate signal locations, suitable directional stick relays ES and WS are provided with suitable control to determine the direction in which a train passes the associated signal location. These relays ES and WS are neutral relays which are suitably made slightly slow releasing for reasons later discussed.

It is assumed that the coded track circuits are of the conventional direct current type using primary batteries, or trickle charged storage batteries as the sources for the track circuit current; but, it should be understood that the same principles may be applied to coded track circuits energized from alternating current sources.

Each siding connects with the main track through a switch W which has connected to its suitable switch box contacts SB. Also, associated with each switch W is a detector track section DT which has the usual track relay DTR and the track battery at the other end. This detector track circuit, of course, is assumed to provide the usual fouling protection and may be connected in any of the conventional ways.

If desired, the track switches of the track layout may be spring switches so set that the trains, by keeping to the right, may travel over the railroad without requiring the manual actuation or operation of the switches to their different positions. The particular type of switch and its arrangement has no bearing upon the present invention.

Associated with each detector track section DT is a stick relay SR and thermal or slow pick-up thermal relay TH, and these relays are jointly controlled by the detector track relay DTR and the switch box contacts SB. The relay SR is deenergized whenever the track section is occupied or the track switch is operated to its reverse position, but it will not be reenergized for a predetermined measured time after the conditions have returned to normal. This is to provide positive operation upon the passage of a light engine or the like, and prevents momentary loss of train shunt from being adversely effective.

*General organization (modified form of Figs. 3)*

Figs. 3A through 3H, when placed side by side (see Fig. 7), form a stretch of single track extending between two headblock locations and also including the apparatus associated with a complete siding section. These drawings are so organized that the reproduction of Figs. 3C, 3D, 3E, 3F and 3G may be duplicated and placed to the right of 3H to make a layout with a second track stretch and another passing siding. This is merely mentioned to make it clear that the circuit organization disclosed is applicable to any extensive track layout; but it is believed that the drawings shown are sufficient to completely illustrate the operation for various typical traffic conditions to be discussed later.

This modified form of the invention is basically the same as in the form of Figs. 1, but provides certain additional features including a double distant caution control past a siding to give certain added features of facility which will be discussed later. In order to provide these additional features, additional apparatus is required and certain code transmitting operations have been modified.

The apparatus at the intermediate signal locations remain substantially the same as above described in connection with Figs. 1, but in addition a track repeating relay TRP is required to respond to each code pulse received and effect a repeat operation to the next track section as will be described in detail hereinafter. This track repeating relay TRP is of the neutral quick acting type.

At the headblock signal locations similar track repeating relays TRP are also employed, however, they are slightly slow release for reasons later described. In addition, the decoding relays H and D at times change their positions relatively slowly, and at other times both of these relays are picked up for a proceed or green aspect of the associated signal. For this reason, a green signal control relay GR is provided which in turn has associated with it a thermal or slow pick-up relay TM.

In addition, the transmission of the fourth control through a siding section also involves the quick shift of polarity as a distinctive controlling condition and for this reason it is convenient to provide more than one pulse timing relay PT at each end of such section. The letter reference characters for these relays have been made distinctive in accordance with the positive and negative character of the pulses which they respectively time by designating such relays PPT and NPT.

Another signal repeating relay is associated with the relays D and H so as to indicate whenever a code is being received. This relay HDP is picked up whenever either or both of the H and D relays are picked up. This is a neutral relay which is made slow releasing so as to remain picked up if a shift in energization is made between the H and D relays. In some instances, the H relay is provided with a slow acting repeater relay HP; and also the relay D is sometimes provided with a slow acting repeater relay DP. The purposes of these relays will appear as the description progresses.

Before considering the detail operation of the two forms of the invention the structure of which has been briefly outlined above, it is believed to be helpful to discuss a schematic simplification of the code transmitting and receiving apparatus as might be applied to the opposite end of a siding section or the opposite ends of a single track stretch.

*Schematic diagram of Fig. 5*

Referring to Fig. 5, a simple or schematic organization is shown to illustrate the operation of the system for both dependent and independent coding. The circuit organization shown in this Fig. 5 is very similar to that shown for the siding section in the actual track layout circuit organization disclosed in Fig. 1.

A single track section T is shown as having signals E and W controlling traffic in opposite directions over such track sections. A track relay ETR and WTR is located at opposite ends of the section and normally connected through back contacts of a code transmitting relay to the track rails. These code transmitting relays ECP and WCP have respectively associated therewith pulse timing relays EPT and WPT. The code transmitting operation is controlled at the left-hand end of the track section by a distant relay WD which is controlled by eastbound traffic in approach to the signal E; whereas, a relay ED at the right-hand end of the track section is controlled by westbound traffic in approach to the signal W. Decoding relays EH and WH are respectively controlled by the track relays ETR and WTR. Signals E and W of the color light type are respectively controlled by relays EH and WH.

Although the code pulsing operation involving what is termed dependent coding, would normally be present in the track section T, it is assumed for convenience in the description that traffic conditions are such that the relay WD is deenergized, and that independent or driven code pulses are being transmitted by the relay WCP at the right-hand end of the track section T. This assumption is made so as to facilitate the illustration of how the code transmission at opposite ends of the stretch is quickly synchronized when dependent code conditions are initially established.

It will be noted that the relay WPT is shown in a picked-up position which is being maintained by the discharge of the condenser or capacitor 5 through a local circuit including the windings of the relay WTP to perform a timing operation. The left-hand terminal of the condenser 5 is positive so that current is flowing through the jumper 6, front contact 7 of relay ED, back contact 8 of relay WTR, windings of relay WPT, front contact 9 of relay WPT, resistor 10, to the right-hand terminal of the condenser 5. When the charge on the condenser 5 is dissipated, the relay WPT drops away opening its front contact 9 and closing its back contact 9. This immediately causes the recharging of the condenser 5 through the back contact 9. It is noted that the condenser 5 and resistor 10 are shunted by a relatively high resistor 11 which is selected to give the desired time constant, and which may be a variable resistor if desired.

Also, the closure of back contact 12 of relay WPT completes a circuit from (+), and including front contact 7 of relay ED, back contact 8 of relay WTR, back contact 12 of relay WPT, windings of relay WCP, to (−). The energization of the relay WCP causes it to pick up its contacts opening back contacts 13 and 14 to disconnect the relay WTR from the rails of track section T, and then connect the track battery WTR through front contacts 13 and 14. This applies energy to the track rails for energizing the track relay ETR at the opposite end of the section through back contacts 15 and 16 of the relay ECP. This operation will be discussed further presently.

At the same time, relay WCP closes its front contact 17 to complete the energizing circuit for the pulse timing relay WPT through front contact 7 of relay ED and back contact 8 of relay WTR. As soon as the relay WPT picks up, the condenser 5 in its fully charged condition is connected across the windings of the relay WPT as previously described, but the battery source is also still connected across relay WPT and condenser 5 through front contact 17 of relay WCP. The opening of back contact 12 of relay WPT deenergizes relay WCP to terminate the pulse transmitted over the track rails and open front contact 17. This starts the timing operation of relay WPT, and the charge on the condenser 5, of course, dissipates in due course to allow the relay WTP to again release. This intermittent energization and deenergization of the relay WCP is continued to cause independent or driven code pulses to be applied to the rails of the track section T.

It will be noted that the relay WCP is picked up for a time period substantially corresponding with the picking up period of the relay WPT; and relay WCP is released for a time period substantially corresponding to the release time of relay WPT, which is determined by the discharge of the condenser 5 through the windings of relay WPT. In this way, the code pulses are made rather short in duration; whereas, the time between successive code pulses is made relatively longer than the code pulses themselves, and can be determined by the time constant of the condenser and its associated limiting resistor 10 and shunt resistor 11.

The code pulses transmitted by relay WCP are received by the track relay ETR at the other end of track section T. Each energization of the track relay ETR closes front contacts 18 and 19 which causes the capacitor 20 to become fully charged through limiting resistor 21. Each deenergization of the track relay ETR closes back contacts 18 and 19 so that the charge on this capacitor 20 is discharged through the windings of the relay EH. The capacitor 22 also receives some of the charge from capacitor 20 through limiting resistor 23 which makes the relay EH slow in releasing to maintain its contacts picked up between successive code pulses. Thus, when the contacts 18 and 19 of the track relay ETR are intermittently picked up and released, the capacitor 20 is intermittently discharged through the relay EH which causes its contacts to be picked up and steadily maintained picked up so long as such coding continues. The capacitor 22 in shunt with the relay EH is made up of such size as to maintain the relay EH energized in the order of two to four seconds subsequent to the cessation of the reception of code pulses. In this way, the relatively long "off" periods between successive pulses on the track rails are easily masked out. It will be noted that this relay EH is of the polarized type, such as shown, for example, in the prior Patent No. 2,414,583 granted January 21, 1947 to G. E. Duffy. The use of a polarized relay in this decoding organization provides protection against the break down of capacitors or a welding of contacts since there will be no response of the relay EH from direct current flow when the front contact 18 of relay ETR is closed. For this reason, a very effective pulse decoding arrangement is provided without the use of resonant circuits and rectifying organizations.

When the front contact 24 of relay EH is closed, the green indicator lamp G, of signal E is energized; and, when code pulses are not received, back contact 24 is closed energizing the red indicator lamp R. In this way, the signal E can be controlled by code pulses transmitted from the other end of the track section so long as the front contact 7 of relay ED is closed.

Let us assume that traffic conditions change and the relay WD picks up, then the relay ECP is energized from (+) through a circuit including front contact 25 of relay WD, back contact 26 of relay ETR, back contact 27 of relay EPT, windings of relay EPC, to (−). This assumes, of course, that the relay ETR is deenergized because no pulse is being received from the other end of the track section. The picking up of relay ECP closes front contacts 15 and 16 to transmit a code pulse, and also closes front contact 28 to cause the energization of relay EPT. When the relay EPT is energized, it picks up and opens back contact 27 to terminate the pulse transmitted by the relay EPC. Relay EPT is, of course, maintained picked up for a predetermined time by the discharge of the associated capacitor 29 which was fully charged when its front contact 30 was closed.

It will be noted that the transmission of a code pulse by the relay EPC is received by the track relay WTR which opens its back contact 8 thus breaking the discharge circuit for the associated capacitor 5 causing pulse timing relay WPT to immediately drop away. Thus, upon the termination of such track code pulse, the relay WTR drops away and causes the associated code pulse transmitter WCP to immediately transmit a code pulse. In the meantime, the relay EPT is being held up by its associated capacitor 29 to determine the duration of the "off" period at its location. But the reception of a code pulse energizing relay ETR opens back contact 26 to interrupt the discharge circuit of the associated capacitor 29 which causes the relay EPT to immediately drop away. Thus, upon the release of track relay ETR, the relay ECP is caused to transmit another code pulse. During this time the relay WPT is, of course, being maintained picked up by its associated capacitor 5, but the reception of a code pulse opening back contact 8 of relay WTR again causes the release of relay WPT. In this way, each location is caused to transmit a code pulse back to the other dependent upon the reception of a code pulse from the other location. This back and forth code transmission is called for convenience "dependent coding," because each code pulse transmitted is dependent upon the reception of a code pulse from the other end of the track section. So long as this dependent coding is in operation both relays EH and WH are maintained picked up and their associated signals E and W are caused to display green or proceed aspects.

It will be readily apparent from the above description that when either end of the track section is caused to cease code transmission, the other end continues to transmit code pulses independently, and these code pulses may be conveniently termed driven or independent code pulses. In the above operation a particular relationship was assumed to illustrate how the code transmitters at the two ends of the track section are quickly synchronized. In order to facilitate this, the timing operation at one location is adjusted to cause driven code pulses at a different code rate than at the other location. For example, in one embodiment the capacitor 5 and associated resistor were selected to give a code pulse rate of approximately forty pulses per minute; whereas the timing adjustment for the capacitor 29 and associated resistors at the other end of the track section were selected to give approximately thirty-four pulses per minute. It is apparent that any suitable rate could be used, but these rates were chosen merely as illustrative. While the above described operation of dependent coding is in effect, each code transmitter immediately transmits a code pulse at the termination of the reception of a code pulse, and this causes the dependent code pulses to be at a rate somewhat faster than the independent code pulses.

This principle of dependent coding is used in the signalling system of the present invention both for the track sections associated with the sidings and for the single track stretches which include several track sections so that the operation involves several repeats of the code pulses from one track to another. Where there are several repeats, the dependent coding will, of course, be slowed down by the repeating operations; but where only one track section is used the dependent coding rate may become undesirably high. If this is true, various constants in the circuits may be changed so as to make the dependent coding slower. This can be done by changing the natural timing characteristics of the code transmitting relays or the pulse timing relays.

Another way of decreasing the code rate during the dependent coding conditions is to open the jumper 6 and close the jumper 31 at the right-hand end of the track section. This causes the timing operation of relay WPT and its associated capacitor to be dominant and does not allow the transmission of a pulse until the full time has elapsed. This modification is useful in connection with siding sections so that the dependent coding rate will be held to a rate corresponding to the driven code rate transmitted by the relay WCP. In other words, the transmitting circuits for the right-hand end of the track section are capable of transmitting driven codes, but do not transmit dependent code pulses. This is because the track relay WTR cannot interrupt the timing operation when the code jumper 31 is closed.

It was pointed out above that the back contacts 30 and 9 on relays EPT and WPT respectively are for the purpose of having the associated capacitors 29 and 5 fully charged when the corresponding front contacts are closed. This is desirable if the code transmitting relays are quick to release, but if these are heavier relays which do not release too quickly, then these back contacts may be omitted, and the associated timing capacitors charged after the pulse timing relay has been picked up and before the code transmitting relay has released. This is pointed out merely to show that either arrangement may be employed. The contacts 30 and 9 of the pulse timing relays EPT and WPT cannot be eliminated by connecting the capacitors directly to the negative terminals of the associated relays because this would change the pick up time characteristics of the relays. Thus, the form shown is preferable.

OPERATION

*General (Figs. 1A–1D)*

In order that an understanding may be had as to the general mode of operation of the system of Figs. 1A–1D without considering in detail the arrangement of circuits for providing such operation, consideration will be given to the various traffic conditions illustrated in Figs. 2A to 2J inclusive, and detail consideration will be hereinafter included with respect to the circuits which provide the desired mode of operation.

Figures 2A, 2B, 2C, 2D:
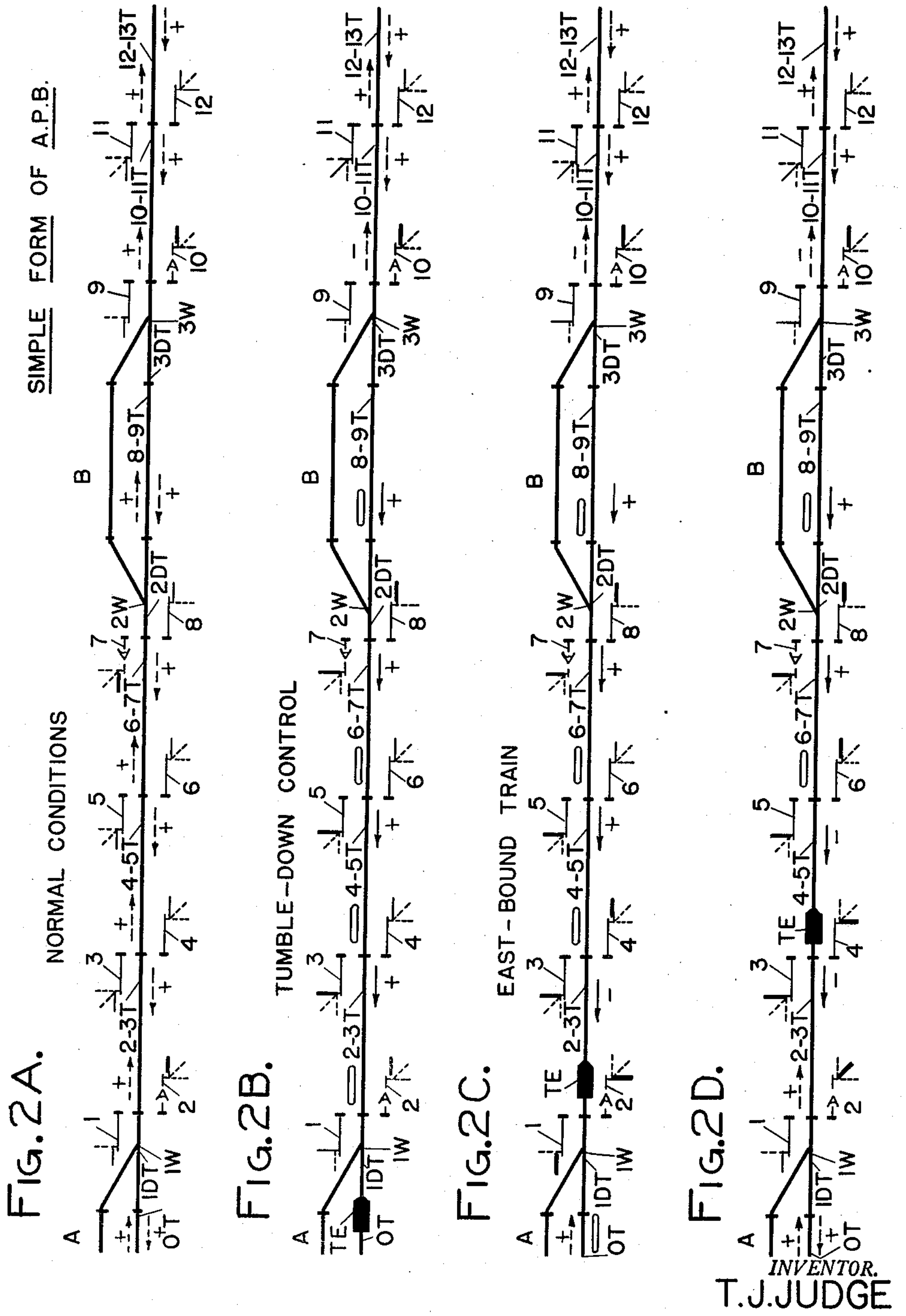

In Fig. 2A, it will be noted that all the signal controls are normally clear for both directions of traffic, but only the leaving signals at the headblock locations are actually illuminated. All of the codes are indicated as being of the dependent type by reason of the dotted arrows. The transmission of a dependent code pulse from the signal 2 through the track section 2—3T is repeated at signal 3 into the track section 4—5T. This pulse in the track section 4—5T is repeated at signal 5 into the track section 6—7T. At the signal 7 this code pulse causes the apparatus to transmit a dependent code pulse in the opposite direction which is repeated from section to section until it arrives at signal 2. This same dependent coding with the repeat operation from track circuit to track circuit is normally present in each single track stretch. In each siding section, such as track circuit 8—9T, there are no repeats so that the dependent coding is just between the opposite ends of the single section.

The polarity of the pulses in all of the track sections is positive for establishing a clearing control for the respective signals of the several different track sections. This is indicated in Fig. 2A by the symbol (+) adjacent each of the dotted arrows. All of the signals are indicated as being in their clear positions, but only the leaving signals 2, 7 and 10 are indicated (by heavy symbols) as being normally illuminated. Approach lighting is provided for the other signals and will be discussed later.

In Fig. 2B, the presence of the eastbound train TE in detector section 1DT causes the removal of the dependent eastbound coding which is indicated by the zero symbols adjacent each section. This causes a tumbledown effect so as to remove all eastbound codes right up to the track section 8—9T. This places all the west-bound signals 1, 3, 5, 7 and 9 at stop. Signal 9 at stop causes the shifting of the polarity of the code pulses in section 10—11T to (−) to place the signal 11 at caution. This tumbling down of the code in sections 2—3T, 4—5T, 6—7T and 8—9T causes the west-bound codes in these sections to be of the independent or driven type as indicated by the solid arrows. Also, the signal is caused to be illuminated by reason of the tumbledown action.

In Figs. 2C, the east-bound train TE has moved into the track section 2—3T. This causes the signal 2 to display a stop aspect. No coding is transmitted to the left in track section OT which condition holds the signal next in the rear of signal 2 at stop.

In Fig. 2D the east-bound train TE has moved into the track section 4—5T. As it passed signal 4 causing it to go to stop, a directional stick relay is picked up which applies a driven code to the track section 2—3T. This driven code is of a negative polarity to cause the signal 2 to display a caution aspect. This control of signal 2 causes a positive (+) dependent code to be transmitted in track section 0T. Also, a dependent code is returned from signal 2 of a positive polarity for clearing the signal 3 but this is prevented by reason of the picked up condition of the directional stick relay. The conditions in advance of the train TE remain the same.

Figures 2E, 2F, 2G, 2H:
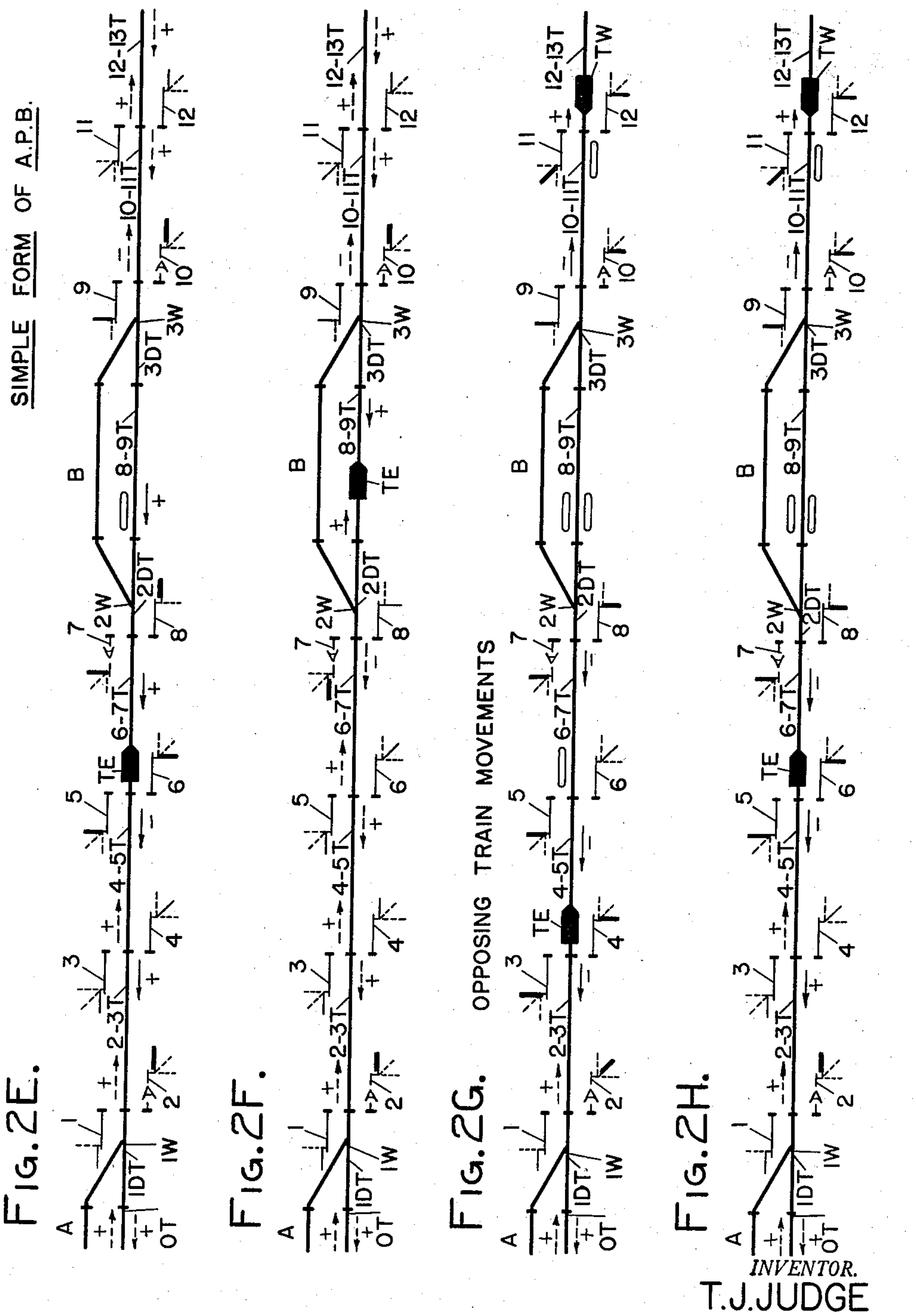

In Fig. 2E, the east-bound train TE has moved into the track section 6—7T. The passage of signal 6 causes the picking up of a directional stick relay to apply a negative driven code to the track section 4—5T. This causes signal 4 to display a caution aspect, and causes the repeated driven code in track section 2—3T to be positive for clearing the signal 2. A positive dependent code is transmitted in section 2—3T which is repeated in track section 4—5T. The presence of the negative code in the track section 4—5T causes the release of the directional stick relay associated with signal 4 so that code in section 2—3T is of the repeated type. The conditions in advance of train TE remain the same. Signal 5 cannot be cleared by the (+) code of section 4—5T because of the picked up condition of the associated directional stick relay.

In Fig. 2E, the east-bound train TE has moved into section 8—9T. This, of course, places the signal 8 at stop and allows the negative code built up in track section 6—7T to cause the release of the directional stick relay associated with signal 6 so that the repeat of the codes through all the sections of the single track stretch allows dependent coding to be established upon the reception of the first code pulse at the signal 7. The presence of the train in the track section 8—9T of course maintains the negative polarity of the west-bound code pulses in track section 6—7T to hold the signal 6 at caution. It should be readily apparent that the presence of the train TE in the track section 8—9T prevents any codes from being received by the signals 8 and 9, although driven codes are being applied to both ends of that track section opposite the siding B.

When the train moves on into the track section 10—11T, the operation for the single track stretch to the right of the siding B is the same as that already discussed for the single track stretch between sidings A and B. However, while the train is in track section 10—11T, no dependent code is transmitted to the left in track section 8—9T, so that signal 8 continues to display a stop aspect and signal 6 continues to display a caution aspect. But, when the train TE moves into track section 12—13T and beyond, coding is restored in track section 10—11T which in turn restores dependent coding in track section 8—9T. Obviously, the restoration of dependent coding in the track section 8—9T allows the signal 8 to go to clear. This causes the pulses in section 6—7T to be made positive allowing the signal 6 to clear. Although these conditions are not shown in the diagrams, it should be readily apparent by analogy to the other traffic conditions shown.

Figs. 2G through 2J illustrates how the opposing train movements are protected even though there is no double distant caution control of the type shown in the modified form of Fig. 3.

In Fig. 2G, the east-bound train TE has entered the single track stretch and proceeded up to track section 4—5T. This has caused the signal 9 to be placed at stop with the signal 11 held at caution in the same manner as discussed above. Also, a west-bound train TW entered the signal track stretch between sidings B and C (not shown). This west-bound train TW has proceeded toward the siding B up to the track section 12—13T. The tumbledown control for this train TW acts in the same way as described for the train TE. For this reason, the presence of the west-bound train TW removes the code from section 8—9T to cause the signal 8 to be placed at stop. This in turn causes signal 6 to be held at caution.

Figure 2I:
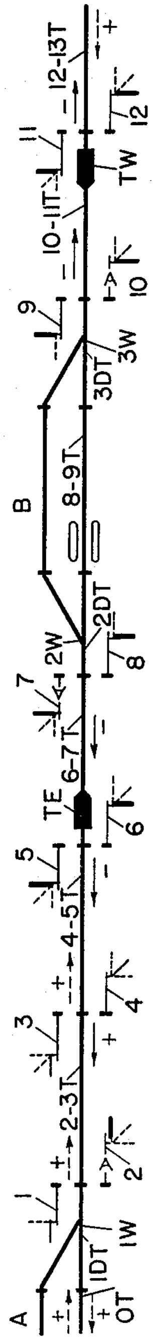
Figure 2J:
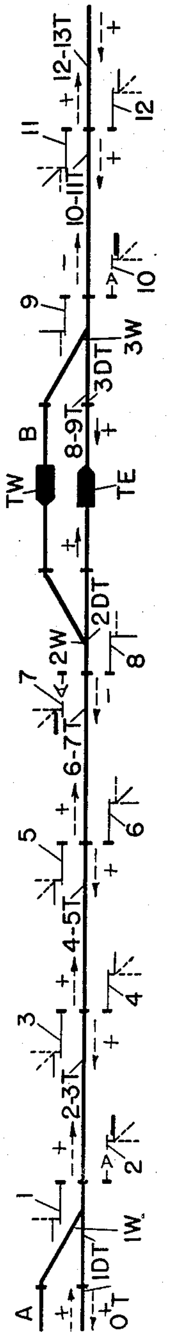

Fig. 2H shows train TE in approach to the headblock entering signal 8 at stop, where such train must stop before it can proceed. The movement of the train TE into the track section 6—7T does not change the control of the signals with respect to the opposing train TW. Similarly, the movement of the train TW into track section 10—11T does not change the aspect of the signals with respect to the opposing train TE. This is shown in Fig. 2I. Each train must stop for its respective entering signal before it may proceed. In cases of this kind the rules and regulations of the railroad determine which of the two trains, the east-bound or the west-bound, is to take the siding while the other proceeds on to the siding section 8—9T as shown in Fig. 2J to effect a passage. Both trains may then proceed to leave the siding B while the respective headblock signals 7 and 10 display their proceed aspects.

It should be noted that the operation of the system for the passage of a west-bound train is analogous to that considered for the east-bound train and has not been illustrated in the diagrams.

From the above description, it can be seen that the placing of a signal at stop causes the driven code in the track section next to the rear to be of negative polarity to effect a caution control. When a signal is at caution, it, of course, places a positive code in the next section in the rear to effect a proceed control.

*Normal conditions*

The normal conditions of the system are to be understood as those conditions which exist when there are no trains occupying any sections of the trackway. The drawings of Figs. 1A–1D illustrate this condition; and it is this condition to which the system is restored after the passage of a train in either direction, if the system is not otherwise affected by another train.

For the purpose of considering the dependent coding in the track sections constituting the stretch of single track between signals 2 and 7, it is assumed that the code transmitting relay 7CP (see Fig. 1D) has just been energized to apply a positive pulse to the track section 6—7T; and that at the other end of the stretch a code pulse had been applied but the pulse timing relay 2PT is still picked up waiting for a code pulse to be received.

As soon as the front contact 40 of relay 7CP is closed, the pulse timing relay 7PT is picked up. This connects the associated capacitor to maintain the pulse timing relay 7PT up for a predetermined time, or until released by the picking up of the associated track relay 7TR. The picking up of back contact 41 of relay 7PT deenergizes the relay 7CP and removes the positive code pulse from the rails of track section 6—7T. This positive code pulse was applied from the battery through front contacts 42 and 43 so that positive energy is applied to the upper rail of track section 6—7T. This code pulse passes through back contacts 44 and 45 of relay 6CP through the track relay 6TR and is of a proper polarity to actuate the contacts of the armature P of this track relay.

The picking up of the contact 46 of track relay 6TR causes the code transmitting relay 5CP to be energized by reason of a circuit closed from (+), through a circuit including back contact 47 of the armature N of track relay 5TR, back contact 48 of the armature P of track relay 5TR, back contact 49 of directional stick relay 5WS, back contact 50 of directional stick relay 6ES, back contact 51 of armature N of track relay 6TR, front contact 46 of armature P of track relay 6TR, back contact 52 of relay 6H, front contact 53 of relay 6D, upper winding of relay 5CP, to (−). This actuates the armature P of this code transmitting relay 5CP to open back contact 54 to disconnect the track relay 5TR and to close front contacts 54 and 55 to connect the battery to the track rails of section 4—5T. This is of the proper polarity to apply a positive pulse to the track rails which is of a short duration because it is a repeat of the pulse received over the rails of track section 6—7T, which was also of short duration for reasons above explained.

This positive pulse is received over the rails of track section 4—5T through back contacts 56 and 57 of coded transmitting relay 4CP to energize the track relay 4TR in a direction to actuate its positive armature P. This pulse is also repeated into the track section 2—3T by reason of a circuit closed from (+) and including back contact 58 of the armature N of track relay 3TR, back contact 59 of the armature P of track relay 3TR, back contact 60 of directional stick relay 3WS, back contact 61 of directional stick relay 4ES, back contact 62 of armature N of track relay 4TR, front contact 63 of armature P of track relay 4TR, back contact 64 of relay 4H, front contact 65 of relay 4D, upper winding of relay 3CP, to (−). This energization of this code transmitting relay 3CP is in such a direction, indicated by the arrow, as to actuate the positive armature P, which in turn picks up contacts 66 and 67 to apply a positive pulse to the rails of track section 2—3T.

Such positive pulse is received over the track rails of section 2—3T through back contacts 68 and 69 of code transmitting relay 2CP to energize the track relay 2TR in a direction to actuate its positive armature P. As soon as back contact 70 of the armature P of track relay 2TR is opened, the pulse timing relay 2PT is immediately released because the discharge circuit of its associated capacitor is opened. As soon as the track relay 2TR again becomes deenergized to close back contact 70 at the end of the short code pulse, the code transmitting relay 2CP is energized from (+), through a circuit including front contact 71 of relay 1SR, back contact 70 of armature P of track relay 2TR, back contact 72 of armature N of track relay 2TR, back contact 73 of relay 2PT, front contact 74 of relay 1D, upper winding of code transmitting relay 2CP, to (−). This energy flows through the upper winding in such a direction as to actuate the armature P of this code transmitting relay to pick up contacts 69 and 75 to apply a positive code pulse to the track rails of section 2—3T. As soon as front contact 76 of relay 2CP closes, the relay 2PT is energized through a circuit also including contacts 70, 71 and 72. This opens back contact 73 to terminate this reply pulse. The closure of front contact 77 of course provides that the associated capacitor will maintain the relay 2PT picked up for a period of time which may be shortened by the reception of another code pulse from the other end of the stretch. But before this happens, the code pulse applied to the rails of track section 2—3T is received by the track relay 3TR and repeated into the track section 4—5T.

The picking up of the armature P of track relay 3TR closes front contact 59 which causes the energization of the code transmitting relay 4CP through a circuit from (+) and including back contact 63 of armature P of track relay 4TR, back contact 62 of armature N of track relay 4TR, back contact 61 of directional stick relay 4ES, back contact 60 of directional stick relay 3WS, front contact 59 of armature P of track relay 3TR, back contact 78 of relay 3H, front contact 79 of relay 3D, upper winding of code transmitting relay 4CP, to (−). The energy which flows in this circuit is in such a direction as to actuate the positive armature P of the code transmitting relay 4CP to apply a positive code pulse to the rails of track section 4—5T.

The reception of the positive code pulse by the track relay 5TR closes front contact 48 which completes a circuit for the energization of the code transmitting relay 6CP from (+), through a circuit including back contact 46 of armature P of track relay 6TR, back contact 51 of armature N of track relay 6TR, back contact 50 of directional stick relay 6ES, back contact 49 of directional stick relay 5WS, front contact 48 of armature P of track relay 5TR, back contact 80 of relay 5H, front contact 81 of relay 5D, upper winding of code transmitting relay 6CP, to (−). The current which flows in this circuit is of such a direction as to cause the relay 6CP to actuate its armature P and apply a positive code pulse through contacts 45 and 82 to the rails of track section 6—7T.

This code pulse is received by the track relay 7TR which actuates its positive armature P opening back contact 83. This opens the holding circuit for capacitor associated with the pulse timing relay 7PT so that it immediately releases. Thus, upon the termination of such code pulse and the closure of back contact 83, the code transmitting relay 7CP is again energized to apply another positive code pulse.

In this way, dependent coding is effected throughout the single track stretch so that the code pulses are repeated from section to section; and the transmitter at each end replies with a code pulse as soon as it receives a pulse from the other end.

The coding operation of the contacts 84 and 85 of the positive armature P of the track relay 7TR causes the distant relay 7D to be picked up in the manner previously described in connection with Fig. 5. The closure of front contact 86 of distant relay 7D, of course energizes the green lamp G of the signal 7 to give a proceed aspect.

In a similar way, the intermittent operation of the positive armature P of the track relay 5TR operates contacts 87 and 88 to maintain picked up the distant relay 5D. The closure of front contact 89 of relay 5D prepares the circuit for the green lamp G of signal 5, but this circuit is not energized until a train enters the stretch.

Similarly, the operation of the positive armatures P of each of the other track relays 2TR, 3TR, 4TR and 6TR causes the picked up condition of the respective decoding relays D. It is believed unnecessary to describe the circuits in connection with each of the signals individually since they will be understood by analogy to the description already given.

At the west headblock signal location, the detector track section 1DT is provided with the usual normally energized track circuit having a track battery and a track relay 1DTR. The track switch 1W has the switch box 1SB connected to it. Thus, when the detector track section 1DT is unoccupied and the switch 1W is in a normal position, the stick relay 1SR is normally energized from (+) through a circuit including switch box contact 90 in a normal position, front contact 91 of detector track relay 1DTR, winding of thermal relay 1TH, front contact 92 of stick relay 1SR, contact 93 of switch box contact 1SB in a normal position, to (−). If the track switch 1W is moved to a reverse position this circuit is immediately interrupted at open contact 90 and the relay 1SR is dropped away. With the track switch 1W in a reversed position, the contacts 90 and 93 not only cause the removal of energy but also cause the relay 1SR to be shunted. It is also obvious that if the detector track section 1DT becomes occupied, the opening of front contact 91 will immediately cause the stick relay 1SR to drop away.

Regardless of whether the stick relay 1SR is dropped away by the release of the detector track relay 1DTR or the operation of the switch box contacts 1SB, the relay 1SR is not immediately picked up upon the restoration of the operated contacts; but energy is applied to the thermal relay 1TH through back contact 92 so that after a predetermined time such as five seconds, the front contact 94 is closed which completes a pick-up circuit for the relay 1SR. As soon at it picks up and closes front contact 92 the thermal relay 1TH has its energy reduced to a low value just sufficient to maintain the relay 1SR picked up but insufficient to operate the thermal relay 1TH. This allows the thermal relay to restore to its normal position, even though relay 1SR is maintained picked up. A similar circuit organization is associated with each of the other track switches, but their circuits will not be discussed in detail.

As above mentioned, the diagrams of Figs. 2A through 2J illustrate the siding B and the switch 3W and associated signals for the next single track stretch. This is provided by reproducing Figs. 1A, 1B and 1C and placing them to the right of Fig. 1D. It is of course understood that Figs. 1BB and 1CC go along with their respective Figs. 1B and 1C respectively. This provides for apparatus for the siding section 8—9T which has its left-hand end shown in Fig. 1D. The right-hand end of course will have apparatus as shown in Fig. 1A. The operation of this apparatus with respect to the siding track section has been discussed in detail in connection with Fig. 5, except with respect to the traffic control provided in accordance with this form of the invention, and this control will be discussed as the description progresses.

*Passage of an east-bound train*

In considering the passage of trains through the track layout, reference will be made to the manner in which such trains affect the various track sections by referring to the diagrams shown in Figs. 2A to 2J, inclusive; and it is to be understood that the circuits for all of the sections are similar to those provided in Figs. 1A to 1D, although some of the track sections are not shown in detail. Therefore, it is believed expedient to first consider the conditions under which code transmission is changed in various sections for the control of signal 7 upon the approach of an east-bound train in the siding A.

So long as a train is located in the siding section 0T or in the side track of siding A, it has no affect upon the coding conditions to the right of signal 2. Thus, the normal conditions illustrated diagrammatically in Fig. 2A continue.

When the east-bound train TE enters the detector track section 1DT from either the main track 0T or the passing siding, the detector track relay 1DTR is released as is also its repeater relay 1SR. The opening of front contact 71 prevents the operation of the pulse timing relay 2PT, and also prevents the supply of energy through the back contact 73 of relay 2PT and the back contact 74 of relay 1D. This prevents the transmission of dependent code pulses as previously described under normal conditions. Such removal of code pulses of course stops the operation of the track relays 3TR, 5TR and 7TR. For this reason, the respective decoding relays 3D, 5D and 7D drop away and respectively control their signals to stop aspect displaying conditions. This is conveniently termed the tumble-down control and is illustrated diagrammatically in Fig. 2B.

Obviously, as soon as the track relay 7TR fails to receive dependent coding pulses its back contact 83 remains closed, so that the pulsing or coding operation is wholly dependent upon the timing of the pulse timing relay 7PT and its associated apparatus. Although the actual rate of pulses may be slightly slower under the independent or driven code conditions illustrated in Fig. 2B and now existing with the east-bound train TE in the track section 1DT, the control of the signal aspects is wholly dependent upon the polarity of such independent code pulses so that there is no change in the signal aspects.

As shown in Fig. 2B, the tumble-down effect extends throughout the single track stretch and also includes the sliding section 8—9T. This is because the release of the decoding relay 7D opens front contact 96 and prevents the operation of the code transmitting relay 8CP and the pulse timing relay 8PT. This places the signal 9 at stop which in turn causes the dependent coding pulses in track section 10—11T to be made negative. This will be readily understood by referring to Fig. 1A where it can be seen that the deenergization of the decoding relay 1D closes back contact 74 and completes the energizing circuit for the lower winding of the code transmitting relay 2CP. Energization of this winding in the direction of the arrow causes the response of the negative armature N of this code transmitting relay 2CP. Operation of the contacts 68 and 97 causes the application of negative pulses to the track rails. By this is meant that the positive terminal of the battery is connected to the lower rail rather than the upper rail so that the current flows in the opposite direction in the track circuit and the track relay at the other end of the track section. The reception of the negative pulses at the right-hand end of the track section 10—11T causes the response of the negative armature N of the track relay 11TR (not shown) so that the decoding relay 11H is picked up rather than the decoding relay 11D (both not shown) thus causing the signal 11 to display a caution indication.

As the train TE moves to the right into the track section 2—3T, the code pulses transmitted by the code transmitting relay 3CP of Fig. 1B of course are shunted by the axles of the train which thus prevents the response of the track relay 2TR. Thus, both the relays 2D and 2H are deenergized causing the signal 2 to be placed at stop energizing the red lamp of signal 2 from (+) through a circuit including back contact 98 of relay 2D, back contact 99 of relay 2H, lamp R of signal 2, to (−). Also, after a time the reenergization of the relay 1SR is effected so that the code transmission can take place in the section 0T. This then establishes a code pulsing for the energization of the relay 1D which causes the signal 1 to be controlled and to display a clear or proceed aspect. With the train TE in the track section 2—3T this is accomplished because both of the decoding relays 2D and 2H are deenergized. This energizing circuit is closed from (+) through a circuit including back contact 100 of relay 2H, back contact 101 of relay 2D, front contact 102 of relay 1D, lamp G of signal 1, to (−). This clearing of signal 1 is desirable in the event that the train should find it necessary to reverse its direction and back into the siding A, because it could then do so under a clear signal indication if no other eastbound train were approaching.

The driven code of track sections 4—5T and 6—7T of course maintains the signals 4 and 6 clear, so that the train TE may proceed into the track section 4—5T under a clear signal 4.

With the train approaching the signal 3, the shunting of the track rails causes sufficient current to flow from the track battery as to cause the approach relay 3A to intermittently pick up and repeat the code pulses. When this happens, the directional stick relay 4ES is picked up by reason of a circuit closed from (+) and including back contact 103 of directional stick relay 3WS, back contact 104 of relay 3H, back contact 105 of relay 3D, front contact 106 of relay 4D, front contact 107 of approach relay 3A, windings of directional stick relay 4ES, to (−). These intermittent pulsations of the approach relay 3A causes the relay 4ES to be picked up and it remains picked up between successive energizations, but only so long as they continue. When the train TE moves into the track section 4—5T, the track relay 4TR of course ceases operation and this causes the relay 4D to release. As soon as back contact 106 is closed, a stick circuit also including back contact 108 of relay 4H and front contact 109 of relay 4ES is completed. Thus, the directional stick relay 4ES is maintained picked up even though the intermittent operation of the approach relay 3A ceases.

It should perhaps be noted here that when the train entered the track section 1DT and effected the tumble-down control, the release of the relay 3D completed an energizing circuit for the red lamp R of signal 3 from (+), through a circuit including back contact 110 of relay 3H, back contact 111 of relay 3D, back contact 114 of relay 3D, back contact 115 of relay 3H, lamp R, to (−). This provides for the illumination of the signal 3. A similar circuit is provided for signal 5.

When the directional stick relay 4ES is picked up it closes front contact 113 and applies energy from (+), through a circuit including front contact 113, front contact 112 of relay 4D, green lamp G of signal 4, to (−). In other words, the approach of a train in the tumble-down operation of the track circuits causes the illumination of all the opposing intermediate signals, but the picking up of a directional stick relay causes the illumination of only the associated signal. When the directional stick relay 4ES is picked up, it opens back contact 116 and thus positively prevents any possible energization of the decoding relays 3D and 3H for signal 3.

Also, the closure of front contacts 61 and 117 provide an energizing circuit for the code transmitting relay 3CP and the pulse timing relay 3—4PT so that driven code pulses are applied to the track section 2—3T in the rear of the train. More specifically, this energizing circuit for the code transmitting relay 3CP is closed from (+) through a circuit including back contact 58 of the negative armature N of track relay 3TR, back contact 59 of the positive armature P of the track relay 3TR, back contact 60 of relay 3WS, front contact 61 of relay 4ES, back contact 118 of pulse timing relay 3—4PT, front contact 117 of relay 4ES, lower winding of relay 3CP, to (−). This energization of the code transmitting relay 3CP actuates its negative armature N to close front contacts 120 and 121 to apply a negative pulse to the track section 2—3T. Assuming that the train TE has completely passed into section 4—5T, this negative pulse is received by the track relay 2TR and causes the decoding relay 2H to be operated. It should also be noted that when the train entered the track section 2—3T and prevented the reception of code pulses by the track relay 2TR, the code transmitting relay 2CP applies driven code pulses of a positive character as soon as the coding is built up in the track section 0T. Thus, the reception of the negative code pulse by the track relay 2TR opens back contact 72 and releases the timing relay 2PT and thus effects, upon the termination of such negative pulse, the transmission of a dependent code pulse.

When the negative armature N of the code transmitting relay 3CP closes its front contacts, the circuit for the pulse timing relay 3—4PT is completed through front contact 122 of relay 4ES and front contact 123 of relay 3CP. Thus, the negative pulse is terminated as soon as relay 3—4PT picks up and releases the code transmitting relay 3CP by the opening of back contact 118. It will be noted, however, that the pick-up circuit for the pulse timing relay 3—4PT includes back contacts 58 and 59 of the track relay 3TR, but the holding or capacitor discharge circuit closed by contact 125 does not. Thus, the reception of the dependent code pulse from the other end of the track section does not interrupt the timing of the relay 3—4PT. In other words, the picked up condition of the directional stick relay 4ES causes the application of a driven code to the track section 2—3T and this continues to be a driven code even though dependent code pulses are received. This has been illustrated in the diagram of Fig. 2D by the solid line arrow.

Let us assume that the train TE moves from the track section 4—5T into the track section 6—7T, as shown in Fig. 2E. The directional stick relay 6ES is picked up and the operation of the system is exactly the same as described in connection with relay 4ES. The application of the driven code to the track section 4—5T results in the picking up of the decoding relay 4H, because such driven code is of negative polarity. As soon as the relay 4H picks up, it opens back contact 108 and releases the directional stick relay 4ES. This allows the negative pulses received by track relay 4TR to be repeated into the track section 2—3T, but such pulses are of a polarity determined by the picked up condition of relay 4H so that the front contact 64 causes the code transmitting relay 3CP to transmit positive code pulses in the track section 2—3T. The reception of code pulses at the headblock signal location, continues to cause dependent code pulses to be transmitted by the code transmitting relay 2CP. These dependent code pulses are repeated into the track section 4—5T the same way as described in connection with normal conditions.

It should be noted that the reception of dependent codes by the track relay 3TR can not clear the signal 3 while the train is in track section 4—5T because the directional stick relay 4ES is picked up opening back contact 116 and preventing the response of a decoding relay. This condition also maintains these decoding relays deenergized so that the reception of such codes does not cause the interruption of the stick circuit for the relay 4ES. In this way, the directional stick relay 4ES is maintained picked up until the train TE has passed the signal 6 and a driven code is applied to the track section 4—5T.

In this same connection, and before considering the continued travel of the train TE, it should be pointed out that the application of the driven code to the track 2—3T is of a particular polarity and the accidential breaking down of the joints at the signal 4 so that such pulses can feed around into the track section 4—5T cannot be dangerous even though the passage of the train to the east end of the track section might allow such pulses to be effective to operate the track relay 4TR. This is because any such erroneous operation of the track relay 4TR would immediately cause the operation of the decoding relay 4H and this would open back contact 108 and release the directional stick relay 4ES. As soon as this directional stick relay is released, the driven code would be removed and the relay 4H would then release. Thus, the signal 4 would not be erroneously cleared due to the breaking down of the associated rail joints. In this way, the directional stick relay serves two purposes, the first providing for following train movements and the second providing for protection against broken down insulated joints.

With the train in the track section 6—7T, it is of course, approaching the clear signal 8 and can proceed into the siding section 8—9T under a clear signal indication. As soon as the train gets into such siding section as shown in Fig. 2F, and has wholly vacated the detector track section 2DT, then the code transmitting relay 7CP is effective and the normal conditions of dependent coding are established in the single track stretch. It is believed unnecessary to point out in detail how the application of code pulses to section 6—7T causes the picking up of the relay 6H and the release of the directional stick relay 6ES, since this operation is similar to that already described. This code in section 6—7T is negative (see Rig. 2F) to give signal 6 a caution control. This is because relay 8D is dropped away with the train in section 8—9T, which thus closes back contact 126.

It should be noted that as the train TE moves into the detector track section 3DT and then into the single track stretch including track section 10—11T, the relay 8D is maintained deenergized. But when the train moves into section 12—13T (this traffic condition is not indicated in the diagrams) the negative code is applied in section 10—11T to the rear of the train by the reason of the picked up condition of a directional stick relay 12ES (not shown) and this causes the picking up of the relay 10H (not shown). At such time, the code transmission in section 8—9T is restored, since the picking up of either relay 10H or 10D (not shown) closes the code transmitting circuit for the code transmitter 8—9CP (not shown), the same as illustrated by contacts 131 and 132 of relays 2D and 2H in Fig. 1A. The reception of a code by the relay 8TR causes the picking up of the relay 8D (see Fig. 1D) which not only conditions signal 8 for clearing but also shifts the polarity of the code being applied by relay 7CP to a positive polarity by reason of the closure of front contact 126. In this way, the normal conditions of the single track stretch between sidings A and B are fully restored.

*Simultaneous entry*

With reference to Fig. 2B, the east-bound train TE is illustrated as effecting a tumbledown operation which causes opposing signals for west-bound traffic to be placed at stop. It might happen that a west-bound train would enter the detector track section 2DT at the same time and cause all of the opposing signals for east-bound traffic to be placed at stop. However, if these two trains enter the sections 1DT and 2DT at the same time, it may be that they will pass their respective signals 2 and 7 before they have time to change to stop aspects.

In this situation, the two trains approach signals 4 and 5 respectively at stop. In view of the fact that these trains have not previously received caution indications, they will have to come to a stop as quickly as possible after receiving the stop indications of signals 4 and 5. This may be braking distance beyond signals 4 and 5. Because of this situation, it is obvious that signals 4 and 5 must be spaced twice the braking distance apart. This is the usual practice in connection with A.P.B. type signalling systems.

This particular condition of simultaneous entry has not been illustrated in the drawings, since the operation should be clear in view of the above description, and since the protective feature of providing double intermediate locations spaced at double braking distance is conventional practice. It is of course understood that such a simultaneous entry is rare, because it cannot happen if the trains obey their orders for meeting at a particular siding. Such a possibility is further reduced, because the tumbledown operation is effected in a minimum of time, as previously described. This is because there is merely the stopping of the code repeat without the usual cascading of the signal decoding means.

*East and west-bound trains meet*

In Fig. 2G, the traffic diagram illustrates two opposing trains TE and TW as approaching the siding B. Since the drawings of Figs. 1A through 1D correspond to the circuit organization which would also be employed between the siding B and the siding C (not shown), it may be assumed that these drawings are reproduced and that Fig. 1A also appears to the right of Fig. 7D.

The entrance of the train TE into the single track stretch results in the tumble-down operation above described removing east-bound code from each of the track sections up to and including track section 8—9T. As above described, this causes signal 9 to display a stop aspect. The signal 11 is caused to display a caution aspect. This is because signal 9 at stop causes the east code in section 10—11T to be made negative, and the absence of a west code in this section 10—11T due to train TW causes the signal 9 to be illuminated. This operation can be understood by reference to the control for signal 1 in Fig. 1A. Thus, when the west-bound train TW leaves the siding C, it not only causes the tumble-down of the west-bound codes up to and including track section 8—9T, but it finds the signals governing its movement already in proper condition for a meet at siding B.

It is believed unnecessary to discuss the operation of the circuits in detail under these various conditions which will be readily understood by analogy to the description already given. However, since the important conditions for opposing train movements is that they shall be properly protected, it is desired to point out why the signals 8 and 9 are both at stop.

Figure 1D:
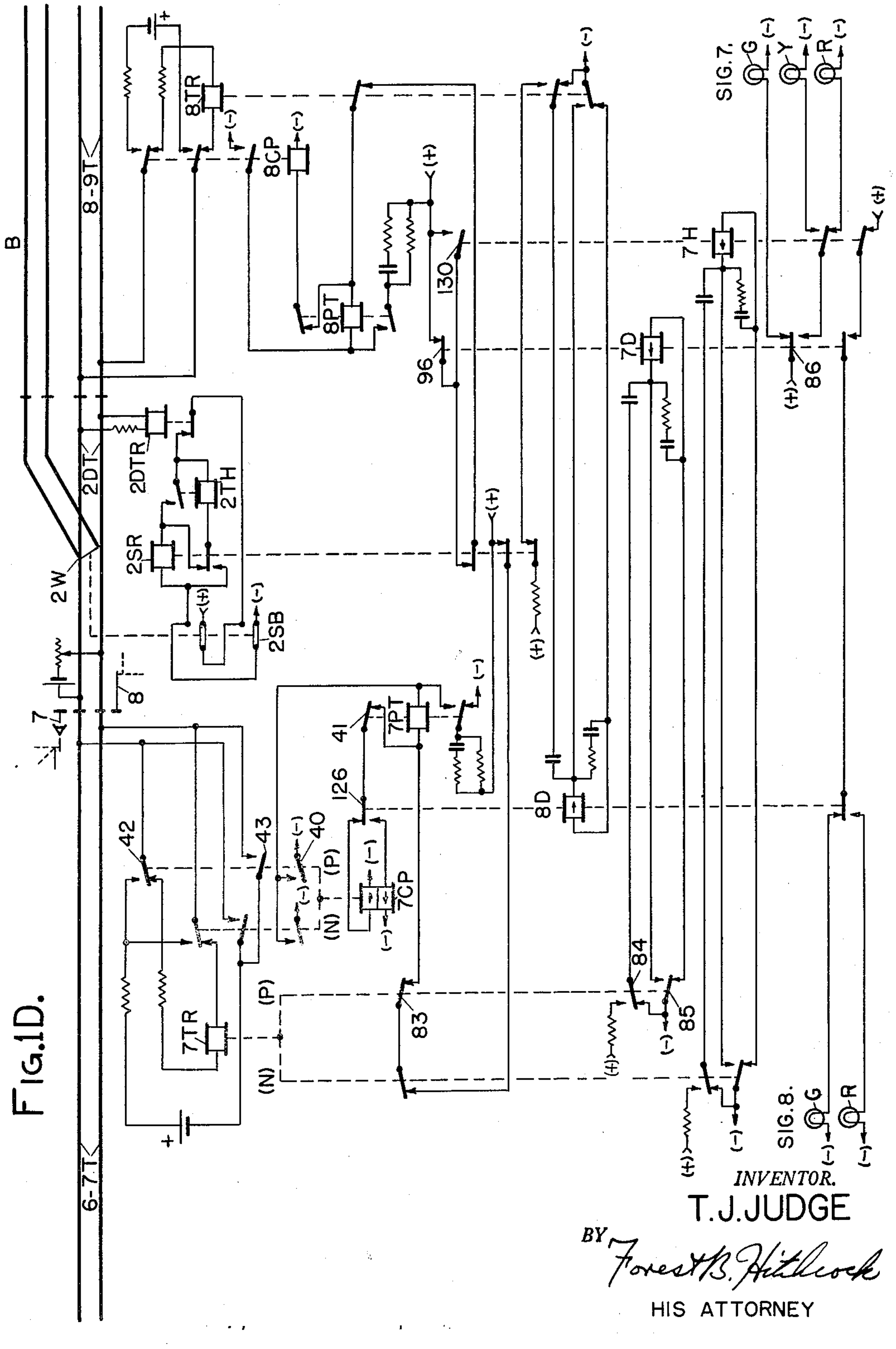
Figure 1B:
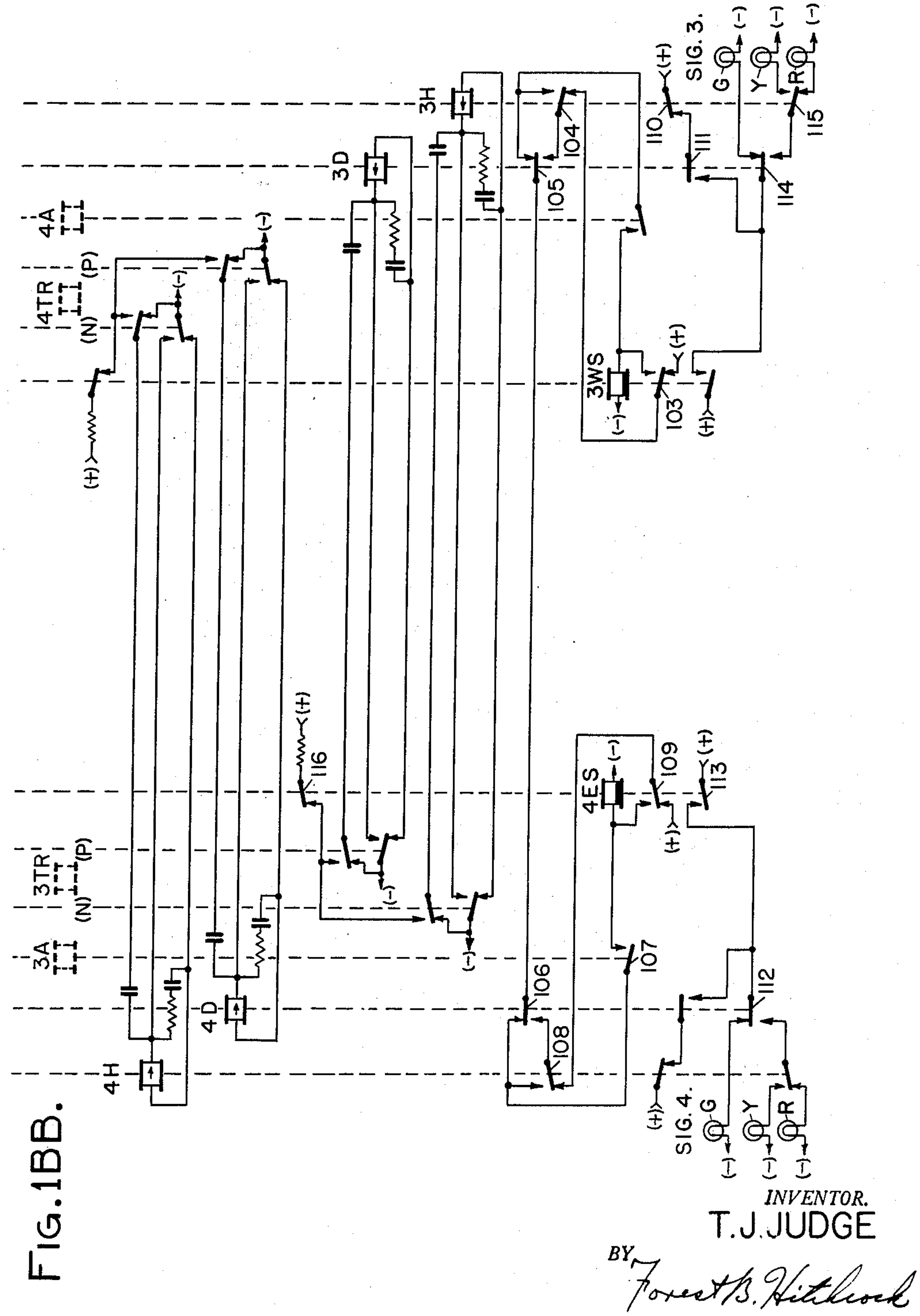
Figure 1C:
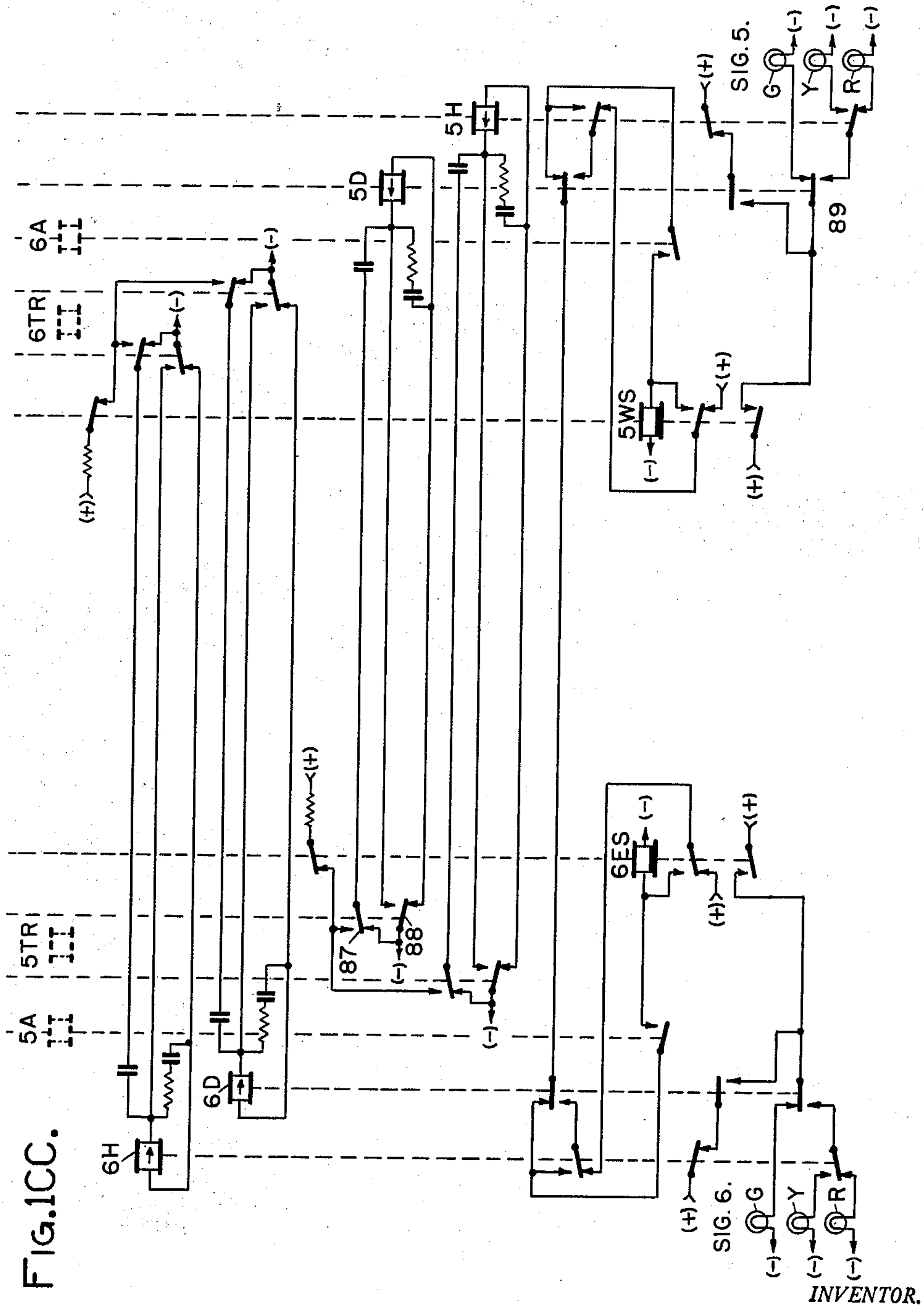

Referring to Fig. 1D, when the tumble-down action takes place, relays 7D and 7H are, of course, both released. For this reason, contacts 96 and 130 are both open and the code transmitting relay 8CP cannot be operated. This obviously prevents the transmission of codes to the right in track section 8—9T which will cause the signal 9 to display a stop indication.

Assuming that Fig. 1A is to the right of Fig. 1D and shows the east end of the siding B, then the tumble-down action which occurs for the train TW effects the release of both the relays 2D and 2H of Fig. 1A (which would be relays 10D and 10H for the selected system of nomenclature) with both the contacts 131 and 132 open. It is obvious that the code transmitting relay 0CP cannot operate with both contacts 131 and 132 open and no codes can be transmitted in the section 0T. The same is true for section 8—9T so that the signal 8 is held at stop.

In this way, opposing train movements are given full protection, and approach the entering stop signals under a caution signal aspect for the approach signals. Fig. 2H shows train TE advanced to track section 6—7T where it receives the stop aspect of signal 8, while Fig. 2I shows train TW advanced to track section 10—11T where it receives the stop aspect of signal 9. Thus, both trains must stop and proceed and respectively take the siding and the main track for passing.

General (*Figs. 3A–3H*)

In order that an understanding may be had as to the general mode of operation of the modified system of Figs. 3A–3H without considering in detail the arrangement of circuits for providing such operation, consideration will be given to the various traffic conditions illustrated in Figs. 4A to 4J inclusive, and detail consideration will hereinafter be included with respect to the circuits which provide the desired mode of operation.

Figures 4A, 4B, 4C, 4D:
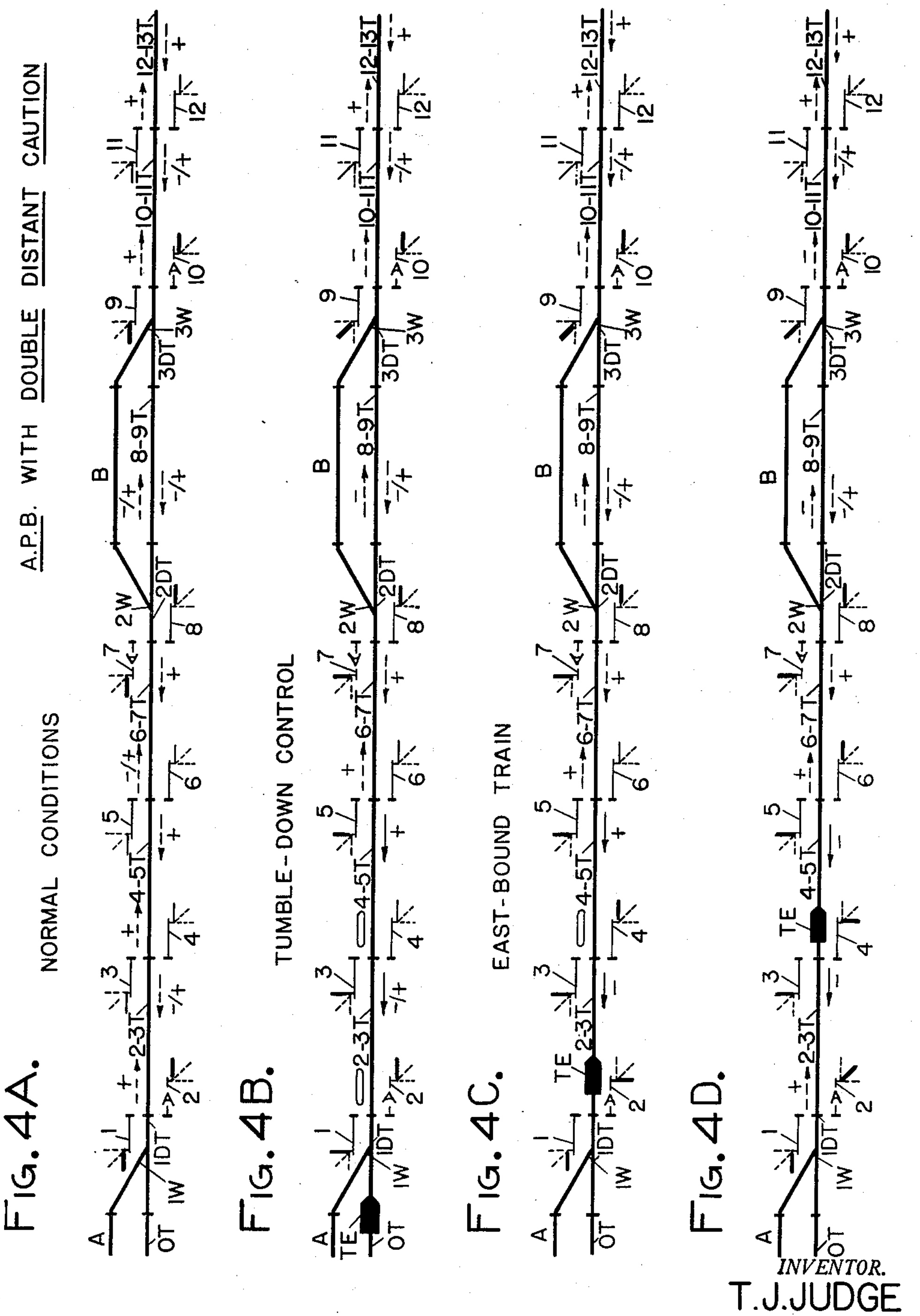

In Fig. 4A, it will be noted that all the signal controls are normally clear for both directions of traffic, but only the leaving and entering signals at the head-block locations are actually illuminated. All of the codes are indicated as being of the dependent type by reason of the dotted arrows. The transmission of a dependent code pulse from the signal 2 through the track section 2—3T is repeated in the track section 4—5T, and then into track section 6—7T. When the pulse is received at the signal 7, it acts on the apparatus in such a way as to transmit a dependent code pulse in the opposite direction which is repeated from section to section until it arrives at signal 2. This same dependent coding with the repeat operation from track circuit to track circuit is normally present in each single track stretch. In each siding section, such as track circuit 8—9T, there are no repeats so that the dependent coding is just between the opposite ends of the single section.

From the diagram of Fig. 4A, it will be observed that in the siding section the code pulses are of the double polarity type. As shown, each code pulse begins with a negative character and then shifts to a positive character. This shift between negative and positive characters is made quickly and without any substantial space between such characters, and for this reason, these quick shift type of pulses are considered as a single code pulse. They have been illustrated in the diagrams by suitable symbols (−/+) adjacent the arrows. A similar quick shift double polarity type of code is employed in one direction in both of the end track sections 2—3T and 6—7T. Since the track circuits are arranged in a similar fashion for each of the single track stretches, then it will be apparent that the track section 10—11T also employs this double character type of code.

All of the remaining sections and the codes in the opposite directions for the end sections employ the regular single polarity type of code pulse as previously described; and for the normal conditions, these code pulses are positive for establishing a signal clear condition for each of the respective signals. This is indicated in Fig. 4A by the symbol (+) adjacent each of the dotted arrows. All of the signals are indicated as being in their clear positions, but only the leaving signals 2, 7, and 10, and the entering signals 1, 8 and 9, are illuminated, and this is indicated by heavier symbols. Approach lighting is provided for the intermediate signals, as will be described later.

In Fig. 4B, the presence of the east-bound train TE in detector section 1DT causes the removal of the dependent east-bound coding in the sections 2—3T and 4—5T which is indicated by the zero symbols adjacent each section. The presence of the zero coding in section 4—5T at signal 5 causes the code in section 6—7T to be made (+). This causes signal 7 to be placed at stop, because signal 7 requires a (−/+) for a clear signal, and a (−) for a caution signal. Also, the reception of the (+) code at signal changes the code in track section 8—9T from (−/+) to (−). This particular code causes the signal 9 to be controlled to caution and in turn cause the dependent code in track section 10—11T to be made (−) instead of (+), which negative code controls signal 11 to caution. In other words, as soon as the train TE enters the detector section 1DT, the tumbledown control is effective to place all opposing signals at stop for the single track stretch in advance and at the same time cause the signals 9 and 11 to provide a double distant caution control.

In Fig. 4C, the train TE has moved into the track section 2—3T which places the signal 2 at stop; but the coding conditions for track sections in advance are not changed.

Fig. 4D shows the train TE advanced to the section 4—5T. This does not change the coding conditions for track sections in advance; but the passage of the train TE past the signal 4 picks up the directional stick relay and causes a driven (−) code to be applied to the track section 2—3T. The reception of the driven (−) code pulses at signal 2 causes a dependent positive (+) code to be transmitted for clearing the signal 3.

Figure 4E:
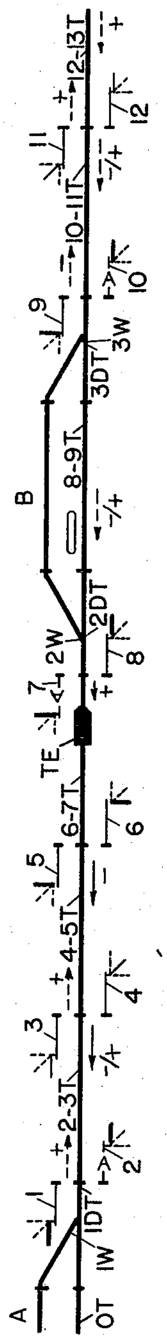
Figure 4F:
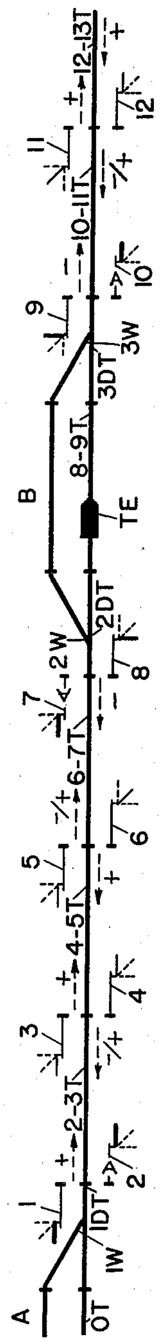

Fig. 4E shows the train TE advanced to the track section 6—7T. As soon as it enters this track section, it prevents the reception of any code pulses at the signal 7 which removes the negative code transmitted to the right in track section 8—9T. This places the signal 9 at stop, but the signal 11 remains at caution. This protects the entrance of the train TE into the siding section as shown in Fig. 4F. In addition, the passage of the train TE past the signal 6 picks up a directional stick relay for applying the negative (−) code to the track section 4—5T, which drops the directional stick relay at signal 4 and causes a (−/+) code to be applied to the track section 2—3T. A dependent (+) code is transmitted in both of these sections 2—3T and 4—5T for signals 3 and 5.

Fig. 4F shows the train TE in the track section 8—9T. This, of course, prevents the reception of code for either the signal 8 or the signal 9 which are held at stop protecting the train TE in both directions. Obviously, the signals 6 and 11 must be held at caution for any traffic that should approach these entering signals and this is done by the transmission of (−) code in the respective track sections 6—7T and 10—11T.

Figure 4G:
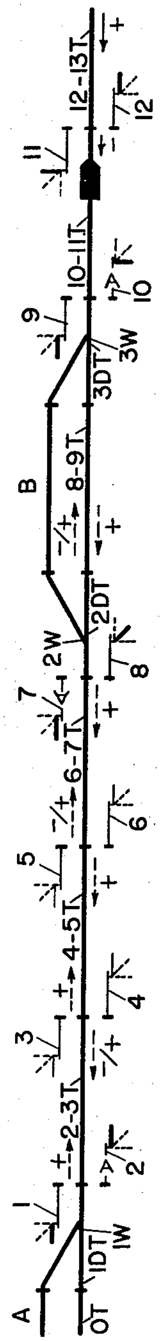

Fig. 4G shows the train TE advanced to the track section 10—11T and in passing the detector track section 3DT, a directional stick relay 3ES is picked up which causes the dependent code applied to the track section 8—9T to be positive (+). This causes the signal 8 to display a caution aspect for a following train movement and at the same time cause the code transmitted to the left in section 6—7T to be made positive (+) for clearing signal 6.

Figure 4H:
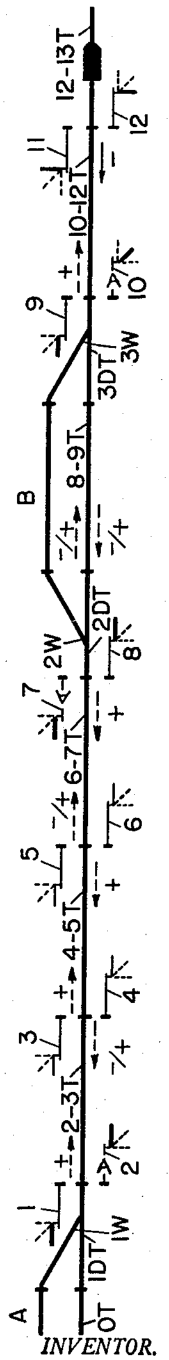

Fig. 4H shows the train TE moved into the track section 12—13T. This train in passing signal 12 has picked up a directional stick relay 12ES (not shown) for causing a driven negative (−) code to be transmitted in section 10—11T. Such negative code causes signal 10 to display a caution aspect and causes the code in track section 8—9T to be changed to a (−/+) code for clearing the signal 8. In this way, the east-bound train TE passes from section to section placing the signal next in the rear of such train at stop and causing a control of the second signal in the rear to caution; but allowing the third and subsequent signals to clear in the usual way for following train movements.

Figures 4I, 4J, 4K, 4L:
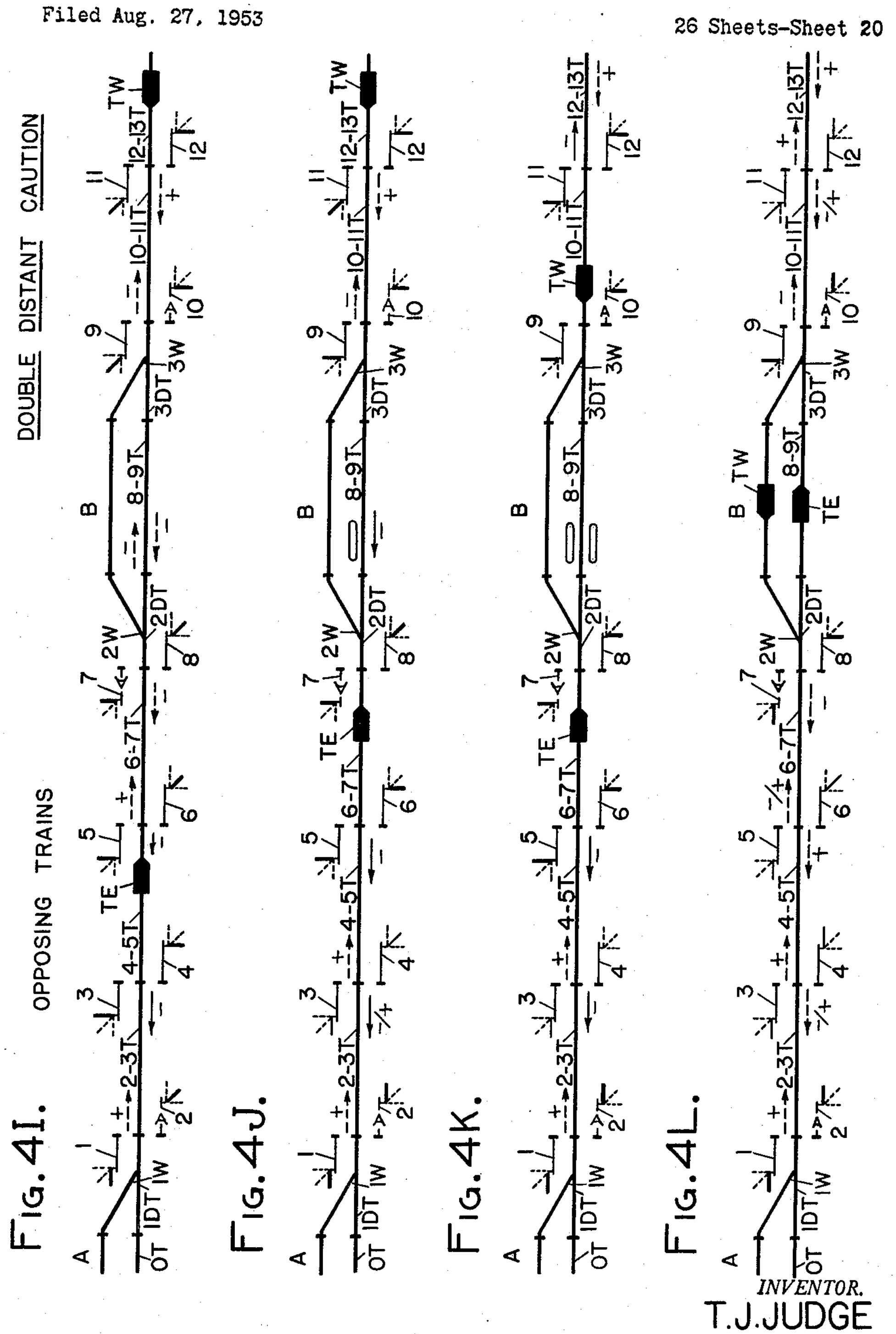

Fig. 4I shows two trains one an east-bound train TE and the other a west-bound train TW approaching the siding B. These trains have, of course, entered their respective single track stretches and caused a tumbledown operation which has resulted in the placing to stop of all opposing signals in the respective single track stretches and also causing the double distant caution control on opposite sides of the siding B. This provides that the train TE, for example, can enter the siding section 8—9T under caution signal controls prepared to stop before reaching the absolute stop and stay signal 10. Conversely, if the train TE remains in the section 4—5T, then the train TW could approach the siding B under caution signals and enter the siding section prepared to stop before passing the stop and stay signal 7.

Fig. 4J illustrates that the train TE in proceeding to accept the caution signal 6 shunts the positive code transmitted to the east in that section which in turn removes the transmission of code to the right in track section 8—9T which places signal 9 at stop. With the train TE in this position, the train TW still receives the caution indication of signal 11 and cannot enter the siding section 8—9T without stopping and then proceeding in accordance with rule upon the approach to signal 9. This protects against both trains entering the siding section at the same time under caution signals.

Fig. 4K indicates the situation in the above mentioned circumstances where the trains TE and TW both enter the sections 6—7T and 10—11T at substantially the same time. Each train acts to remove the code for its direction from the siding section 8—9T so that as each train approaches the siding section it must stop before proceeding. The trains then keep to the main track or take the siding in accordance with rule so that they may pass each other as shown in Fig. 4L.

*Normal conditions*

The normal conditions of this modified form of the system of this present invention are to be understood as those conditions which exist when there are no trains occupying any sections of the trackway. The drawings of Figs. 3A–3H together with Figs. 3BB, 3CC and 3HH illustrate this condition; and it is this normal condition to which the system is restored after the passage of a train in either direction, if the system is not otherwise affected by another train. It should be noted that the signal control circuits for the intermediate signals for this form of the invention are identical to those shown in Figs. 1BB and 1CC. More specifically, Fig. 1BB should be reproduced and placed beneath Fig. 3BB; Fig. 1CC should be reproduced and placed beneath Fig. 1C; and Fig. 1BB should also be again reproduced and placed beneath Fig. 3H. This has been indicated in the diagram of Fig. 7 showing the arrangements for the drawings.

This form of the invention in addition to using the dependent code transmitting features described in detail in connection with the form of Figs. 1A–1D, employs a quick shift in polarity for certain code pulses. This operation can be typically described in connection with the siding section 8—9T (see Figs. 3E and 3F). A similar operation takes place in connection with the end track sections such as track section 6—7T with respect to the codes transmitted to the right. In both cases, the code pulses under certain conditions are quickly shifted from a (−) character to a (+) character during the same pulse transmitting period so that the reception of this code gives a distinctive control at the receiving location, but a reply pulse is not given until after the double character type of code pulse has been completely received. Although the principle of double character code pulses is the same with respect to both siding sections and end sections of the single track stretches, the signal controls are somewhat different, which makes the circuits appear slightly different. For this reason, both forms of circuiting will be described in detail.

First let us consider the normal code transmitting characteristics of a single track stretch between signals 2 and 7 (see Figs. 3A–3D). For convenience, it is assumed that the code transmitting relay 7CP has just been energized to apply a positive code pulse to the track section 6—7T; and at the other end of the stretch a code pulse has been applied and then removed so that the pulse timing relay 2PT is still picked up by reason of its timing characteristics awaiting the reception of a code pulse before applying the next dependent code pulse.

This energization of the relay 7CP is effected over a circuit closed from (+) and including front contact 150 of relay 2SR, back contact 151 of armature P of track relay 7TR, back contact 152 of armature N of track relay 7TR, back contact 153 of track repeating relay 7TRP, back contact 154 of pulse timing relay 7PT, front contact 155 of relay 8DP, upper winding of relay 7CP, to (−). This causes the actuation of the armature P of relay 7CP to close front contacts 156 and 157 to apply a positive code pulse to the rails of track section 6—7T. At the same time, front contact 158 is closed so that an energizing circuit is completed for the pulse timing relay 7PT from (+), and including front contact 150 of relay 2SR, back contact 151 of armature P of track relay 7TR, back contact 152 of armature N of track relay 7TR, back contact 153 of track repeating relay 7TRP, windings of relay 7PT, front contact 158 of armature N of code transmitting relay 7CP, to (−).

The picking up of the relay 7PT closes its front contact 159 to connect the associated capacitor across its windings so that it performs a timing operation when the relay 7CP drops its armature P, which it does immediately because back contact 154 included in its circuit is now open. In this way, a positive code pulse is applied to the rails of track section 6—7T, and the pulse timing relay 7PT remains picked up until the reception of a dependent code pulse. (Of course, relay 7PT will remain up for only a limited time even though no return pulse is received.)

The transmission of this code pulse over the track rails causes its reception by the track relay 6TR through back contacts 160 and 161 of relay 6CP. The current flows to the right through the windings of relay 6TR and thus causes the actuation of its positive armature P. This energizes the track repeater relay 6TRP through front contact 162 of armature P of track relay 6TR. The closure of front contact 163 of the track repeater relay 6TRP completes an energizing circuit for applying a positive pulse to the track section 4—5T.

This energizing circuit for the code transmitting relay 5CP is closed from (+), through a circuit including back contact 164 of the armature N of track relay 5TR, back contact 165 of the armature P of track relay 5TR, back contact 166 of directional stick relay 6WS, back contact 167 of directional stick relay 5ES, front contact 163 of track repeating relay 6TRP, back contact 168 of relay 6H, front contact 189 of relay 6D, upper winding of relay 5CP, to (−) (see Fig. 3C). The current which flows in this circuit is in such a direction as to actuate the positive armature P of the relay 5CP to cause the application of a positive pulse to the track section 4—5T through front contacts 169 and 170.

This pulse is transmitted over the track section 4—5T and received through back contacts 171 and 172 of relay 4CP by the track relay 4TR. Being a positive pulse, the armature P of the track relay 4TR is actuated completing an energizing circuit for the code transmitting relay 3CP. This energizing circuit is closed from (+) through a circuit including back contact 173 of relay 3TRP, back contact 174 of directional stick relay 3WS, back contact 175 of directional stick relay 4ES, back contact 176 of armature N of track relay 4TR, front contact 177 of armature P of track relay 4TR, lower winding of relay 3CP, to (−). The energy in this lower winding of relay 3CP is in such a direction as to actuate the armature N of this relay 3CP to apply a negative pulse to the rails of track section 2—3T through front contacts 178 and 179.

As soon as the armature N of code transmitting relay 3CP picks up, it closes front contact 180 to complete an energizing circuit for the polarity shift relay 3PS. This energizing circuit for relay 3PS is closed from (+), through its own winding and a circuit including front contact 181 of relay 4D, back contact 182 of directional stick relay 4ES, front contact 180 of armature N of relay 3CP, to (−). While the negative pulse is applied to the track rails relay 3PS is picked up so that upon the release of the armature N of relay 3CP, which occurs very shortly in view of the fact that it is a repeated pulse, the upper winding of relay 3CP is energized in a direction to cause the application of a positive pulse through front contacts 183 and 184 to the track rails of section 2—3T. This circuit is closed from (+), through a circuit including front contact 185 of relay 4D, front contact 186 of relay 3PS, back contact 187 of armature N of relay 3CP, back contact 188 of directional stick relay 4ES, upper winding of relay 3CP, to (−). The energy which flows in this circuit is in a proper direction to actuate the armature P of the code transmitting relay 3CP. Also, this circuit includes front contact 186 which is closed only during the release period of the relay 3PS which begins with the opening of front contact 180 of the armature N of relay 3CP. Thus, this relay 3PS is made sufficiently slow releasing so that its release period will be of about the same length of time that the prior negative pulse was applied to the track rails.

Both the negative and the positive pulse are received by the track relay 2TR through back contacts 190 and 191 of relay 2CP. During the negative portion of the code pulse the armature N of relay 2TR is picked up; but this armature N is released and the armature P is picked up for the second portion of this pulse. In this way, both the decoding relays 2D and 2H receive pulses and both relays are picked up and maintained picked up by the repeated energizations that they receive due to the repeated reception of this double character type of pulse.

It should be noted that when the track relay 2TR picks up for a negative pulse, its repeater relay 2TRP is energized by a circuit closed from (+), and including front contact 192 of relay 1SR, front contact 193 of armature N of relay 2TR, windings of relay 2TRP, to (−). This circuit is opened as soon as the armature N releases, but the armature P immediately being picked up closes the circuit through back contact 193 and front contact 194. Since the relay 2TRP is slightly slow releasing, it remains picked up during this quick shift. In other words, the track repeating relay 2TRP operates the same as if the (−/+) code were a single pulse, i.e. it picks up when the negative energy is first repeated by the track relay 2TR and remains up until the track relay 2TR drops away at the termination of the positive energy received during the latter part of the code. The slow action of relay 2TRP thus masks the polarity shift during the reception of this two character code. For this reason, the dependent code pulse transmitted at this location is not applied until the relay 2TRP drops away.

More specifically, the dependent code is transmitted by reason of an energizing circuit for the code transmitting relay 2CP which is closed from (+), and through a circuit including front contact 192 of relay 1SR, back contact 193 of armature N of relay 2TR, back contact 194 of armature P of relay 2TR, back contact 195 of relay 2TRP, back contact 196 of relay 2PT, front contact 197 of relay 1DP, upper winding of relay 2CP, to (−). This energization of the relay 2CP is in such a direction as to cause its armature P to be picked up and close contacts 191 and 198 to apply a dependent code pulse which is positive in character.

It should also be noted here that the pulse timing relay 2PT is normally held up by its holding stick circuit when the code pulse of (−/+) character is received; but the opening of back contact 195 causes the opening of this holding timing circuit so that relay 2PT immediately releases in readiness for the transmission of the dependent code pulse as soon as back contact 195 closes. It is readily apparent that the application of energy through back contact 194 causes the associated capacitor to be fully charged. When the front contact 199 of relay 2CP closes, the relay 2PT is picked up and closes its front contact 200, at which time the fully charged capacitor is effective to cause this relay to remain picked up for a proper time duration for reasons previously described even though the relay 2CP is immediately released by the opening of back contact 196.

The positive dependent code pulse transmitted over the rails of track section 2—3T is received by the track relay 3TR through back contact 178 and 183. This closes front contact 201 and energizes the track repeating relay 3TRP through an obvious circuit. The picking up of contact 173 of relay 3TRP causes the transmission of a positive pulse over the track section 4—5T. This is effected by energizing the relay 4CP through a circuit from (+) and including back contact 177 of armature P of relay 4TR, back contact 176 of armature N of relay 4TR, back contact 175 of relay 4ES, back contact 174 of relay 3WS, front contact 173 of relay 3TRP, front contact 202 of relay 3D, upper winding of relay 4CP, to (−). This energy is in such a direction through the relay 4CP as to actuate its armature P closing front contacts 172 and 203 to apply a positive pulse to the rails of track section 4—5T.

This positive pulse on the rails of track section 4—5T is received by the track relay 5TR through back contacts 169 and 204 of relay 5CP. This causes the transmission of a code pulse of double character over the track rails of track section 6—7T. This is accomplished by reason of an energizing circuit for relay 6CP closed from (+) and including back contact 163 of relay 6TRP, back contact 167 of relay 5ES, back contact 166 of relay 6WS, front contact 165 of armature P of relay 5TR, lower winding of relay 6CP, to (−). The picking up of the armature N of this relay 6CP applies a negative pulse to the rails of section 6—7T through front contacts 160 and 205. As soon as front contact 206 is closed, the relay 6PS is energized by a circuit closed from (+), through its own windings and including front contact 207 of relay 5D, back contact 208 of relay 6WS, front contact 206 of armature N of relay 6CP, to (−). This energization of the relay 6PS prepares a circuit for the energization of the upper winding of relay 6CP as soon as the negative portion of the code pulse is terminated. This energy for relay 6CP flows through a circuit from (+) and including front contact 210 of relay 5D, front contact 211 of relay 6PS, back contact 212 of armature N of relay 6CP, back contact 213 of relay 6WS, upper winding of relay 6CP, to (−). This energization of relay 6CP causes the actuation of its armature P to apply the positive pulse portion of the code through front contacts 161 and 214. This pulse, of course, is terminated by the release of the relay 6PS which has proper release characteristics to give the appropriate duration to this positive portion of the code.

The (−/+) code is received by the track relay 7TR through back contacts 140 and 156 of relay 7CP. This causes the picking up of the track repeating relay 7TRP by first the closure of front contact 152 and then front contact 151. The energization of relay 7TRP and the picking up of back contact 153 opens the timing circuit for the pulse transmitting relay 7PT, and this relay 7PT is released in readiness for transmitting a dependent code pulse to the left upon the termination of the reception of the dependent code pulse from the left and the release of the relay 7TRP. When this occurs, the dependent code pulse is transmitted to the left by the relay 7CP, the same as previously described. In this way, code pulses are normally transmitted through the stretch of single track from section to section in opposite directions alternately to give the transmission of dependent codes between two headblock locations.

Since the code received by the track relay 7TR is of both positive and negative character both the relays 7D and 7H receive pulses and are maintained picked up. This closes the contacts 215 and 216 for maintaining energized the green repeater control relay 7GR, which stick circuit also includes front contact 217 and the winding of thermal relay 7TM. This maintains front contact 218 closed for energizing the green lamp G of signal 7.

This is the normal clear indicating condition of signal 7; but it is also convenient to describe the operation of these relays 7GR and 7TM at this point.

More specifically, if a positive code is received then only the relay 7D is picked up and the relay 7H is dropped away. This opens front contact 216 and releases the relay 7GR. Under this condition, the red lamp R is energized through a circuit closed from (+) and including back contact 218 of relay 7GR, back contact 270 of relay 7H, red lamp R, to (−). In this way, a stop aspect is displayed by signal 7.

If a negative code is received resulting in the picking up of relay 7H with the relay 7D released, the relay 7GR is released under this circumstance by the open condition of front contact 215. But since the relay 7H is picked up, a circuit is closed for energizing the yellow lamp Y of signal 7 from (+) and including back contact 218 of relay 7GR, front contact 270 of relay 7H, lamp Y, to (−). This causes the signal 7 to display a caution aspect.

When both of the relays 7D and 7H are picked up for the clear code of (−/+), then an energizing circuit is initially closed for the thermal relay 7TM from (+) and including front contact 215 of relay 7D, front contact 216 of relay 7TH, windings of relay 7TM, back contact 217 of relay 7GR, to (−). When the operating time of the thermal relay 7TM has elapsed, the front contact 271 is closed which completes the pick-up circuit for the relay 7GR in an obvious manner.

As soon as relay 7GR opens its back contact 217, and closes its front contact 217, a stick circuit is established for the relay 7GR, as previously pointed out, which is effective to maintain this relay 7GR energized, but which energy is below the level to maintain the thermal relay 7TM actuated. For this reason the front contact 271 is opened and the relay 7GR is wholly dependent upon its stick circuit. This organization is to prevent a flash from one signal aspect to another when the relays 7D and 7H are changing their positions. For example, the stop code of (+) might shift to a caution code of (−) in this track section in which case the relay 7H might be picked up before the relay 7D would be released. This would give an erroneous flash of green if the relays 7GR and 7TM were not employed.

It should also be noted that the relay 7HP is energized by a circuit closed from (+) and including front contact 220 of relay 7H, wire 272, winding of relay 7HP, to (−). In addition, a relay 7HDP is energized from (+), and through a circuit including either front contact 221 of relay 7D or front contact 222 of relay 7H, or both, wire 273, windings of relay 7HDP, to (−). Likewise, relay 8DP is energized by a circuit closed from (+), and through a circuit including front contact 274 of relay 8D, wire 275, windings of relay 8DP, to (−).

Figure 3E:
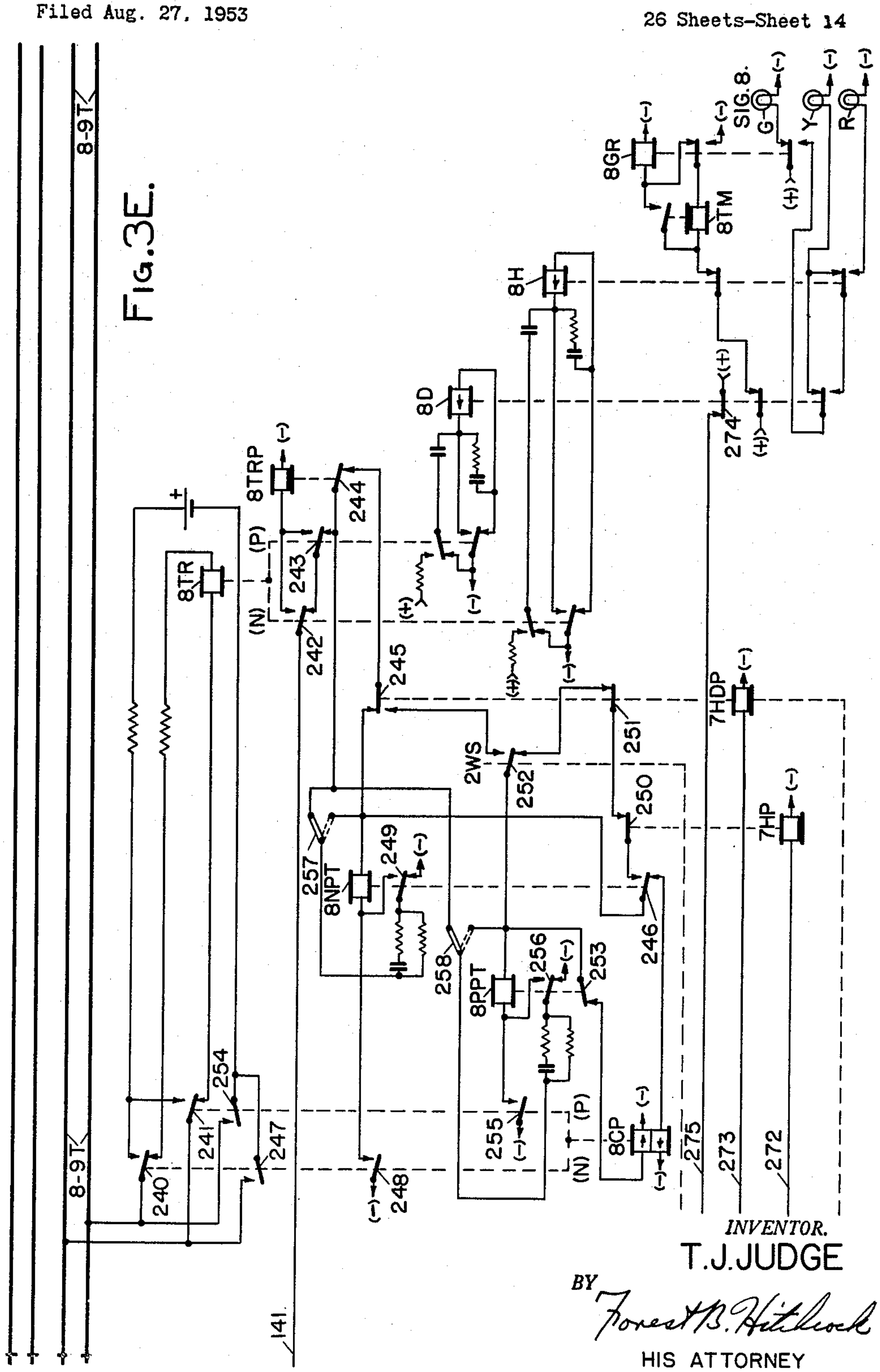
Figure 3F:
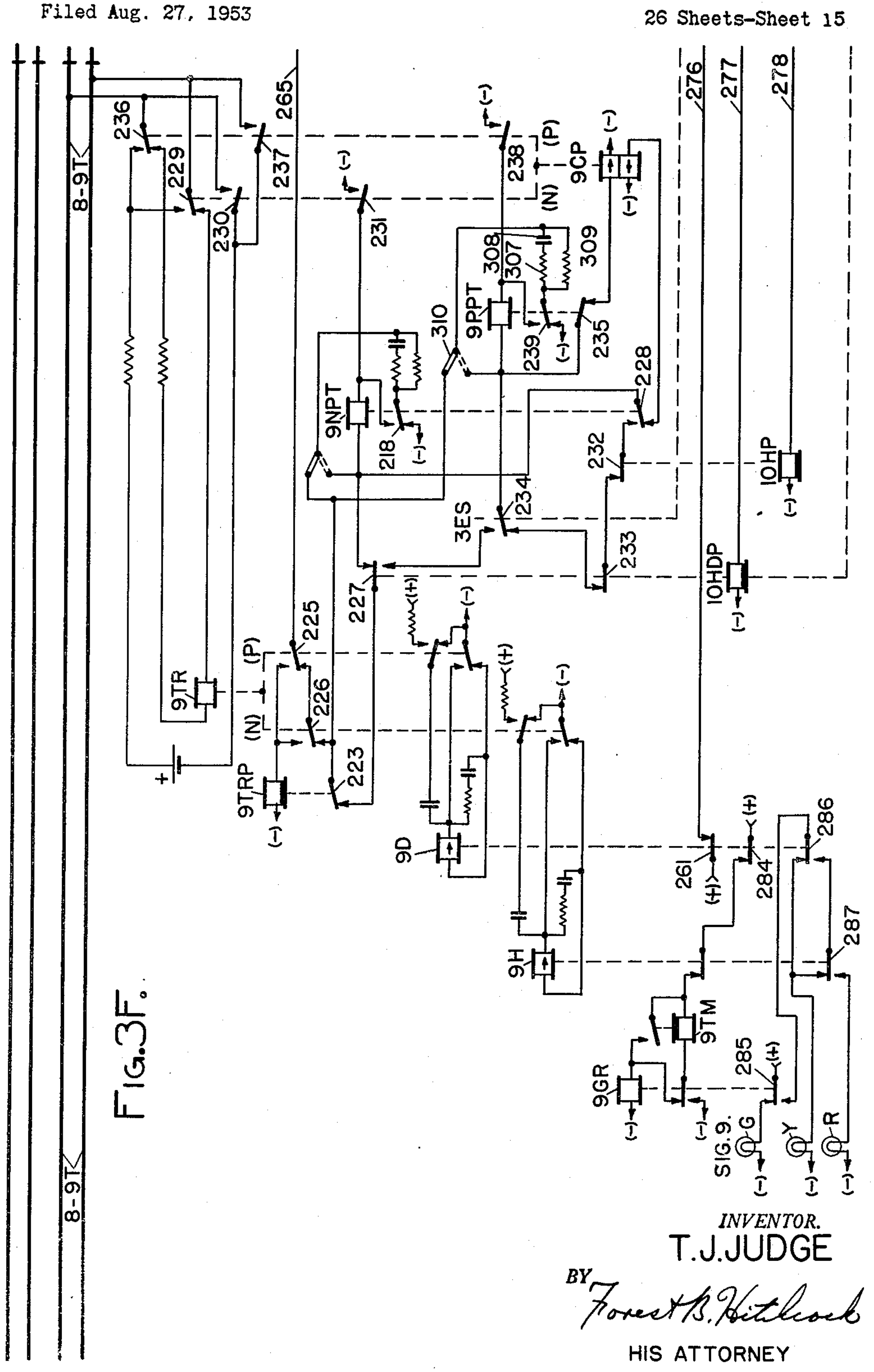

A dependent coding operation is also normally established in the siding track section 8—9T (see Figs. 3E and 3F). As indicated in Fig. 4A, the codes normally transmitted in both directions through this siding section are of the double character type.

Let us assume that the track relay 9TR and its repeater relay 9TRP have just released following the reception of a code from the opposite end of the section 8—9T (see Fig. 3F). This means then that both the relays 8NPT and 8PPT (see Fig. 3E) are being held up by the discharge of their associated capacitors to determine an "off" period during which a code pulse may be transmitted by the apparatus at the right-hand end of the section.

When the relay 9TRP closes its back contact 223, an energizing circuit is completed for the code transmitting relay 9CP, from (+), through a circuit including front contact 224 of relay 3SR (see Fig. 3G), wire 265, back contact 225 of armature P of track relay 9TR, back contact 226 of armature N of track relay 9TR, back contact 223 of relay 9TRP, front contact 227 of relay 10HDP, back contact 228 of relay 9NPT, lower winding of relay 9CP, to (−). The energy which flows in this circuit is in such a direction as to actuate the contacts of the armature N of the code transmitting relay 9CP to close front contacts 229 and 230 to apply a negative pulse across the rails of track section 8—9T.

As soon as the front contact 231 of armature N of relay 9CP closes, energy also passes through front contact 227 of relay 10HDP, and winding of relay 9NPT, front contact 231, to (−). This causes the picking up of the relay 9NPT and the opening of back contact 228 to terminate the negative (−) portion of the code. The closure of front contact 218 of course connects the associated charged capacitor across the windings of relay 9NPT, so that it is held up for a predetermined period of time, which of course may be shortened by the return code from the other end as will later be described.

As soon as front contact 228 is closed, an energizing circuit is completed for relay 9CP to actuate its armature P. This circuit is closed from (+), and including contact 224 of relay 3SR (see Fig. 3G), wire 265, back contact 225 of armature P of relay 9TR, back contact 226 of armature N of relay 9TR, back contact 223 of relay 9TRP, front contact 227 of relay 10HDP, front contact 228 of relay 9NPT, front contact 232 of relay 10HP, front contact 233 of relay 10HDP, back contact 234 of relay 3ES, back contact 235 of relay 9PPT, upper winding of relay 9CP, to (−). The energy in this circuit causes the actuation of the armature P of relay 9CP; and the closure of its front contacts 236 and 237 is effective to apply positive energy across the rails of track section 8—9T.

Also, the closure of front contact 238 of relay 9CP causes energy to flow through the same circuit up to the heel of contact 234 of relay 3ES and then through the winding of relay 9PPT, front contact 238, to (−). This actuates the contacts of the pulse timing relay 9PPT to open back contact 235 and terminate this positive portion of the code. Also, the closure of front contact 239 connects the associated charged capacitor across the windings of this pulse timing relay 9PPT so that it is maintained picked up for a predetermined time, unless released by a return code.

At the left-hand end of the track section 8—9T (see Fig. 3E) the negative portion of the code pulse is received by the track relay 8TR through back contacts 240 and 241 of relay 8CP. The negative portion of the pulse actuates the armature N of the track relay 8TR supplying a pulse to the decoding relay 8H and also energizing its repeater relay from (+) through a circuit including front contact 150 of relay 2SR (see Fig. 3D), wire 141, front contact 242 of the armature N of track relay 8TR, windings of relay 8TRP, to (−). Likewise, the positive portion of the code actuates the armature P of the track relay 9TR which in turn supplies a pulse to the decoding relay 8D. In addition, the closure of front contact 243 connects energy from wire 141 to the repeater relay 8TRP. It is noted that this repeater relay 8TRP is made slightly slow releasing so as to mask the shift of its energization between the front contact 242 and the front contact 243. At the termination of this code pulse of (−/+), both back contacts 242 and 243 are closed, and the back contact 244 of repeater relay 8TRP closes shortly and completes an energizing circuit for the code transmitting relay 8CP. Before pointing out this energizing circuit for relay 8CP, it should be noted that the reception of a code by the track relay 8TR and the picking up of relay 8TRP opens back contact 244 included in the discharge circuit of the capacitors associated with the respective pulse timing relays 8NPT and 8PPT so that these relays are deenergized in readiness for the transmission of the dependent code pulse.

As soon as back contact 244 closes, a circuit is completed for the lower winding of code transmitting relay 8CP from (+) through a circuit including front contact 150 of relay 2SR, wire 141, back contact 242 of armature N of track relay 8TR, back contact 243 of armature P of track relay 8TR, back contact 244 of repeater relay 8TRP, front contact 245 of relay 7HDP, back contact 246 of relay 8NPT, lower winding of relay 8CP, to (−). This energization is in a direction to actuate the negative armature N of the relay 8CP and close front contacts 240 and 247 to apply a negative code pulse to the rails of track section 8—9T.

As soon as the front contact 248 of the armature N of relay 8CP closes, the energizing circuit for the negative pulse timing relay 8NPT is completed by passing energy from front contact 245 through the windings of this relay 8NPT, front contact 248, to (−). As soon as the contacts of this relay 8NPT respond, it closes front contact 249 to connect the associated charged capacitor across the windings of this relay to make it slow in releasing. Also, the opening of back contact 246 deenergizes the relay 8CP and at the same time completes the circuit through front contact 246, front contact 250 of relay 7HP, front contact 251 of relay 7HDP, back contact 252 of relay 2WS, back contact 253 of relay 8PPT, upper winding of relay 8CP, to (−). The energy which flows in this circuit is in such a direction as to actuate the armature P of this code transmitting relay 8CP and close front contacts 241 and 254 to apply positive energy to the rails of track section 8—9T. Also, the closure of front contact 255 completes the energizing circuit for the positive pulse timing relay 8PPT from the heel of contact 252 through the winding of relay 8PPT and front contact 255, to (−). The actuation of this relay 8PPT opens back contact 253 to terminate the positive portion of this code pulse and closes front contact 256 to connect the associated charged capacitor across the windings of this relay so as to make this relay slow in releasing.

Perhaps it should be pointed out here that the capacitor timing unit associated with relay 8NPT is connected across its windings through front contact 249, connector 257, back contact 244 of relay 8TRP, front contact 245 of relay 7HDP to the right-hand side of this relay 8NPT. Similarly, the capacitor unit associated with relay 8PPT is connected across the windings of this relay by front contact 256, connector 258, back contact 244 of relay 8TRP, front contact 245 of relay 7HDP, front contact 246 of relay 8NPT, front contact 250 of relay 7HP, front contact 251 of relay 7HDP, back contact 252 of relay 2WS, to the right-hand terminal of relay 8PPT. In this way, both of these pulse timing relays have their associated capacitor units connected through back contact 244 of the track repeating relay 8TRP so that the reception of a code pulse from the other end of the track section 8–9T immediately causes these relays to release and prepare the associated circuits for the transmission of a dependent code at the cessation or termination of the code pule then being received.

The capacitor units associated with relays 9NPT and 9PPT are connected across these relays in a similar manner as described for relays 8NPT and 8PPT so that they will not be described in detail. However, it will be observed that the reception of the dependent code pulse by the track relay 9TR opens back contact 223 to release both of these relays 9NPT and 9PPT and prepare the associated circuits for the transmission of another dependent code pulse at the termination of the code pulse then being received.

In this way, dependent code pulses are normally transmitted back and forth over the rails of the track section 8—9T and each of these code pulses is of the double polarity character represented by (−/+). Obviously, the reception of both polarities at each end of the section causes both the relays 8D—8H and 9D—9H to be actuated and in turn maintain picked up their respective relays 8GR and 9GR. The operation of these signal control relays GR will be understood by analogy to the description given in connection with the relay 7GR. Thus, both the signals 8 and 9 are caused to normally display their clear aspects.

Figure 3G:
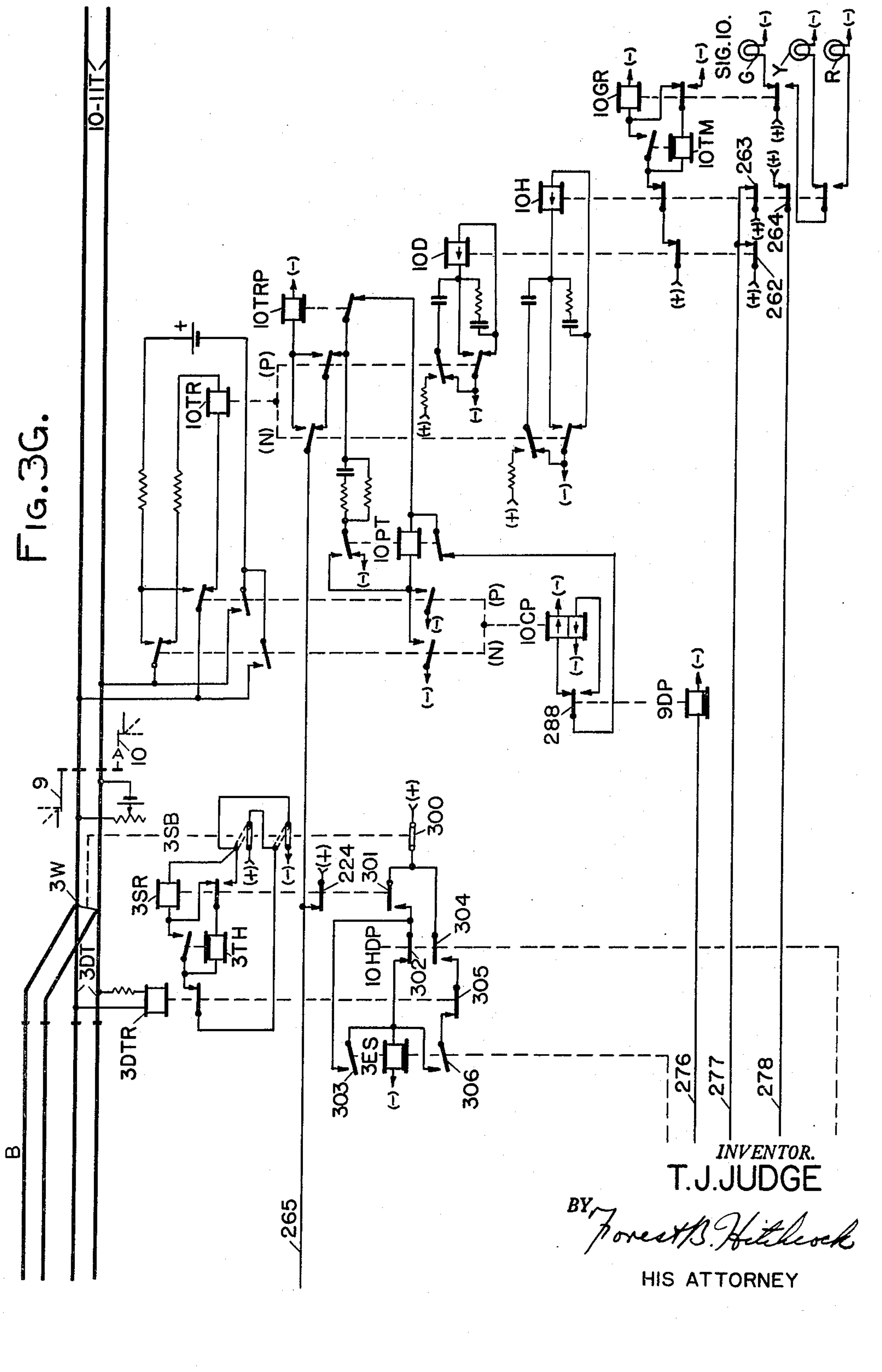
Figure 3H:
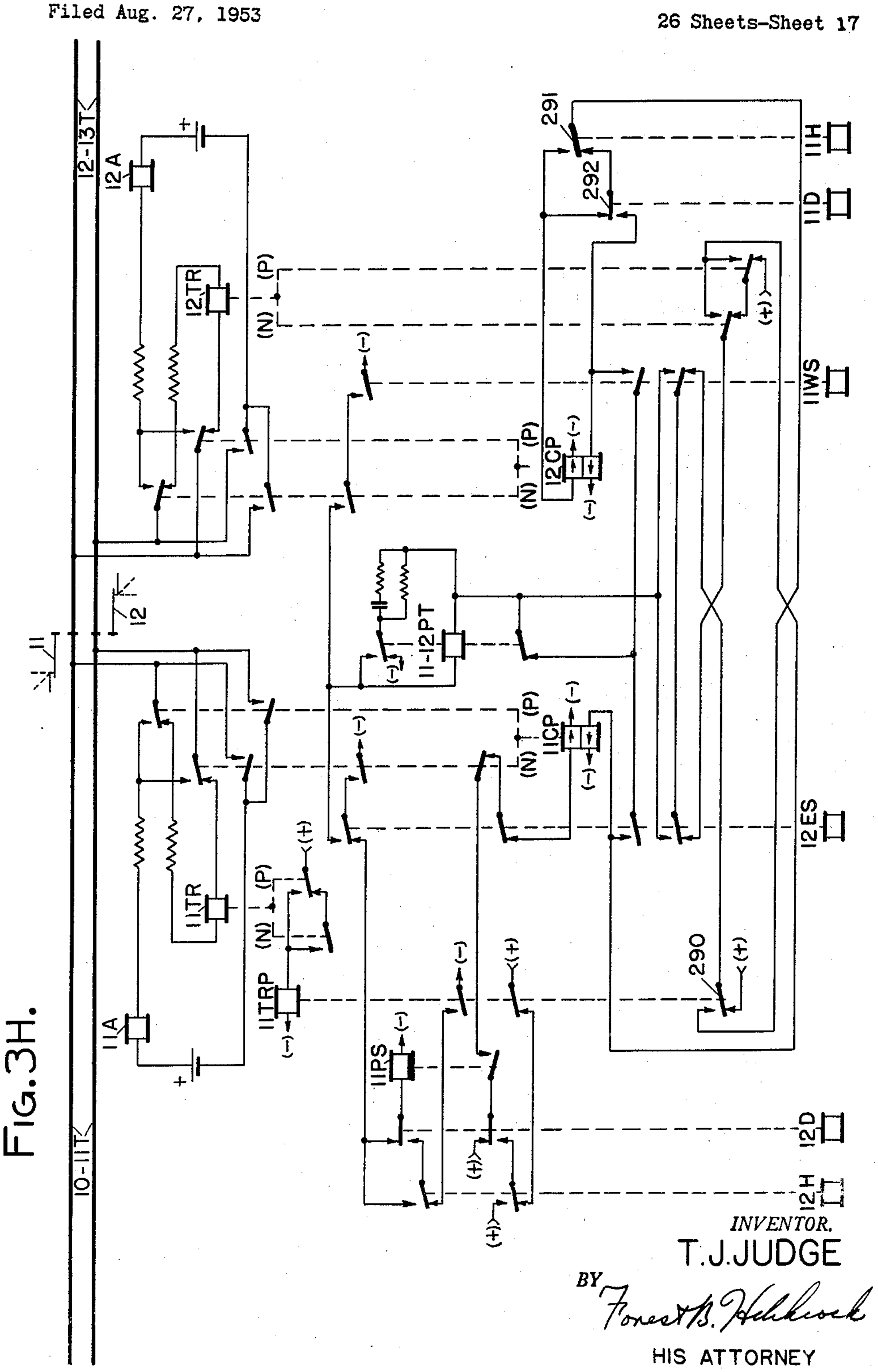

With reference to Figs. 3F and 3G it will be noted that the relay 9DP is energized through an obvious circuit including front contact 261 of relay 9D and wire 276. Also, relay 10HDP is energized over wire 277 through front contacts 262 and 263 of relays 10D and 10H respectively. An obvious circuit through front contact 264 on relay 10H is provided for relay 10HP over wire 278. Since the other circuits are merely repetition of those already described, they will be understood by analogy to the description given above. Thus, a single track railroad may have any number of sidings and single track stretches and the circuit organization for each of the different single track stretches and siding sections will merely be a repetition of those here shown and described.

With reference to Fig. 3A, it has been assumed that this siding A is a part of the complete track layout and with the same circuit organization as shown in connection with siding B; but because of the break in the system at this point, the control for the relay 1DP over wire 279 has not been shown. However, it should be understood that the control of wire 279 is exactly the same as the control of wire 276 in Fig. 3F for controlling the relay 9DP in Fig. 3G. In brief, the relay 1DP is normally energized and remains energized unless a train is approaching the siding A from the west, or unless the train is actually in the section 0T. When a westbound train is passing through the section 0T, the relay 1DP is deenergized, but as the switch at the west end of the siding A is passed (not shown), a directional stick relay WS is picked up which supplies a (+) code to the track section 0T as the west-bound train is receding from the siding. This causes relay 1DP to be picked up. Further details in connection with this control relay 1DP will be understood by analogy to the description with respect to the relay 9DP of Fig. 3G.

It should also be noted that each detector track section has associated therewith the relays SR and TH, the control of which is effected by the detector track relay DTR and the switch box contacts SB exactly the same as described in connection with the switch 1W of Fig. 1A. For this reason, description is not repeated at this point.

*East-bound train*

In considering the passage of trains through the track layout, reference will be made to the manner in which such trains affect the various track sections by referring to the diagrams shown in Figs. 4A to 4L inclusive; although in this connection only the key or main functions will be described with the transient conditions being understood by analogy to the description already given.

While a train is standing on the side track of siding A it has no effect on the system because it is assumed that such side track is not track-circuited; but if a train is standing on the siding section 0T, it prevents the reception of code at the right-hand end so that relay 1DP is deenergized. The signal 1 would be held at stop and the signal 3 would be placed at caution. This is because with relay 1DP deenergized, back contact 197 would be closed so that a negative (−) code would be transmitted to the signal 3 instead of the normal positive (+) code. Thus, a train either on the siding or on the siding section, may proceed to leave the headblock for the next adjacent siding, such as siding B, for example.

Assuming that there are no opposing trains involved, and that a train standing either on the siding A or adjacent siding section 0T, the train proceeds to enter the detector track section 1DT. If the train leaves the siding, then the switch 1W is thrown and the switch box contacts break the circuit to deenergize the relay 1SR. On the other hand, if the train is on the section 0T, then it is effective when it enters the detector track section 1DT to deenergize the track relay 1DTR which causes the opening of the circuit for the relay 1SR. In either case, front contact 192 of relay 1SR is opened which prevents the transmission of dependent codes by the relay 2CP although the associated track relay 2TR continues to receive its normal code (−/+). This causes the tumble-down control because the cessation of the tranmission of dependent code pulses by relay 2CP at the headblock signal 2 of course provides no pulses for the track relay 3TR and the relay 3D is released to place the signal 3 at stop. Also, the track repeating relay 3TRP fails to cause operation of the associated transmitting relay 4CP so that no pulses are received by the track relay 5TR at signal 5. This causes the relay 5D to release and place the signal 5 at stop. Under normal conditions, the operation of track relay 5TR is effective through the action of its contacts 164 and 165 to repeat the code pulses of track section 4—5T into the track section 6—7T. As a matter of fact, the closure of either contact 164 or contact 165 causes the energization of relay 6CP to place a (−) pulse on section 6—7T; but with relay 5D picked up, the relay 6PS is energized as soon as the negative armature N of relay 6CP is picked up and this causes a shift in the polarity with which relay 6CP is energized to thereby shift the polarity of the code pulse applied to the rails of track section 6—7T. In this way, the single character code pulse of section 4—5T is changed to a double character code for section 6—7T.

To return to the tumble-down action and the operation involved, it can thus be seen that when relay 5TR ceases to receive code pulses, then there is no repeat of such code pulses into the track section 6—7T. This cessation of coding tends, of course, to place the signal 7 to stop; but it should be noted that as soon as the relay 5D releases, the circuit organization at signal 6 is such as to cause the transmission of a positive (+) dependent code which may be present in track section 6—7T and still allow the signal 7 to go to the stop aspect displaying condition. This detailed description of this transitory change during the tumble-down operation has been made to show that the tumble-down control is effective directly to the headblock signal 7 to cause it to be placed at stop without waiting for the release of the decoding relays D and H at the several intervening intermediate signal locations. In other words, the tumble-down action is effected by stopping the transmission of pulses which are normally repeated from section to section. In the section 6—7T there is, therefore, a slight pause between the usual repeat of pulses and the presence of the positive (+) code pulses which are ineffective to clear the signal 7.

The change of the character of the code transmitted by the relay 6CP from a (−/+) code to just a positive code (+) is accomplished by reason of the release of the relay 5D so that upon each energization of the track repeating relay 6TRP a circuit is closed for energizing the relay 6PS to effect the transmission of a dependent reply code pulse when relay 6TRP releases. This circuit is closed from (+), through a circuit including the winding of relay 6PS, back contact 207 of relay 5D, back contact 280 of relay 5H, front contact 281 of relay 6TRP, to (−). In other words, the reception of a code pulse over the track rails 6—7T causes the transmission of a return positive code pulse with both relay 6D and 6H dropped away. The release of the track repeater relay 6TRP completes an energizing circuit for the transmitting relay 6CP from (+), and including back contact 282 of relay 6TRP, back contact 283 of relay 5H, back contact 210 of relay 5D, front contact 211 of relay 6PS, back contact 212 of armature N of relay 6CP, back contact 213 of relay 6WS, upper winding of relay 6CP, to (−). The relay 6CP is thus energized to actuate its positive armature P and close front contacts 161 and 214 for transmitting a positive return pulse over the rails of section 6—7T. This pulse has a duration measured by the release period of relay 6PS which of course is deenergized when relay 6TRP has opened front contact 281 and closed back contact 282.

The transition from repeated codes to dependent coding in the track section 6—7T may allow both relays 7D and 7H to release before the positive (+) code is effective to act on relay 7D; if so, relay 7D is picked up and maintained picked up as soon as the (+) code is received and so long as it continues to be received. If the relay 7D does not drop away during the transition period, and the positive (+) code is received sufficiently soon, then this positive (+) code transmitted over section 6—7T is effective to maintain the relay 7D picked up; but the relay 7H drops away. This places the signal 7 at stop by deenergizing the relay 7GR at open front contact 216. Also, the opening of front contact 220 of relay 7H deenergizes the relay 7HP. This opens front contact 250 to prevent the closure of the circuit for the upper winding of relay 8CP when the relay 8NPT has been picked up for the transmission of a negative pulse. This means then that there is a negative code transmitted over the section 8—9T instead of the normal clear code of (−/+). It is noted that relay 7HDP is slow releasing so as to mask over any temporary release of both relays 7D and 7H during the transition period of the tumble-down control.

The reception of the (−) code by the track relay 9TR maintains the relay 9H picked up but allows the relay 9D to drop away. This causes the release of the relay 9GR by the opening of front contact 284. This causes a circuit to be closed for the yellow lamp Y of signal 9 from (+), through a circuit including back contact 285 of relay 9GR, back contact 286 of relay 9D, front contact 287 of relay 9H, lamp Y, to (−). This causes the signal 9 to display a caution aspect.

The deenergization of the relay 9D causes the opening of front contact 261 and the consequent deenergization of the relay 9DP. The closure of back contact 288 of this relay 9DP causes the relay 10CP to transmit negative (−) dependent pulses instead of positive ones in the track section 10—11T. This causes the track relay 11TR of Fig. 3H to pick up the relay 11H and to drop the relay 11D which causes the signal 11 to be controlled to caution. This, however, does not change the polarity of the code transmitted by the relay 12CP. This is because the operation of the track repeating relay 11TRP intermittently closes its front contact 290 which is effective with the relay 11H picked up closing front contact 291 to continue to repeat pulses into the track section 12—13T; whereas, normally the front contact 292 of relay 11D is the one which allows pulses to be repeated. In other words, either of these relays 11HD or 11D permit pulses of either polarity in the track section 10—11T to be repeated as positive pulses in the track section 12—13T.

Referring to Fig. 4B, it can be seen that the tumble-down control has established the direction of traffic in the single track stretch between sidings A and B and has provided a double distant caution for opposing traffic on the right-hand side of siding B.

It should also be noted that the opposing intermediate signals for the direction of traffic established are caused to be illuminated by the tumble-down control. As above explained, the signal control circuits for the intermediate signals have not been shown in detail for this Fig. 3 since the signal control circuits are identical to those shown in Figs. 1BB and 1CC. As a matter of fact, Fig. 1BB may be reproduced and placed beneath Fig. 3B and except for possible alignment of the relays, will represent the actual circuit arrangement that should be employed. It should thus be seen that when the tumble-down action takes place, both the relays 3D and 3H for the opposing signal 3 are deenergized and completes the energizing circuit for the lamps of signal 3. If traffic were being established in the opposite direction, then the deenergization of the relays 4H and 4D would cause the illumination of signal 4. It is believed unnecessary to discuss in further detail the operation of the signal control circuits in connection with this form of the invention.

Referring to Fig. 4C, it will be noted that the entrance of the train TE into the track section 2—3T does not change the coding conditions in advance of the train; but the presence of the train in this track section 2—3T shunts the track rails so that the track relay 2TR does not receive any code pulses. The train having passed out of the detector track section permits the signal 1 to clear behind the train, but the operation with respect to this signal will not be described in detail since the associated signals and controls are not shown; but a corresponding operation will be described in connection with signal 9.

As the train progresses in the track section 2—3T, the increased current flow through the approach relay 3A causes it to intermittently pick up as codes are applied and it in turn causes the directional stick relay 4ES to be picked up. The operation in the picking up of this directional stick relay is exactly the same as described in connection with Fig. 1BB so that it will not be reiterated at this point. However, it should be noted that even though the code transmitting relay 3CP puts code pulses of opopsite polarities on the track rails of section 2—3T, the approach relay 3A is included directly in series with the battery so that the direction of current flow is not reversed in its windings and it remains picked up substantially steadily throughout a code period. It is of course to be understood that the series approach relay 3A may take various forms and a shunt type relay may be employed if desired.

The picking up of the directional stick relay 4ES is effective to apply negative pulses to the track section 2—3T by reason of a circuit closed from (+), and including back contact 173 of relay 3TRP, back contact 174 of relay 3WS, front contact 175 of relay 4ES, back contact 293 of relay 3—4PT( front contact 294 of relay 4ES, lower winding of relay 3CP, to (−). The application of the negative pulse to the track rails by closure of front contacts 178 and 179 is accompanied by the energization of the pulse timing relay 3—4PT. This energizing circuit is closed from (+), through a circuit including back contact 173 of relay 3TRP, back contacts 174 of relay 3WS, front contact 175 of relay 4ES, windings of relay 3—4PT, front contact 182 of relay 4ES, front contact 180 of armature N of relay 3CP, to (−). This relay 3—4PT picks up and closes its front contact 295 to connect the associated charged capacitor directly across its windings. This holds this pulse timing relay 3—4PT picked up for a predetermined time, since the discharge circuit for the capacitor cannot be interrupted. The opening of back contact 293 deenergizes the relay 3CP allowing it to release its armature N and remove the negative pulse from the track rails of section 2—3T.

It should be noted that the picking up of the armature N of the relay 3CP and closing of front contact 180 cannot energize the relay 3PS because of open back contact 182. In addition, even if the relay 3PS were picked up, it could not effect the energization of the upper winding of relay 3CP by reason of open back contact 188 of relay 4ES. For these reasons, the picking up of the directional stick relay 4ES assures the application of a driven negative code to the rails of track section 2—3T with the pulse timing relay 3—4PT determining the space between successive negative pulses.

These negative pulses are received by the track relay 2TR and causes the operation of the track relay 2TRP (see Fig. 3A). Each time this relay 2TRP is released, the relay 2CP is effective to apply a dependent reply pulse to the rails of track section 2—3T. This pulse has a polarity dependent upon traffic conditions as selected by contact 197 of the relay 1DP, but assuming the absence of any other trains, this reply pulse will be positive as indicated in Fig. 4D.

Although these reply pulses are received by the track relay 3TR which appropriately causes the relay 4D to be picked up and control the signal 3 to a clear indicating position, these pulses cannot be repeated into the track section 4—5T because of open back contact 175 of relay 4ES.

Also, with relay 4ES picked up closing front contact 113, energy is applied to the circuit for the green lamp G of signal 4 to give the east-bound train TE an indication of traffic conditions.

Referring to Fig. 4E, it will be noted that the movement of a train into track section 6—7T is effective to place a negative code in the rear of signal 6 by reason of the picking up of the directional stick relay 5ES which operates in the same manner as just described for signal 3 to apply code pulses to the track section 4—5T.

The reception of the negative code pulses in section 4—5T by the track relay 4TR causes the relay 4H to be picked up. This not only controls the signal 4 to a caution aspect displaying condition, but also causes the directional stick relay 4ES to be released by reason of the opening of back contact 108 included in its stick circuit (see Fig. 1BB and description thereof in connection with the first form of the invention). As soon as the directional stick relay 4ES is released, the reception of negative code pulses by the track relay 4TR causes the repeat of those pulses into the track section 2—3T in a manner fully described in connection with the normal conditions. But it should be noted that the pulses applied to the track section are of the double character type, i.e. a (−/+) code as indicated in Fig. 4E. This is accomplished by the action of the relay 3PS previously described. These codes are received by the track relay 8TR resulting in the transmission of reply dependent codes of positive (+) character. These dependent code pulses are repeated from track section 2—3T into track section 4—5T, as indicated in Fig. 4E. However, although a reply pulse is received by track relay 5TR for each code pulse transmitted by the relay 5CP, the timing characteristics are determined by the pulse timing relay 5—6PT, because the charged condenser when connected across this timing relay cannot have its discharging circuit interrupted by the reception of a code pulse by the track relay 5TR. It can thus be seen that each directional stick relay causes a driven code to be applied, that code has timing characteristics determined by an associated timing relay and capacitor-resistor combination. However, reply dependent code pulses are transmitted through the sections in the opposite direction dependent upon the conditions at the headblock signal location when such location receives driven code pulses. The driven code originating at signal 5 is of course necessary so that a following train could move into track section 2—3T and still approach signal 4 displaying a caution aspect.

In addition, it will be noticed that the east-bound train TE in section 6—7T prevents the reception of the (+) code which was established in that section by the tumble-down control. This causes the relay 7D to drop away, and with both of the contacts 221 and 222 open, the relay 7HDP of Fig. 3E is also released. The opening of front contacts 245 and 251 prevents the transmission of any code in the track section 8—9T. This causes the relay 9H to drop away and place the signal 9 at stop. The red lamp R of signal 9 is energized by reason of a circuit closed from (+) and including back contact 285 of relay 9GR, back contact 286 of relay 9D, back contact 287 of relay 9H, red lamp R, to (−). This placing of signal 9 at stop does not change the coding conditions in the track section 10—11T, since the negative code in that section was already present to hold the signal 11 at caution. In this way, the progress of the east-bound train in approaching the siding B establishes an overlap control for signal 9 as this train approaches signal 8.

Assuming the train moves into the siding section 8—9T, it has to pass over the detector track section 2DT. This does not pick up the directional stick relay 2WS, because the release of both relays 7D and 7H while the train was approaching in track section 6—7T caused the release of relay 7HDP, opening front contact 296 of relay 7HDP included in the pick-up circuit for relay 2WS when back contact 297 of relay 2SR is closed. However, the relay 7CP is caused to operate by reason of the local transmitting circuit characteristics previously described and this establishes the dependent coding throughout the entire stretch of single track between the sidings A and B. However, the code transmitted by relay 7CP is negative in character because the relay 8DP is deenergized with the train in track section 8—9T which prevents the track relay 8TR from receiving any codes. Back contact 155 thus causes 7CP to be energized intermittently through its lower winding to apply the (−) code pulses. This negative code picks up the relay 6H which causes the signal 6 to be controlled to caution and which is effective to cause the transmitting relay 5CP to transmit a positive code pulse for each code pulse received over track section 6—7T.

When the train TE moves from section 8—9T through the detector track section 3DT and into the track section 10—11T, the tumble-down control is established in advance the same as previously described for the train leaving the siding A. However, in this instance it is desired to point out the operation with respect to the directional stick relay 3ES (see Fig. 3G). Since the code is being received by the track relay 10TR and the relays 10H and 10D are picked up, the repeater relay 10HDP is also energized. Thus, when the train enters the detector track section 3DT and deenergizes the relay 3SR, a circuit is closed for picking up the directional stick relay 3ES. This circuit is closed from (+), and through a circuit including switch box contact 300 in a normal position, back contact 301 of relay 3SR, front contact 302 of relay 10HDP, windings of relay 3ES, to (−). As soon as the relay picks up, it closes its front contact 303 which shunts out the front contact 302 so that the relay is energized dependent upon the released condition of relay 3SR and the switch box contact 300. This circuit is maintained until the train enters the track section 10—11T at which time the relay 10HDP is released completing an auxiliary stick circuit through back contact 304 of relay 10HDP, front contact 305 of relay 3DTR, and front contact 306 of relay 3ES. However, this auxiliary stick circuit is not closed until the train has fully left the detector track section allowing the relay 3DTR to be picked up. Thus, the relay 3ES is maintained energized even though the relay 10HDP is released and even though the train moves out of the detector track section opening contact 301. When the train moves beyond the signal 11, as will be discussed later, the code is restored in the track section 10—11T so that the relay 10HDP is picked up. When this happens the back contact 301 is opened as well as the back contact 304, so that the relay 3ES can then drop away.

In the meantime, the energized condition of the relay 3ES effects the transmission of a positive code in the track section 8—9T as indicated in the diagram of Fig. 4G. This is because the front contact 234 (see Fig. 3F) is closed instead of back contact 234. In other words, the relay 9CP is provided with an energizing circuit closed from (+) and including front contact 224 of relay 3SR, wire 265, back contact 225 of armature P of track relay 9TR, back contact 226 of armature N of track relay 9TR, back contact 223 of track repeating relay 9TRP, back contact 227 of relay 10HDP, front contact 234 of directional stick relay 3ES, back contact 235 of relay 9PPT, upper winding of relay 9CP, to (−). As soon as the positive armature P picks up and closes front contact 238, the pulse timing relay 9PPT is picked up opening back contact 235 and deenergizing relay 9CP. This terminates the positive pulse.

The closure of front contact 239 of relay 9PPT connects the associated charged capacitor across its windings through a circuit from the right-hand terminal of the relay 9PPT through a circuit including front contact 239, resistor 307, capacitor 308, with multiple resistor 309, connector 310, back contact 223 of relay 9TRP, back contact 227 of relay 10HDP, front contact 234 of relay 3ES, to the left-hand terminal of this relay 9PPT. This makes the relay 9PPT slow releasing for reasons previously described so that it remains picked up until a return dependent code pulse is received opening back contact 223 of relay 9TRP.

It is noted that only positive code pulses can be transmitted by the relay 9CP at this time because front contact 227 of relay 10HDP is open and front contact 234 of relay 3ES is closed.

At the other end of the track section 8—9T, the apparatus is in condition for transmitting reply or dependent codes, which in this instance are (−/+) double character codes because the relay 7HDP is picked up as well as the relay 7HP. But it should be noted that the reception of the positive code by track relay 8TR merely causes the relay 8D to pick up and not the relay 8H. For this reason, relay 8DP (see Fig. 3D) is picked up closing front contact 155 to cause relay 7CP to transmit a positive code. This causes the signal 6 to indicate clear, whereas the positive code in section 8—9T causes signal 8 to display a caution aspect. This is because with relay 8D picked up, and not the relay 8H, the relay 8GR is deenergized opening the circuit for the green lamp G of signal 8 and closing the circuit for the yellow lamp Y of signal 8.

When the train passes the signal 12, the directional stick relay 12ES is picked up and maintained picked up in a manner analogous to the directional stick relays at the intermediate signals as previously described. This causes a (−) code to be transmitted in the rear of the train as indicated in Fig. 4H. The reception of this code causes the picking up of the relay 10H and not the relay 10D. This causes the signal 10 to display a caution aspect, but the picking up of the relay 10H closes its front contact 264 to energize the relay 10HP over the wire 278, and also closes contact 263 for energizing relay 10HDP over wire 277. This completes the circuit at front contacts 232, 233 and 227 for the transmission of the (−/+) code in the track section 8—9T.

From the above description, it will be appreciated that as the train TE moves past the siding B, the signals are controlled in the rear of it in the usual way to provide two block protection, i.e. a stop signal immediately in the rear of the train with the next signal in the rear displaying a caution aspect. This is in distinction to the form shown in Figs. 1A to 1D where the presence of the train in section 10—11T places the signal 10 at stop and also the signal 8. Obviously, this does not allow the following train to approach as closely as does the present form under discussion.

It will be observed that a directional stick relay is provided for each end of a siding and such directional stick relay for any given end is picked up only when a train is leaving the siding at that end. The control of such directional stick relay is then such as to transmit a special code through the siding section 8—9T, for example, as to cause the signal at the other end to display a caution aspect and allow a clearing code to be transmitted in the rear.

*West-bound train movement*

It is believed that the operation of the system for west-bound train movements should be readily understood by analogy to the operation for an east-bound train movement since the system is entirely symmetrical and corresponding operations would take place but merely in connection with the opposite direction. However, for the purpose of considering such west-bound operation it may be expedient to indicate that this can probably be best understood by considering a train as moving from the side track of siding B westward over detector track section 2DT and onto the track section 6—7T. Such a train movement would cause the picking up of the directional stick relay 2WS which when the train was wholly in the track section 6—7T would cause a (+) code to be transmitted to the right in the track section 8—9T to cause signal 9 to display a caution aspect. The tumble-down operation would be effected to the left in a way analogous to the operation as previously described.

*Opposing train movements*

Fig. 4I illustrates an east-bound train TE in the track section 4—5T and a west-bound train TW in the track section 12—13T. It will be noted that each train effected its tumble-down control in advance toward the other train, so that each train on opposite sides of the siding B is approaching a signal displaying a caution aspect. This was illustrated for a single train in Figs. 4B through 4D bringing the train TE to the location here illustrated in Fig. 4I. It will be noted that the train TE in Fig. 4D caused the code pulses being transmitted to the right in track section 8—9T to be negative in character while the code pulses being transmitted to the left are a double character (−/+) code. The presence of the train TW causing a similar tumble-down control of course shifts this code and thus results in a negative code for the codes being transmitted in opposite directions in the section 8—9T.

In this manner, both opposing train TE and TW approach the siding B under caution signals 6 and 11 respectively. There is still coding in the track section 6—7T for detecting the entrance of train TE and removing the transmission of code to the right in section 8—9T to place signal 9 at stop. This is illustrated in Fig. 4J.

This is accomplished by reason of the fact that the entrance of the train TE into the track section 6—7T shunts the track rails so that the track relay TR is no longer operated. This allows the relay 7H and the relays 7HDP and 7HP to drop away. The opening of contact 245 prevents the transmission of the negative code in the track section 8—9T. Failure of the track relay 9TR to receive the negative code obviously allows the relay 9H to release and with both the relays 9H and 9D released, the signal 9 is caused to indicate a stop aspect.

The entrance of the train TW into the track section 10—11T either before or after the train TE has entered the track section 6—7T causes the signal 8 to be placed at stop. This is accomplished because the entrance of the train TW shunts the rails of track section 10—11T and prevents operation of track relay 10TR. This causes the relay 10D to be released and drop the relay 10HDP which opens front contact 227 to prevent the application of a negative code to the track section 8—9T by the code transmitting relay 9CP. The absence of this (−) code in section 8—9T of course prevents operation of the track relay 8TR and allows the relay 8H to be released. With both relays 8H and 8D released, the signal 8 is caused to display a stop indication.

Thus, as indicated in Fig. 4K, both trains TE and TW approach stop signals 8 and 9 at opposite ends of the siding B. Each train may stop and proceed and take the appropriate track as indicated in Fig. 4L.

Thus, this form of the invention provides a double distant caution control with sliding overlap to give all the necessary features of protection for opposing train movements and yet at the same time permit following train movements with the usual block spacing for such following train movements.

It should be noted that for the following train movement the passage of a train past an intermediate signal location picks up a directional stick relay such as 4ES, the same as pointed out in connection with Figs. 1B and 1BB. This applies the proper code in the rear of the signal 4 when the train has wholly passed that signal as indicated in Fig. 4D. This is a code with (−) code pulses.

Assuming that the train moves along in track section 4—5T to a point where it fails to adequately shunt the track rails in the event the joints at signal 4 should be broken down and allow the negative code pulses to be received by the track relay 4TR, such energization of the track relay 4TR would cause the picking up of the relay 4H and open the back contact 108 included in the stick circuit for the directional stick relay 4ES (see Fig. 1BB). The consequent release of this directional stick relay 4ES of course removes the negative code being applied to track section 2—3T by reason of the opening of front contact 294 (see Fig. 3B). This removal of the negative code as applied to the track section 2—3T would of course stop and feed around code to the track relay 4TR, and the relay 4H would drop away to the condition that it should assume with the train in the leaving end of track section 4—5T. From this it will be seen that the erroneous picking up of the relay 4H would only temporarily cause the signal 4 to give a caution signal aspect due to the broken down joint condition. This then renders the system entirely safe in so far as the possible breaking down of insulated joints is concerned.

In this connection, it will be noted that the siding section 8—9T is isolated from the other coding track circuits by reason of the normally energized direct current circuit at either end, i.e., track section 2DT and 3DT.

*Modification of Figs. 6B, 6BB, 6C and 6CC*

Figure 6C:
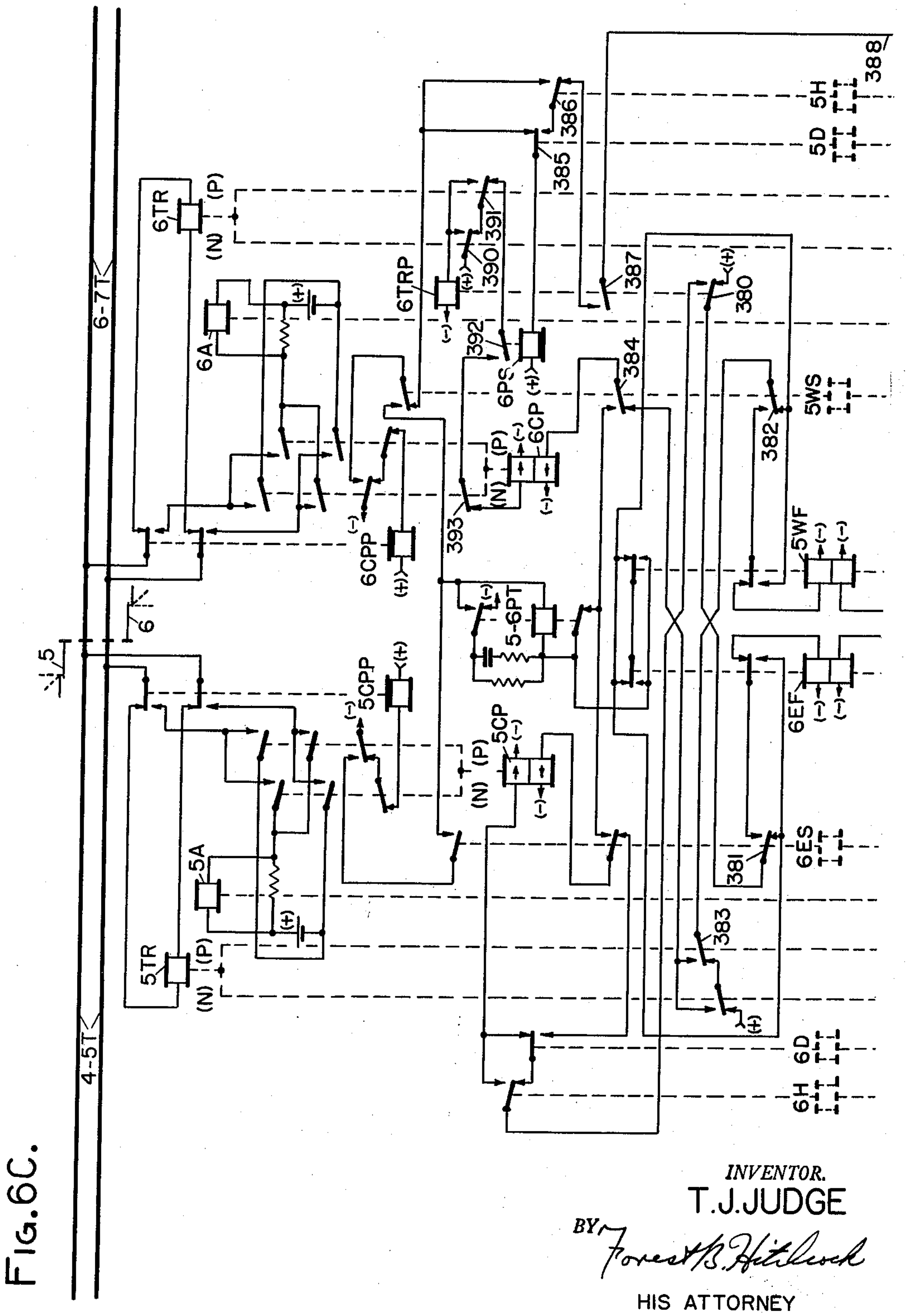
Figure 6C:
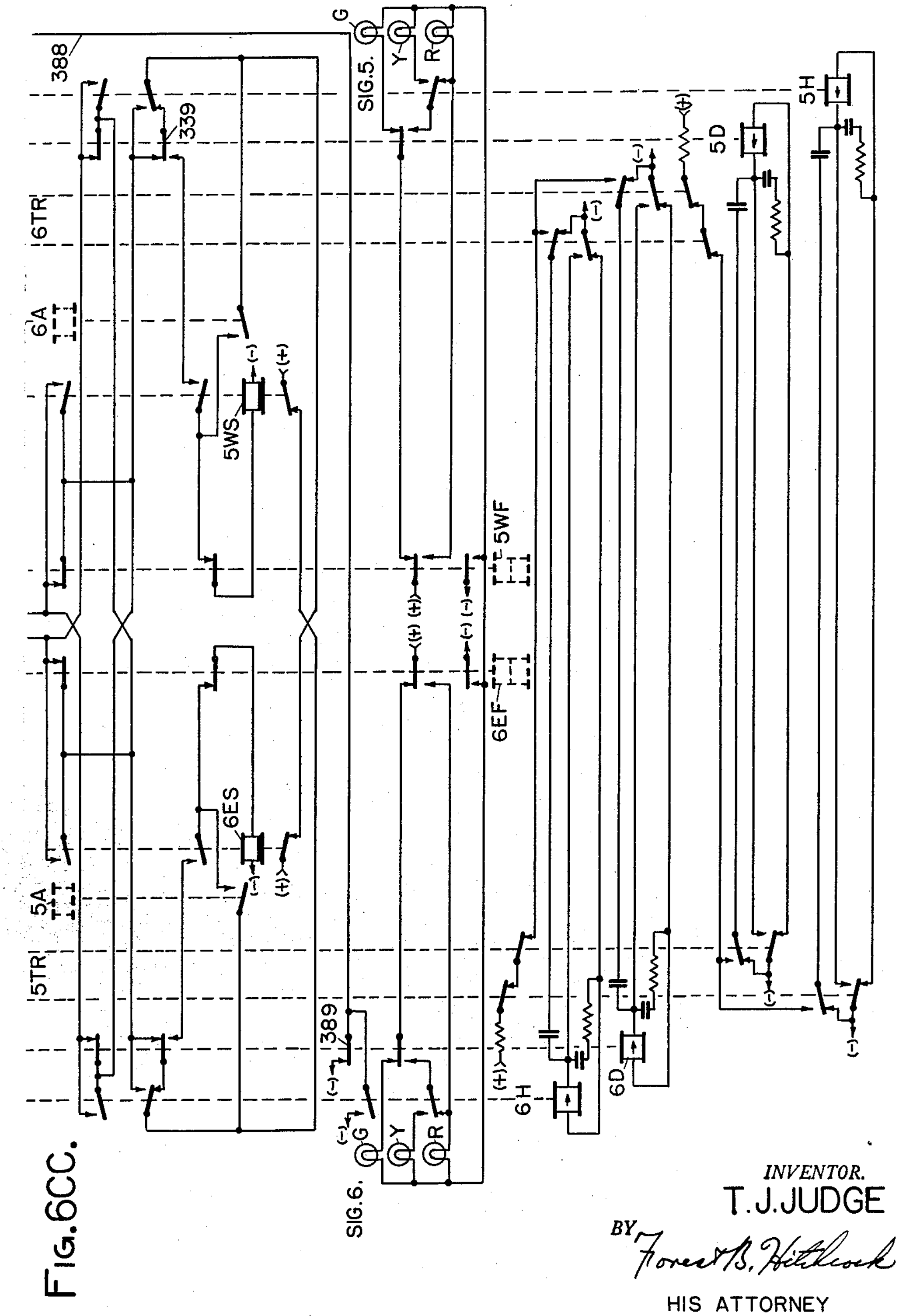

The control of the apparatus at the intermediate signal locations in each track stretch of the Figs. 3A–3H may have their circuit organizations modified by substituting Figs. 6B and 6BB for Figs. 3B and 3BB; Figs. 6C and 6CC for Figs. 3C and 3CC. Also, Figs. 3H and 1BB may have substituted therefor Figs. 6B and 6BB. This modified form of the invention has the same general operating characteristics as previously described for Figs. 3A–3H; but there are certain refinements in operation and certain added protective features against failures and improper traffic movements which are useful in an absolute permissive block signalling system.

In the two forms of the invention already described, the driven code applied at an intermediate signal location after the train passes that location and picks up a directional stick relay is protected against a broken down insulated joint. As previously explained, if the driven code feeds around the joint and operates the track relay in advance of the signal, such operation results in the release of the directional stick relay and the removal of the driven code. This circuit organization and use of the directional stick relay is entirely safe as above explained; but it is noted that during the process of elimination of the driven code during such broken down joint protective operation, the signal does clear momentarily. This modification of Fig. 6 prevents such momentary clearing of the signal even though the directional stick relay is dropped away as a result of the driven code feeding around broken down joints.

In addition, there are certain traffic conditions which may take place due to a combination of circumstances when a directional stick relay fails to pick up for which this form of the invention gives proper protection. These circumstances will not be described here, but it is desired to point out that this modification of Fig. 6 prevents any undesirable reversal of traffic direction in a single track stretch even though a directional stick relay should fail to be picked up.

These added features are accomplished by the provision of two traffic direction relays for each intermediate signal location. These two traffic direction relays are normally energized through stick circuits and when the tumble-down operation takes place for one direction of traffic, the traffic direction relays for the opposing direction are released. The circuits are then so organized that these traffic direction relays are restored to picked up conditions one at a time as the train passes through the sections of the associated single track stretch. Since the circuits are also organized so that a signal cannot be cleared unless its associated traffic direction relay is picked up, it is then obvious that the direction of traffic in a single track stretch cannot be erroneously reversed while it is occupied by a train.

Another feature included in this modification of Fig. 6, is that the decoding apparatus can respond at an intermediate signal location only when the track relays on its side of the insulated joint operate without the operation of the track relays on the opposite sides of the insulated joints. In the normal operation, the codes are repeated section by section through the single track stretch in first one direction and then the other. This means that the track relays for opposite sides of the insulated joints at an intermediate signal location do not operate at the same time. Should an insulated joint be broken down, and the pulses tend to repeat past that joint so as to operate the two track relays at the same time, it is obvious that the interlock above mentioned prevents the decoding apparatus for either signal from responding.

The apparatus at a double intermediate signal location in this Fig. 6 form of the invention is substantially the same as pointed out in connection with Figs. 3B and 1BB, but such apparatus has its circuit connections somewhat changed. The apparatus of Figs. 6B and 6BB has been given exactly the same letter reference characters for the corresponding parts, but the circuits will be described by using different numeral reference characters. The two additional traffic direction relays 4EF and 3WF are provided at the signal location of Fig. 6B. A similar pair of additional relays is also provided at the double intermediate signal location of Fig. 6C. Since these two locations of Figs. 6B and 6C are substantially the same except that they are organized for association with the opposite end sections, their circuits are substantially the reverse of each other. Thus, although both locations have been shown in detail, the description will be mainly with respect to Figs. 6B and 6BB.

In addition to the traffic direction relays, this form of the invention also provides repeating relays for the code transmitting relays. For example, relay 3CPP is a repeater of the relay 3CP. Likewise, relay 4CPP is a repeater of the relay 4CP. These repeater relays are normally energized and are provided with slightly slow pick up timing characteristics so as to slightly delay the connection of the associated track relay to the track rails following the connection of the associated track battery to the track rails.

This provides time for the charge on the track rails to have its peak value dissipated by leakage through the ballast before the track relay is connected to the track rails. This charge may be due to any one of several causes, such as the inductive effect of current flowing in the rails, the possible electrolytic action of the ballast, the capacitive effect of the two parallel rails, or some other unknown factors. Regardless of the cause, this charge usually has a peak value immediately upon the disconnection of the track battery, and by providing a very short interval of time before the track relay is connected, the ballast leakage tends to reduce such charge to a value ineffective to operate the track relay. In this way, the track relay is protected against erroneous operation.

The track relay 3TR is normally connected to the track section 2—3T through front contacts 320 and 321 of relay 3CPP. This relay 3CPP is normally energized from (+) and through a circuit including windings of relay 3CPP, back contact 322 of armature P of relay 3CP, back contact 323 of armature N of relay 3CP, to (—).

It is therefore apparent that whenever the relay 3CP is energized to actuate either its armature N or its armature P, the circuit for relay 3CPP is broken and it releases to close back contacts 320 and 321 and thereby make it possible to connect the associated battery to the track rails. If the positive armature P is actuated, the battery is connected through front contacts 324 and 325; but if the armature N is actuated the battery is connected through front contacts 326 and 327. In either case, the battery connection includes resistor 328 across which the approach relay 3A is connected. This resistor 328 carries the track circuit current, and the relay 3A is connected in multiple therewith so as to be picked up when the current through resistor 328 has risen to a sufficiently high value.

*Normal conditions*

Under the normal conditions with no trains around, code pulses are transmitted section by section back and forth through the single track stretch, and these code pulses are repeated past each intermediate track section in a manner similar to that already described for Fig. 3B. However, since the operation here involves certain added relays and a slight rearrangement of the repeat circuits, such repeat operation will be pointed out in detail.

Let us assume that a positive code pulse is received over the track section 4—5T by the track relay 4TR through front contacts 340 and 341 of relay 4CPP. Such a pulse actuates the positive armature P of track relay 4TR which effects the transmission of a double character code in the track section 2—3T. More specifically, an energizing circuit is first closed for the lower winding of the code transmitting relay 3CP for actuating its negative armature N. This circuit is closed from (+), and through a circuit including back contact 342 of relay 3TRP, back contact 343 of relay 3WS, back contact 344 of relay 4ES, back contact 345 of armature N of track relay 4TR, front contact 346 of armature P of track relay 4TR, back contact 347 of relay 4ES, lower winding of relay 3CP, to (−).

This causes the actuation of the negative armature N of relay 3CP and closes front contacts 326 and 327 so that the track battery is connected across the track rails in a way to apply negative code thereto as soon as the relay 3CPP is released by reason of the opening of back contact 323. The closure of front contact 323 of armature N of relay 3CP completes an energizing circuit for the relay 3PS from (+), and through a circuit including the winding of relay 3PS, front contact 348 of relay 4D, back contact 349 of relay 4ES, front contact 323 of armature N of relay 3CP, to (−). Thus, the relay 3PS is picked up so that upon the release of the armature N of relay 3CP there is a circuit closed for energizing the upper winding of this relay 3CP for the transmission of the positive pulse portion of this double character code. This circuit is closed from (+) and including back contact 350 of armature N of track relay 3TR, back contact 351 of armature P of track relay 3TR, front contact 352 of relay 3PS, back contact 353 of armature N of relay 3CP, upper winding of relay 3CP, to (−). This shift from the negative armature N to the positive armature P of relay 3CP is made so quickly that the relay 3CPP is steadily released. In this way, each pulse received over the track section 4—5T by track relay 4TR is repeated into the track section 2—3T by a pulse of the double character type under normal traffic conditions.

Let us assume that a double character pulse is received by the apparatus of Fig. 3A and functions to cause the transmission of a reply or dependent code pulse which under normal conditions is of positive character. This pulse is received by the track relay 3TR through front contact 320 and 321 of relay 3CPP. The picking up of the armature P of track relay 3TR closes front contact 351 and completes an obvious pick-up circuit for the relay 3TRP including back contact 350 of armature N of relay 3TR. The closure of front contact 342 of the track repeating relay 3TRP completes an energizing circuit for the code transmitting relay 4CP to effect the transmission of a positive code pulse in the track section 4—5T. This circuit for the upper winding of the relay 4CP is closed from (+) and through a circuit including back contact 346 of armature P of relay 4TR, back contact 345 of armature N of relay 4TR, back contact 344 of relay 4ES, back contact 343 of relay 3WS, front contact 342 of relay 3TRP, back contact 354 of relay 3H, front contact 355 of relay 3D, upper winding of relay 4CP, to (−). This causes the actuation of the positive armature P of relay 4CP thereby closing front contacts 356 and 357 to apply a positive pulse to the track rails.

It will be noted from the above description that the positive armature of the track relay 4TR is intermittently operating which operates its contacts 358 and 359 in a manner similar to that shown and described in connection with Fig. 1B for causing the continuous picked up condition of relay 4D. It is noted that this operation of contacts 358 and 359 can be effective to charge the capacitor 360 only provided the back contacts 361 and 362 of track relay 3TR are both closed. Thus, a check is provided against the simultaneous operation of two track relays. Also, the intermittent operation of the armature P of track relay 3TR causes the supply of pulses to the decoding relay 3D in an analogous manner to maintain its contacts picked up. A similar check arrangement against the contacts of track relay 4TR is also provided.

With this repeating of the pulses back and forth for dependent coding conditions with the resultant picked up condition of relays 3D and 4D, the stick circuits are closed for normally maintaining the traffic direction relays 4EF and 3WF energized. Each relay is maintained picked up dependent upon the continued energization of the decoding relay for the corresponding direction of traffic which it governs. For example, relay 4EF is energized from (+) and through a circuit including back contact 330 of relay 3WS, back contact 331 of relay 4H, front contact 332 of relay 4D, front contact 396 of relay 3D, lower winding of relay 4EF, to (−). A similar circuit is provided for the traffic direction relay 3WS from (+) and through a circuit including back contact 334 of relay 4ES, back contact 335 of relay 3H, front contact 336 of relay 3D, front contact 398 of relay 4D, lower winding of relay 3WF, to (−).

With these relays 4EF and 3WF both picked up, the lamps of both signals 3 and 4 are normally unilluminated. But whenever one or the other of these traffic direction relays is deenergized, the lamps for both signals are energized. For example, if the relay 3WF is deenergized, as a result of the deenergization of relay 3D, the red lamp R of signal 3 would be energized from (+), through a circuit including back contact 375 of relay 3WF, red lamp R of signal 3, back contact 376 of relay 3WF, to (−). Assuming that relay 4D was still picked up, the green lamp G of signal 4 would be energized from (+) and through a circuit including front contact 377 of relay 4EF, front contact 378 of relay 4D, green lamp G of signal 4, back contact 376 of relay 3WF, to (−). It is readily apparent that if the relay 4EF were deenergized with relay 3WF still energized, that the back contact 379 of relay 4EF would supply the negative energy to the common connection.

It is believed unnecessary to point out how the pulses transmitted in section 4—5T by the relay 4CP are repeated at the next adjacent signal location of signals 5 and 6. However, it should be noted that the transmission of a positive pulse over the track section 4—5T is received by the track relay 5TR and repeated into the next section 6—7T in the form of a double character code of (−/+) in exactly the same way that a positive pulse is repeated from the track section 4—5T into the track section 2—3T at the location of signals 3 and 4. This is mentioned merely to emphasize the fact that the same codes are used in this form of the invention and the repeat operations are effected to give the same codes and controls under the various traffic conditions indicated in the diagrams of Figs. 4A–4L.

*East-bound traffic*

Let us assume that a train enters the detector track section 1DT, as described in connection with Figs. 3A–3H, and causes a tumble-down operation. This removes the east transmitted code pulses from the track sections 2—3T and 4—5T so that the track relays 3TR and 5TR cease their operation; but west transmitted code pulses continue to be received by track relays 4TR and 6TR since at the right end of the single track stretch driven codes are transmitted as previously described in connection with Figs. 3A–3H under these conditions (see Fig. 4B). These are positive code pulses and operate the positive armatures of track relays 4TR and 6TR. This, of course, maintains the relays 4D and 6D picked up, but the relays 3D and 5D are dropped away. The opening of front contact 336 of relay 3D causes the release of the traffic direction relay 3WF: and similarly the opening of front contact 339 causes the release of the traffic direction relay 5WF. It will be noted that relay 4EF is held in the energized position with relay 3D deenergized, by virtue of contact 333 on relay 4EF. Likewise a similar circuit is provided for relay 6EF when relay 5D is deenergized. But this does not affect the repeat of the code pulses past signal 6 into the track section 4—5T, and past signal 4 into track section 2—3T, as previously described.

Under normal conditions the east transmitted code pulses received by the track relay 5TR are repeated into the track section 6—7T so that positive code pulses are repeated as codes of the double character type, i.e. (−/+). This is accomplished in a manner analogous to the description with respect to signals 3 and 4; but for the sake of definiteness, the circuit for code transmitting relay 6CP will now be pointed out. The picking up of the positive armature P of track relay 5TR completes an energizing circuit for the lower winding of relay 6CP from (+), and through a circuit including back contact 380 of relay 6TRP, back contact 381 of relay 6ES, back contact 382 of relay 5WS, front contact 383 of armature P of relay 5TR, back contact 384 of relay 5WS, lower winding of relay 6CP, to (−). The picking up of the negative armature N of relay 6CP applies the negative portion of the code and also closes a front contact for energizing the polarity shifting relay 6PS. This relay then closes a circuit for energizing the upper winding of relay 6CP as soon as the negative armature N is released.

This normal operation has just generally been described so that the operation occurring on the tumble-down action will be more readily understood. As above pointed out, the approach of an east-bound train in the single track stretch effects the tumble-down operation by removing code pulses from track section 2—3T and track section 4—5T. This, therefore, releases the decoding relay 5D and since no code pulses are received by the track relay 5TR, there is no operation to cause the relay 6CP to send pulses by repeat action. However, when code pulses are received by the track relay 6TR for repeating into the track section 4—5T, a circuit is closed for causing a reply or dependent code pulse to be transmitted by relay 6CP.

More specifically, when the relays 5D and 5H are both released, an energizing circuit is closed for relay 6PS each time the track repeating relay 6TRP is picked up. The repeating circuit through either front contact 390 or 391 for relay 6TRP is obvious. This circuit for relay 6PS is closed from (+), through a circuit including winding of relay 6PS, back contact 385 of relay 5D, back contact 386 of relay 5H, front contact 387 of relay 6TRP, wire 388, front contact 389 of relay 6D, to (−). When the relay 6TRP releases to repeat the track relay 6TR, it opens front contact 387 and deenergizes relay 6PS, which relay is slightly slow releasing so as to determine the length of the reply pulse. During the time that the relay 6PS is in a picked up position following the deenergization of the track relay 6TR, the upper winding of the code transmitting relay 6CP is closed from (+), and through a circuit including back contact 390 of armature N of relay 6TR, back contact 391 of armature P of relay 6TR, front contact 392 of relay 6PS, back contact 393 of armature N of relay 6CP, upper winding of relay 6CP, to (−). This temporary energization of the upper winding of relay 6CP causes the transmission of a positive code pulse by reason of the picking up of its positive armature P. This is repeated for each pulse received by the track relay 6TR and thus causes a series of positive pulses to be transmitted over the track section 6—7T. These positive pulses do not clear the signal 7, but rather hold it at stop as indicated in the diagram of Fig. 4B. In this way, the entrance of a train into the single track stretch causes the tumble-down action past the intermediate signals of this Fig. 6 in a manner very similar to that described for the form of the invention shown in Figs. 3A–3H.

Let us assume that the train moves into track section 2—3T to a point where the track circuit current is increased during each pulse period to a value which effects the picking up of the approach relay 3A during each pulse period. This completes an energizing circuit for the directional stick relay 4ES from (+), through a circuit including back contact 330 of relay 3WS, front contact 363 of relay 3A, front contact 364 of relay 4EF, windings of relay 4ES, to (−). Directional stick relay 4ES is made slow release so that once picked up it will remain up as long as relay 3A functions during each pulse period. As soon as this directional stick relay picks up, it closes its front contacts which prepares a stick circuit that is closed when the train passes the signal 4 and causes the release of relay 4D. This stick circuit is closed from (+) through a circuit including back contact 330 of relay 3WS, back contact 331 of relay 4H, back contact 332 of relay 4D, front contact 365 of relay 4ES, front contact 364 of relay 4EF, windings of relay 4ES, to (−). This stick circuit is then maintained closed until coding is restored in section 4—5T to effect the picking up of either the relay 4H or the relay 4D.

As soon as the directional stick relay 4ES picks up, a driven code is applied to the track section 2—3T although the train has not yet passed signal 4. This drive code of course does not pass the train because it adequately shunts the track rails and this shunting of the track rails with these driven code pulses maintain the approach relay 3A operating which is necessary to retain the energization of the directional stick relay 4ES until the relay 3D is dropped away when the train passes signal 4. This code applied to the rear of signal 4 is negative in character and involves the operation of the pulse timing relay 3—4PT.

More specifically, the picking up of the directional stick relay 4ES prepares an energizing circuit for the lower winding of code transmitting relay 3CP which is closed each time the timing relay 3—4PT is released from (+) and through a circuit including back contact 342 of relay 3TRP, back contact 343 of relay 3WS, front contact 366 of relay 4EF, back contact 367 of relay 3WF, back contact 368 of relay 3—4PT, front contact 347 of relay 4ES, lower winding of relay 3CP, to (−). This energization causes the relay 3CP to actuate its armature N and apply a negative pulse to the track section 2—3T. At the same time it closes front contact 323 which completes an energizing circuit for the relay 3—4PT from the back point of contact 367, through winding of relay 3—4PT, front contact 349 of relay 4ES, front contact 323 of armature N of relay 3CP, to (−). This causes the pulse timing relay 3—4PT to pick up and closes front contact 369 to connect the associated charged capacitor across the windings of this relay to make it slow in releasing and determine the time period between successive pulses. The opening of back contact 368 of this relay 3—4PT of course deenergizes the lower winding of relay 3CP allowing its armature N to release. This opens front contact 323 so that the relay 3—4PT begins its timing operation.

When the timing relay 3—4PT again releases, back contact 368 is closed and completes the energizing circuit for the lower winding of the code transmitting relay 3CP to transmit another (−) code pulse over the track rails. The picking up of the armature N of relay 3CP again energizes the pulse timing relay 3—4PT to terminate the pulse and to then measure the time between that pulse and the next. In this way, a succession of pulses are transmitted over the track section 2—3T while the directional stick relay 4ES is picked up to constitute a driven code. This code is transmitted as soon as relay 4ES picks up and continues in the rear of the train after the train has passed the signal 4.

It is noted that the directional stick relay 4ES is maintained picked up while section 4—5T is occupied through its stick circuit including back contacts 331 and 332 of relays 4H and 4D respectively.

As the train approaches the signal 6, a similar operation takes place as just described for signal 4. The approach relay 5A is operated and also the associated directional stick relay 6ES is picked up. When the directional stick relay 6ES picks up, it causes the transmission of a negative code in track section 4—5T. Also, the presence of the train in track section 6—7T prevents the transmission of the positive code toward the signal 7 as is effected for the tumble-down operation. This effects the siding overlap control to place signal 9 at stop.

When the east-bound train has wholly entered the track section 6—7T, the directional stick relay 6ES is picked up and causes a driven negative code (—) to be transmitted over the section 4—5T. The first pulse of this negative code causes the picking up of the negative armature N of track relay 4TR. The opening of back contact 345 causes the release of the traffic direction relay 4EF. This is because at this time the traffic direction relay 4EF is maintained stuck up by a stick circuit closed from (+), and through a circuit including back contact 346 of armature P of relay 4TR, back contact 345 of armature N of relay 4TR, front contact 344 of relay 4ES, front contact 371 of relay 4EF, windings of relay 4EF, to (—). This means that both of the traffic direction relays, i.e. 4EF and 3WF are dropped away during this transition period at this signal location.

The release of the traffic direction relay 4EF opens front contact 366 which is included in the code transmitting circuit for relay 3CP while the directional stick relay 4ES is picked up. This stops the code transmission to the rear of signal 4 so that the operation of the track relay 4TR is immediately effective to cause pulses to be supplied to the decoding relay 4H which after a short interval picks up its contacts.

It should also be noted that the release of the traffic direction relay 4EF opens front contact 364 included in the energizing stick circuit for directional stick relay 4ES, so that this relay begins its release period. However, relay 4ES is very slow in releasing, and in fact is much slower in releasing than the decoding relay 4H is in picking up. For this reason, there is a pick-up circuit closed for the traffic direction relay 4EF for restoring it during the time that relay 4ES is dropping away after the relay 4H has picked up. This pick-up circuit is closed for the traffic direction relay 4EF from (+) and through a circuit including back contact 330 of relay 3WS, front contact 331 of relay 4H, front contact 395 of relay 4ES, lower winding of relay 4EF, to (—). As soon as this relay 4EF picks up, it closes front contact 333 to again be maintained stuck up dependent upon relay 4H being picked up because this contact 333 shunts out contact 395 which is presently opened at the end of the release period for relay 4ES. In this way, the traffic direction relay for the direction of traffic which had been established is restored.

When the directional stick relay 4ES is dropped away, a pick-up circuit is closed for the traffic direction relay 3WF from (+) and through a circuit including back contact 334 of relay 4ES, back contact 335 of relay 3H, front contact 336 of relay 3D, front contact 370 of relay 4H, winding of relay 3WF, to (—).

As soon as the directional stick relay 4ES is released, the regular repeating circuit is completed for repeating pulses from the track section 4—5T into the track section 2—3T upon the operation of the track relay 4TR. These pulses, of course, must then be received at the end of the single track stretch and reply or dependent code pulses transmitted back over section 2—3T providing there is no following train. These reply pulses can of course be repeated past the signal 4 location upon the operation of the track relay 3TR in a manner previously described.

In this way the apparatus of Figs. 6B and 6BB is restored to its normal condition after the passage of the train for the repeating of code pulses past this intermediate signal location in either direction. The same operation takes place at the intermediate signal location of Fig. 6C, but this will not be described in detail since it is the same as that already given for Fig. 6B.

*Following train*

In the above description, considering the dropping of the directional stick relay 4ES associated with signal 4 upon the passage of the train beyond the track section 4—5T into the track section 6—7T, it was assumed that there was no following train. The operation described was that the traffic direction relay 4EF was restored through front contact 395 of the relay 4ES while it was releasing following the picking up of the relay 4H. This is the usual and proper operation which is effective even if a train is following the first east-bound train under discussion. However, it will be noted that with no following train the front contact 396 of relay 3D is closed so that a circuit through it is actually in multiple with the circuit through front contact 395. This is because the application of the driven code by the directional stick relay 4ES in a picked up condition is repeated to the end of the single track stretch and reply or dependent code pulses are returned causing the operation of track relay 3TR and the picked up condition of relay 3D. For this reason, relay 3D is picked up and remains picked up for an interval of time even though the driven code applied by relay 3CP to track section 2—3T ceases as soon as the traffic direction relay 4EF is released, because these decoding relays are somewhat slower in releasing than they are in picking up. However, it will be noted that if there is no following train and the driven code applied in the rear of signal 4 ceases, the code transmitting apparatus at signal location 2 applies a driven code in place of dependent code pulses and relay 3D would remain picked up for this reason.

However, when there is a following train which might be in the siding section 0T, for example, signal 1 would be at stop and the polarity of the pulses of the dependent code transmitted by relay 2CP would be negative in character so that the relay 3H would be picked up instead of the relay 3D. In this situation, front contact 397 would be closed instead of front contact 396. But, since the directional stick relay 4ES has its front contact 395 closed, this restoration circuit is in multiple with front contact 397 and either or both may allow current to flow for restoring relay 4EF.

Let us now assume that the following train accepts the signal 2 which is at caution by reason of the driven code applied by relay 3CP to track section 2—3T while the directional stick relay 4ES is picked up (as well as traffic direction relay 4EF). The train entering the detector track section 1DT and the track section 2—3T prevents the transmission of reply codes so that both relays 3D and 3H are deenergized. Now the restoration of the relay 4EF is wholly dependent upon front contact 395 when coding is restored in track section 4—5T; and it is necessary to pick up the traffic direction relay to establish proper conditions for the following train. It should be noted that under this circumstance, the traffic direction relay 3WF is not picked up, because relays 3D and 3H are deenergized and the circuit for this relay cannot be closed at front contacts 335 and 336. Also, since there is a following train and relay 4EF is restored before relay 4ES releases, it is likely that the relay 4ES remains picked up because the following train may cause the picked up condition of approach relay 3A and close front contact 363. In this event, the back contact 334 is maintained open and for this additional reason relay 3WF could not be picked up.

It is noted that relay 3WF being deenergized holds the signal 3 at stop and since the directional stick relay 4ES was picked up by the east-bound train passing signal 4 and the relays 4H and 4D were held deenergized, the signal 4 had been indicating stop. The application of the code pulses and release of the relay 4EF during this transition period merely continues to hold signal 4 at stop until the relay 4EF is restored in spite of the fact that the relay 4H is picked up by the negative code initially received in track section 4—5T due to the train passing signal 6 and the transmission of driven code by relay 5CP with directional stick relay 6ES picked up. In other words, there is no erroneous indication given by signal 4 during this transition period, so that the following train cannot possibly receive the wrong aspect. Assuming that the following train continues past the signal 4 and continues through the stretch, the operation for that train is exactly the same as already described.

*Broken down joint protection*

From the above description, it can be seen that the passage of a train causes the restoration of the traffic direction relays in succession and that the directional stick relays are released so that following train movements can be effected in the usual way.

In this form of the invention, the broken down joint protection at a signal location is protected against in two ways. In the first place, as previously pointed out, the decoding relays operated by track contacts are checked through the adjacent track relay so that if both track relays operate in unison then the decoding relays are not actuated. Such simultaneous operation of the adjacent track relays can occur only if the joints at the signal location are broken down. Let us assume that the shunts are broken down during normal coding conditions while no train is approaching, the code pulses then transmitted over the track section 4—5T, for example, would pass right into track section 2—3T and both relays 4TR and 3TR would be operated in unison. The simultaneous actuation of contact 362 of relay 3TR with contacts 358 and 359 of relay 4TR would prevent the decoding relay 4D from energizing. This would hold signal 4 at stop. If the pulses that flowed directly from track section 4—5T into track section 2—3T were sufficiently strong to be received by track relay 2TR, that signal did not indicate clear because positive pulses hold such signal at stop. However, it might be that negative pulses would be applied to track section 4—5T at the next intermediate signal to the right, i.e. signal 6 and if these negative pulses were received by track relay 2TR it would cause signal 2 to display a caution indication. This might allow the train to proceed into section 2—3T and signal 4 would be at stop until the train had approached a point where the track relay 3TR is prevented from operating in response to pulses. If pulses are flowing past the signal location 4 it is likely that a train shunting the track relay 3TR would also shunt the track relay 4TR and prevent that relay from operating. In such a case signal 4 would continue to indicate stop. In such an event the broken down joint condition results in operation which is on the side of safety and which is self-betraying.

There is another condition under which broken down joints may be dangerous; but the present invention provides an operational characteristic such that the situation is made entirely safe. For example, let us assume that an east-bound train has passed the signal 4 of Fig. 6B and has picked up the directional stick relay 4ES. This causes a negative (—) code to be applied to section 2—3T. When the east-bound train has passed to the exit end of section 4—5T, and particularly if it poorly shunts the track rails of such section, or if the bonding between rails of such section is faulty, the code pulses applied to section 2—3T may feed around the joints and cause the operation of the track relay 4TR.

This operating condition falsely simulates the condition described above where the train has wholly passed into the track section 6—7T; but due to the resulting operation the driven code applied by relay 4ES is immediately removed because the opening of either back contact 345 or 346 of track relay 4TR releases the traffic direction relay 4EF to remove the driven code by the opening of front contact 366. This operation, of course, is the same as if there were the usual transition period taking place. But since the pulses operating the track relay 4TR are assumed to be the pulses applied by the relay 3CP because of a broken down joint condition, the dropping of the relay 4EF and removal of driven code immediately causes the track relay 4TR to cease its operation and for this reason the relay 4H is not picked up. Also, the opening of front contact 364 of relay 4EF causes the directional stick relay 4ES to release. In this way, there is positive assurances that no driven code will be again applied by transmitting relay 3CP.

When code pulses are restored in track section 4—5T after the train passes the signal 6 location, the track relay 4TR is then legitimately operated and picks up the relay 4H. Usually the breaking down of insulated joints is insufficient to allow remotely applied pulses to repeat past such joints and such a condition previously discussed above is rather rare. Thus, the normal conditions usually prevail in which the operation of the track relay 4TR causes the repeating of pulses legitimately from track section 4—5T into track section 2—3T. This results in reply pulses and the relays 3D and 3H are both picked up, so that both traffic direction relays 4EF and 3WF are restored through their regular pick-up circuits. In other words, the directional stick relay 4ES could not effect through its front contact 395 a restoration of the relay 4EF.

Even if the proper repeating of the codes was not accomplished at this signal location with the broken down joints and pulses from track section 4—5T directly flowed into track section 2—3T, the signals 3 and 4 could not give false indications and in fact could not give other than a stop indication until coding had been restored on both sides of that signal location. Actually, the code transmitting relay 2CP at signal 2 would cause a driven code to be applied which would pick up either the relay 3H or 3D, and the driven code applied at signal 6, either by the directional stick relay at that location, or from the signal 7 assuming the train had passed out of the stretch, would cause the relay 3H or 3D to pick up, in which event both traffic direction relays would be restored through their pick-up circuits. Since both traffic direction relays of this location are deenergized, the apparatus would tend to operate to repeat pulses past this signal location, but whether or not the decoding would continue properly would be dependent upon how severely the joints were broken down. If the joints were severely broken down, decoding might be prevented holding the signals 4 and 3 at stop. In any event, the condition is left in one of safety and any failure of the signal to clear is self-betraying with respect to such broken down joints.

In the above description, it is noted that the operation of the apparatus in the event of broken down joints is such that the traffic direction relay is released first and then the directional stick relay. Since the traffic direction relay holds the signal at stop, and since it also removes the driven code even though the directional stick relay is still releasing, it is apparent that if the decoding relay is operated by the erroneous operation of a track relay by the flow of pulses past a broken down joint, it cannot even momentarily cause a false clearing of the associated signal. This is true because of two reasons. First, the release of the traffic direction relay stops the driven code so that the decoding relay is not picked up. Second, even if the decoding relay should pick up, it cannot be effective because the traffic relay deenergized prevents any clearing of the associated signal.

The traffic direction relays also protect against another possible failure in connection with the track circuits. For example, should the approach relay for a particular signal fail to pick up, the associated directional stick relay would fail to be picked up. Thus, when the train passes the signal location it might be effective on that side of the signal to pick up the wrong directional stick relay. This in effect would be a reversal of direction for the train passing through the stretch. Assuming that such train continues through the stretch and is followed by another train, when the first train leaves the stretch there would be an erroneous indication given to a train waiting to enter the stretch in the opposite direction, due to the fact that a directional stick relay had picked up for the wrong direction.

This cannot happen in the Fig. 6 form of the invention because when a train passes a signal location it releases the decoding relays which have cleared that signal, and this would prevent the erroneous picking up of both traffic direction relays at that time. Since the traffic direction relay for the direction opposite to that in which the train is travelling is then deenergized, the wrong directional stick relay cannot be picked up even though the proper one has not picked up.

This can perhaps be best seen by referring to Figs. 6B and 6BB. Assuming that the east-bound train failed to pick up relay 4ES as it passes the signal 4, such train shunts the track relay 4TR and the relays 4D and 4H are both dropped away. This means that the traffic direction relay 3WF cannot be picked up through front contacts 370 or 398 of relays 4H and 4D respectively. Since contact 399 of relay 3WF is included in the circuit for relay 3WS, it is obvious that this directional stick relay 3WS cannot be picked up even though directional stick relay 4ES is deenergized closing its back contact 334 and even though the approach relay 4A should be picked up closing front contact 394. When the east-bound train passes beyond section 4—5T and the track relay 4TR does operate and cause the picking up of either relay 4H or 4D, it is then apparent that the approach relay 4A is deenergized and the directional stick relay 3WS cannot be erroneously picked up even though the traffic direction relay 3WF is then restored to its normally picked up condition. This arrangement therefore protects against the possible failure in the picking up of a directional stick relay, and thereby gives more positive protection for following train movements.

Having described three forms of a coded track circuit signalling system as embodying the present invention, it is desired to be understood that these forms are selected to facilitate in the disclosure of the invention rather than to limit the number of forms which it may assume; and, it is to be further understood that various modifications, adaptations and alterations may be applied to the specific forms shown to meet the requirements of practice, without in any manner departing from the spirit or scope of the present invention.

What I claim is:

1. In a coded track circuit signalling system for a stretch of single track having a plurality of track sections insulated from each other, code transmitting and receiving means at each end of said stretch, each said transmitting means being effective to transmit spaced code pulses which spaces between pulses are relatively longer than said pulses, code repeating means at each intermediate location where successive track sections join for repeating code pulses from either adjoining section into the other, circuit means at each end of said stretch controlled by the associated code receiving means upon the reception of a code pulse from the opposite end for causing the associated code transmitting means to transmit a reply pulse immediately upon the termination of such reception, code transmitting means at each intermediate location responsive to the passage of a train and rendered effective to transmit spaced code pulses in the rear of a train having passed that intermediate location only so long as code pulses are not received in advance of that location by said code repeating means at that location.

2. In a coded track circuit signalling system for a stretch of single track having a plurality of track sections, code transmitting and receiving means at each end of said stretch, each said transmitting means being effective to transmit spaced code pulses over the track rails of the adjacent track section with said spaces between pulses being relatively longer than said pulses, circuit means at each end of said stretch controlled by the associated code receiving means upon the reception of a code pulse over the track rails from the opposite end for shortening the time to the transmission of the next code pulse by the associated code transmitting means, code repeating means at each location where successive track sections join for repeating code pulses from one track section into the adjacent track section in either direction past that location, whereby code pulses are transmitted in opposite directions through the stretch at a rate dependent upon the rate of repeat of said code pulses when said stretch is unoccupied, but whereby code pulses are transmitted from each end of said stretch at a slower code rate when said stretch is occupied by a train.

3. In a coded track circuit for a section of railroad track, code transmitting and receiving means located at each end of said section, said means at each end including a track relay, a source of energy, a code transmitting relay, circuit means for energizing said code transmitting relay when said track relay is deenergized, timing circuit means rendered active by the energization of said code transmitting relay for immediately deenergizing said code transmitting relay and maintaining it deenergized for a relatively longer time than it was energized, said timing circuit means being effective for its normal timing action only if said track relay remains deenergized, whereby said transmitting means at opposite ends of the section are effective to transmit code pulses at a one rate when said section is occupied by a train but which act alternately at a faster rate when said section is unoccupied and code pulses are received by said track relays at both ends of said section and shorten the timing action of the associated timing circuit means.

4. In a coded track circuit for a section of railroad track, code transmitting and receiving means located at each end of said section, said means at each end including a track relay, a source of energy, a code transmitting relay, a pulse timing relay, a capacitor-resistor combination, circuit means including contacts of said code transmitting relay for normally connecting said track relay across the rails of said section but effective when said code transmitting relay is energized to disconnect said track relay and connect said source of energy across the rails of said section, circuit means including a back contact of said pulse timing relay for energizing said code transmitting relay when said track relay is deenergized, circuit means for energizing said pulse timing relay when said code transmitting relay is energized, and other circuit means for connecting said capacitor-resistor combination to a source of energy when said pulse timing relay is deenergized and also connecting said capacitor-resistor combination across said pulse timing relay when it is energized only providing said track relay is then deenergized.

5. In a coded track circuit signalling system, two adjoining track sections insulated from each other, a track relay normally connected to one track section for receiving spaced code pulses over that track section where the spaces between pulses are normally longer in duration than the pulses themselves, code transmitting relay means operable from a normal position to either of two active positions, said code transmitting relay means in one of its positions being effective to apply a code pulse of one polarity to said other track section and being effective in the other of its two positions for applying a code pulse of the opposite polarity to said other track section, circuit means controlled by said track relay for energizing said code transmitting relay means to actuate it to one operated position, and circuit means temporarily effective following each restoration of said code transmitting relay means to its normal position after its actuation to said one position for energizing said code transmitting relay means to actuate it to said other position, whereby the reception of a code pulse over said one track section causes the transmission of a double character code pulse in the adjoining track section, said double character code pulse being of both polarities successively applied with a minimum of intervening time separation.

6. In a coded track circuit signalling system, two adjoining track sections insulated from each other, a track relay normally connected to one track section for receiving time spaced code pulses over that section, a code transmitting relay operable from a normal position to either of two operated positions, circuit means controlled by said code transmitting relay in one position for applying code pulses of one polarity to said other track section and said code transmitting relay in its other position for applying a code pulse of the opposite polarity to said other track section, circuit means controlled by said track relay for energizing said code transmitting relay to its said one operated position each time said track relay receives a code pulse, a polarity shifting relay of the slow releasing type, circuit means for energizing said polarity shifting relay each time said code transmitting relay is energized to its said one operated position, and a circuit means controlled by said polarity shifting relay in an energized position for energizing said code transmitting relay to its other position as soon as it is destored to its normal position following energization by said track relay.

7. In a coded track circuit signalling system, two adjoining track sections, a track relay normally connected to one track section for receiving spaced code pulses over that section where the spaces between pulses are relatively longer in duration than the pulses themselves, a three position code transmitting relay operated from a deenergized position to one or the other of two operated positions, circuit means controlled by said code transmitting relay in one of its positions for applying energy of a particular polarity to said other track section, and controlled by said code transmitting relay in its other position for applying energy of the opposite polarity to said other track section, circuit means controlled by said track relay for energizing said code transmitting relay to its said one operated position while said track relay is energized by the reception of a code pulse over said one track section, a polarity shifting relay of the slow releasing type energized each time said code transmitting relay is actuated to its said one operated position, and a circuit means controlled by said polarity shifting relay and said code transmitting relay for energizing said code transmitting relay to operate it to its said other position immediately following its restoration to a deenergized position upon return from its one operated position.

8. In a coded track circuit signalling system for a stretch of single track having a plurality of track sections insulated from each other, an entering signal at each end of said stretch for governing the entrance of traffic into such stretch, an intermediate signal for each direction at each intermediate location where successive track sections join for governing traffic past that location in either direction, code transmitting and receiving means at each end of said stretch, each said transmitting means being effective to transmit spaced code pulses which spaces between pulses are relatively longer than said pulses, code repeating means at each intermediate signal location for repeating code pulses from either adjoining track section into the other in that location, circuit means at each end of such stretch controlled by the associated code receiving means at that end upon the reception of a code pulse from the opposite end for causing the associated code transmitting means at that end to transmit a reply pulse immediately upon the termination of such reception regardless of the time allotted to the ensuing space, circuit means at each intermediate signal location for selecting the polarity of code pulses repeated past that location into the track section in the rear of that signal in accordance with the aspect displayed by such signal without interfering with the repeat of code pulses past that signal location regardless of the aspect displayed by such signal, a directional stick relay for each direction located at each intermediate signal location, circuit means for picking up a direction stick relay at an intermediate signal location corresponding to the direction of train movement past that location and effective to maintain it picked up only until codes are received in advance of that particular intermediate signal location, code transmitting means at each intermediate signal location rendered effective to transmit spaced code pulses in the rear of a train only when said directional stick relay for the corresponding signal is picked up, said code transmitting means at said intermediate signal locations being effective to transmit spaced pulses which spaces between pulses are relatively longer than said pulses with such code transmitting means acting independently of the reception of code pulses at that signal location from the opposite direction in so far as a change in the length of the spaces between pulses is concerned, and circuit means at each end of said stretch and at each intermediate signal location for controlling the aspect displayed by the associated signal in accordance with the polarity of the pulses received over the section in advance of that signal.

9. In a coded track circuit signalling system for a stretch of single track having a plurality of track sections insulated from each other, an entering signal at each end of said stretch for governing the entrance of traffic into such stretch, an intermediate signal for each direction at each intermediate location where successive track sections join for governing traffic past that location in either direction, code transmitting and receiving means at each end of said stretch, each said transmitting means being effective to transmit spaced code pulses which spaces between pulses are relatively longer than said pulses, code repeating means at each intermediate signal location for repeating code pulses from either adjoining track section into the other in that location, circuit means at each end of such stretch controlled by the associated code receiving means at that end upon the reception of a code pulse from the opposite end for causing the associated code transmitting means at that end to transmit a reply pulse immediately upon the termination of such reception regardless of the time allotted to the ensuing space, circuit means at each intermediate signal location for selecting the polarity of code pulses repeated past that location into the track section in the rear of that signal in accordance with the aspect displayed by such signal without interfering with the repeat of code pulses past that signal location regardless of the aspect displayed by such signal, code transmitting means at each intermediate signal location rendered effective to transmit spaced code pulses in the rear of a train when a train has passed that intermediate signal location and said means being effective only so long as code pulses are not received in advance of that signal, said code transmitting means at said intermediate signal locations being effective to transmit spaced pulses which spaces between pulses are relatively longer than said pulses with such code transmitting means acting independently of the reception of code pulses at that signal location from the opposite direction insofar as a change in the length of the spaces between pulses is concerned, and circuit means at each end of said stretch and at each intermediate signal location for controlling the aspect displayed by the associated signal in accordance with the polarity of the pulses received over the section in advance of that signal.

10. In a coded track circuit signalling system, a section of railway track, code transmitting and receiving means at each end of said section including a code transmitting relay means operable from a normal position to either of two operated positions, circuit means controlled by said code transmitting relay means in one of its said two positions which applies energy of one polarity to said track section and in the other of its said two positions for applying energy of the opposite polarity to said track section, a track relay normally connected across the track rails of said section, circuit means including a back contact of said track relay for energizing said code transmitting relay means to actuate it to a selected one of its operated positions, timing means associated with said code transmitting means and set into operation for a predetermined time when said code transmitting relay means is actuated to either of its two operated positions, said timing means immediately being effective when set into operation to deenergize said code transmitting relay means and restore it to its normal position, said timing means being effective throughout its operation for a predetermined time to maintain said code transmitting relay means deenergized unless otherwise acted upon, circuit means including a back contact of said track relay for at least one end of said section for acting upon the associated timing means to immediately restore it to a normal inactive condition when a code pulse is received, and circuit means controlled by traffic in approach to said section at either end for selecting the position of said code transmitting relay means at the corresponding end to which it is operated by said transmitting circuit means.

11. In a coded track circuit signalling system, a section of railway track, code transmitting and receiving means at each end of said section, said transmitting means at one end being capable of transmitting spaced code pulses, each code pulse being of positive or negative character or of both positive and negative characters applied in quick succession, with any one of the three different codes being selected by the existing traffic conditions at that end, said transmitting means at the other end being capable of transmitting code pulses of positive or negative character as selected by existing traffic conditions at that end, said code receiving means at each end including a polarized track relay, circuit means at each end rendered effective immediately following the reception of a code pulse of either polarity to cause the associated code transmitting relay means to be effective to transmit a code pulse of a polarity as selected for it, said circuit means acting to delay such action until both the positive and negative portions of a code have been received when both polarities are received in quick succession as constituting a code, and means at each end of the section controlled by traffic conditions for selecting the character of the code to be transmitted by the associated code transmitting relay means.

12. In a block signalling system for railroads of the character described, a stretch of single track between passing sidings divided into track sections and including an end track section at each end of said stretch and an intermediate track section, a headblock signal at each end of said stretch for governng train movement into such stretch, intermediate signals at the ends of said intermediate track section for governing train movements in both directions, code transmitting means at each end of said stretch for applying time spaced code pulses to said end section at that end, said pulses being of a polarity selected in accordance with traffic conditions adjacent such end, code repeating means at each location where said intermediate section joins with an end section for repeating codes from either section into the other, said codes having their polarity selected by the aspect then displayed by the respective intermediate signal, decoding circuit means at each headblock signal and each intermediate signal for causing it to display an aspect in accordance with the polarity of the code pulses received in advance of such signal, and circuit means at each end of said stretch responsive to the reception of a code pulse from the opposite end for shortening the time space then being determined by the associated code transmitting means, whereby code pulses of selected polarity are normally transmitted through said stretch in opposite directions with the polarity of such codes effecting the control of said signals, and whereby the interruption of code pulse transmission through said stretch causes the opposing signals to be placed at stop.

13. In a coded track circuit signalling system, a section of railway track, code transmitting and receiving means at each end of said section including a code transmitting relay means operable from a normal position to either of two operated positions, circuit means controlled by said code transmitting relay means in one of its said two positions to apply energy of one polarity to said track section and in the other of its said two positions to apply energy of the opposite polarity to said track section, a track relay normally connected across the track rails of said section but disconnected when said code transmitting relay means is in either of its two operated positions, transmit circuit means including a back contact of said track relay for energizing said code transmitting relay means to actuate it to a selected one of its two operated positions, timing means associated with said code transmitting means and set into operation to measure a predetermined time following the actuation of said code transmitting relay means to either of its two operated positions, said timing means being effective while it is in operation to deenergize said code transmitting relay means and restored to its normal position, whereby said code transmitting relay means is intermittently operated to apply energy of one polarity to said track section provided said track relay is deenergized, sequence circuit means at times effective when said code transmitting relay means is actuated to one of its two operated conditions for quickly actuating it to the other of its two operated positions, and traffic control relay means at each end of said section for selecting the particular one of the two operated positions of said code transmitting relay means to which it is to be actuated by said transmitting circuit means and also selecting whether said sequence circuit means shall be effective, whereby said code transmitting relay means can transmit successive codes of positive or negative character or of both positive and negative character for different traffic conditions.

14. In a coded track circuit signalling system, a section of railway track, code transmitting and receiving means at each end of said section including a code transmitting relay means operable from a normal position to either of two operated positions, circuit means controlled by said code transmitting relay means in one of its two said positions to apply energy of one polarity to said track section and in the other of its said two positions to apply energy of the opposite polarity to said track section, a track relay normally connected across the track rails of said section but disconnected when said code transmitting relay means is in either of its two operated positions, transmit circuit means including a back contact of said track relay for energizing said code transmitting relay means to actuate it to a selected one of its two operated positions, timing means associated with said code transmitting means and set into operation to measure a predetermined time following the actuation of said code transmitting relay means to either of its two operated positions, said timing means being effective while it is in operation to deenergize said code transmitting relay means and restored to its normal position, whereby said code transmitting relay means is intermittently operated to apply energy of one polarity to said track section provided said track relay is deenergized, sequence circuit means at times effective when said code transmitting relay means is actuated to one of its two operated conditions for quickly actuating it to the other of its two operated positions, traffic control relay means associated with said code transmitting relay means at each end of said section for selecting the positions to which said code transmitting relay means shall be operated for successive code pulse periods and under certain traffic conditions causing said sequence circuit control means to be effective for successive code pulse periods.

15. In a block signalling system for railroads of the character described, a stretch of single track between passing sidings divided into a plurality of track sections and including an end track section at each end of said stretch and at least one intermediate track section, a headblock signal at each end of said stretch for governing train movement into such stretch, intermediate signals at the ends of said intermediate track sections for governing train movements in both directions, code transmitting means at each end of said stretch for applying uniformly spaced code pulses to the end section at that end with the duration of the spaces being relatively longer than the pulses, and said pulses being of positive or negative polarity as selected in accordance with traffic conditions at the corresponding end, code repeating means at each location where two sections join for repeating code pulses of selected polarity from either section into the other, decoding circuit means at each headblock signal and at each intermediate signal, each decoding circuit means being responsive to the polarity of the code pulses received over the section in advance of its signal for causing it to display an aspect in accordance with such polarity, circuit means at each intermediate signal location controlled by said decoding means at that location by said code repeating means in accordance with traffic conditions in advance of such location, and circuit means at each end of said stretch responsive to a code pulse received from the other end for acting on said associated code transmitting means to shorten the time duration of the existing code space to permit the next code pulse to be transmitted immediately following the termination of such code pulse then being received.

16. In a block signalling system for railroads of the character described, a stretch of single track between passing sidings divided into a plurality of track sections and including an end track section at each end of said stretch and at least one intermediate track section, a headblock signal at each end of said stretch for governing train movement into such stretch, intermediate signals at the ends of said intermediate track sections for governing train movements in both directions, code transmitting means at each end of said stretch for applying uniformly spaced code pulses to the end section at that end with the duration of the spaces being relatively longer than the pulses, and said pulses being of positive or negative polarity as selected in accordance with traffic conditions at the corresponding end, code repeating means at each location where two sections join for repeating code pulses of selected polarity from either section into the other, decoding circuit means at each headblock signal and at each intermediate signal, each decoding circuit means being responsive to the polarity of the code pulses received over the section in advance of its signal for causing it to display an aspect in accordance with such polarity, circuit means at each intermediate signal location controlled by said decoding means at that location for selecting the polarity of the code pulses repeated past that location by said code repeating means in accordance with traffic conditions in advance of such location, a directional stick relay associated with each intermediate signal, circuit means for each directional stick relay responsive to the passage of a train to cause it to be picked up and to be maintained picked up only so long as its associated signal is held at stop by that train in advance of such signal, code transmitting means at each intermediate signal location controlled by the directional stick relays at that location for applying uniformly spaced code pulses to the section to the rear of the signal for which a directional stick relay is then picked up, said pulses being of a polarity to cause the next signal to the rear to display a caution aspect, and circuit means at each end of said stretch responsive to any received code pulse for acting on said associated code transmitting means to shorten the time duration of the existing code space to permit the next code pulse to be transmitted immediately following the termination of such code pulse then being received.

17. In a coded track circuit signalling system for single track railroads, a passing siding with a stretch of single track at each end and a siding section opposite the passing siding to connect said stretches of single track, each stretch of single track having an end section adjoining said siding section, an entering signal at each end of said siding section for governing traffic into such section, a distant signal to the rear of each entering signal and governing traffic into its respective end section in approach to that entering signal, code transmitting means at each end of said siding section and at each end of each end section for applying uniformly spaced code pulses to each said section with the duration of said spaces being relatively longer than said pulses and said pulses being of positive or negative polarity or of both positive or negative polarity applied in quick reversal, with the selection of the particular code character being dependent upon conditions in the adjoining section, decoding circuit means at each signal location distinctively responsive to the polarity of the code pulses received at that location for controlling the respective signals to clear caution and stop aspects for the different polarities of code pulses received, circuit means normally acting on said code transmitting means at each distant signal for transmitting code pulses of a particular polarity from such distant signal toward said siding section but responsive to the entrance of a train into said single track stretch for changing to a different code character to cause the headblock signal to be placed at stop and to change the character of the code transmission in said siding section for causing the opposing entering signal to be placed at caution, circuit means controlled by said entering signal at caution for acting on said code transmitting means for the associated end section for applying a code to said associated end section to cause the distant signal to display a caution indication, circuit means at each entering signal responsive to the removal of code from the associated end section when a train enters that end section to cause the removal of code in said siding section to cause the opposing entering signal to be placed at stop, circuit means at each entering signal responsive to the removal of code from said siding section to cause the transmission of a code in that associated end section to control the distant signal to caution, circuit means at each entering signal for applying a different code to said siding section upon the passage of a train out of such section for causing the entering signal at the other end to be operated to give a caution aspect, and circuit means at each entering signal controlled by the reception of such different code over said siding section for causing a signal clearing code to be applied to the associated end section to clear the distant signal, whereby a double distant caution control with siding overlap is provided for opposing train movements with following train movements permitted with the usual block protection.

18. In a block signalling system for railroads of the character described, a stretch of single track between two passing sidings divided into a plurality of track sections and including an end track section at each end of said stretch and intermediate track sections, a headblock signal at each end of said stretch for governing train movement into such stretch, intermediate signals at the ends of said intermediate track sections for governing train movement in both directions, code transmitting means at each end of said stretch for applying time spaced code pulses to said end section at that end, said pulses being of a polarity selected in accordance with traffic conditions adjacent such end, code repeating means at each location where said sections join for repeating codes from either section into the other, said codes having their polarity selected in accordance with the aspect of the associated signal, decoding circuit means at each headblock signal and at each intermediate signal for causing it to display an aspect in accordance with the polarity of the code pulses received in advance of that signal, circuit means at each end of said stretch responsive to the reception of a code pulse from the opposite end for acting on the associated code transmitter to shorten the time-space between successive pulses, a pair of traffic direction relays at each intermediate signal location, one for each direction of traffic, circuit means for maintaining said traffic direction relays picked up when codes are being transmitted alternately in both directions past that signal location under normal conditions, but that one of said relays being deenergized whenever a train enters said stretch one corresponding to the particular direction for traffic then established, and circuit means being capable of picking up said traffic direction relays at an intermediate signal location only when codes are received from both directions at that location, whereby the establishment of traffic for one direction of train movement through said stretch cannot be reversed at a signal location until codes are normally transmitted in both directions toward that intermediate signal location.

19. In a coded track circuit system for railways, a code transmitting means at each end of a section for applying during a code transmitting period both a positive and a negative pulse and then waiting for a predetermined time space before again transmitting, whereby successive codes comprise a double character, code receiving means at each end of said section distinctively responsive to said double character codes, and circuit means associated with each transmitting means capable of causing the associated transmitting means to immediately transmit a code upon the termination of the reception of a code from the other end, whereby double character codes are transmitted in opposite directions alternately without conflict.

20. In a coded track circuit for a section of railway track, code transmitting means located at each end of said section for transmitting code pulses over said track, code receiving means located at each end of said section for receiving code pulses from said track, said code receiving means at each end including means rendering it capable of receiving a code pulse only when the code transmitting means at the same end of the section is not transmitting a code pulse, a first circuit means at each end of the section for acting on said code transmitting means at that end for at times causing transmission of code pulses of an independent code over the rails of said section at a predetermined code rate without the receiving code means at such end receiving a code through the track rails from the other end of the track section, and other circuit means at each end of said section at other times effective to cause its transmitting means to be unresponsive to said first circuit means and to be acted upon by its code receiving means to immediately transmit a code pulse upon the termination of the reception by such receiving means of each code pulse from the other end of said section to cause the transmission of a dependent code at a rate faster than said predetermined code rate.

21. In a coded track circuit system for a section of railway track, code transmitting means located at each end of said section for transmitting uniformly spaced code pulses of different selected polarities at a particular rate, means for selecting said polarities in accordance with traffic conditions, code receiving means located at each end of said section for receiving said code pulses of selected polarities, and circuit means at each end of said section controlled by said code receiving means at that end when a code pulse is received for acting on said code transmitting means at that end to shorten the time before the next pulse is transmitted by such code transmitting means, whereby pulses are normally transmitted at said particular rate while a train is in said section but are transmitted at a faster rate when said section is unoccupied.

22. In a coded track circuit system for a section of railway track, code transmitting means located at each end of said section for transmitting over the rails of that section uniformly spaced code pulses at predetermined rates, code receiving means located at each end of said section for receiving said code pulses over the rails of that section, and circuit means at each end of said section controlled by said code receiving means at that end when a code pulse is received for acting on said code transmitting means at that end to shorten the time before the next pulse is transmitted by such code transmitting means, whereby pulses are normally transmitted back and forth between the ends of said section at a rate faster than said predetermined rates, and whereby the presence of a train in said section causes pulses to be transmitted at opposite ends of said section at said predetermined rates.

23. In a coded track circuit system for a stretch of single track having a plurality of track sections insulated from each other, code transmitting means located at each end of said stretch for transmitting uniformly spaced code pulses over the corresponding end section at a predetermined rate, code receiving means located at each end of said stretch for receiving code pulses over the corresponding end section transmitted toward that end, code repeating means at each intermediate location where successive track sections join for repeating code pulses from either adjoining section into the other, circuit means at each end of said stretch controlled by said code receiving means at that end when a code pulse is received for acting on said code transmitting means at that end to shorten the time space before the next pulse is transmitted to immediately cause such code transmitting means to transmit a code pulse, and code transmitting means at each intermediate location controlled by said repeating means in response to the passage of a train for causing said transmitting means to transmit a driven code of spaced pulses to the section in the rear of such train only so long as code pulses are not received by said code repeating means from the section in advance of that location.

References Cited in the file of this patent

UNITED STATES PATENTS

| | | |
|---|---|---|
| 2,291,579 | Judge | July 28, 1942 |
| 2,350,657 | Wynn | June 6, 1944 |
| 2,357,545 | Preston | Sept. 5, 1944 |
| 2,703,839 | Judge | Mar. 8, 1955 |